US005300771A

United States Patent [19]

Labowsky

[11] Patent Number: 5,300,771

[45] Date of Patent: Apr. 5, 1994

[54] METHOD FOR DETERMINING THE MOLECULAR WEIGHTS OF POLYATOMIC MOLECULES BY MASS ANALYSIS OF THEIR MULTIPLY CHARGED IONS

[75] Inventor: Michael J. Labowsky, Wayne, N.J.

[73] Assignee: Analytica of Branford, Branford, Conn.

[21] Appl. No.: 892,113

[22] Filed: Jun. 2, 1992

[51] Int. Cl.[5] ........................ B01D 59/44; H01J 49/02

[52] U.S. Cl. ........................................ 250/282

[58] Field of Search ................................ 250/282, 288

[56] References Cited

U.S. PATENT DOCUMENTS 5,072,115 12/1991 Zhou .................................. 250/282

5,130,538 7/1992 Fenn et al. .......................... 250/282

5,175,430 12/1992 Enke et al. .......................... 250/282

*Primary Examiner*—Bruce C. Anderson

[57] ABSTRACT

The invention comprises a method of analyzing the results obtained from the mass analysis of an ensemble or population of multiply charged ions comprising large polyatomic molecules to each of which is attached a plurality of charges. These molecules can be charged either by the attachment of charged mass or by the loss of charged mass. The charged mass is referred to as the "adduct" ion mass. The measured mass spectrum for such a population of ions generally comprises a sequence of peaks for each distinct polyatomic molecular species, the ions of each peak differing from those of adjacent peaks in the sequence by only a single charge. The method of analysis taught by the invention produces a deconvoluted spectrum in which there is only one peak for each distinct molecular species, the magnitude of that single peak containing contributions from each of the multiplicity of peaks for that species in the measured spectrum. A unique feature of the method taught by the invention is that the deconvoluted spectrum becomes a three dimensional surface in which the three coordinates of the single peak for a particular species represent respectively the molecular weight Mr of the parent polyatomic molecular species, the effective mass ma of the adduct ion charges, and the relative abundance of the ions of the polyatomic molecular species in the population of ions that gave rise to the measured spectrum. Consequently, there is no need to assume a priori a particular value for the mass of the adduct ion.

15 Claims, 29 Drawing Sheets

METHOD FOR DETERMINING THE MOLECULAR WEIGHTS OF POLYATOMIC MOLECULES BY MASS ANALYSIS OF THEIR MULTIPLY CHARGED IONS

BACKGROUND OF THE INVENTION

Interest in mass analysis of multiply charged ions has mushroomed since the demonstration a few years ago that they could be readily produced by so-called Electrospray (ES) Ionization from large, complex and labile molecules in solution. This development has been described in several U.S. Pat. Nos. (Labowsky et al., 4,531,056; Yamashita et al., 4,542,293; Henion et.al. 4,861,988; and Smith et al. 4,842,701 and 4,887,706) and in several recent review articles [Fenn et al., Science 246, 64 (1989); Fenn et al., Mass Spectrometry Reviews 6, 37 (1990); Smith et al., Analytical Chemistry 2, 882 (1990]. Because of extensive multiple charging ES ions of large molecules almost always have mass/charge (m/z) ratios of less than about 2500 so they can be weighed with relatively simple and inexpensive conventional analyzers. Intact ions of polar species such as proteins and other biopolymers with molecular weights (Mr's) of 200,000 or more have been produced. ES ions have been produced from polyethylene glycols with Mr's up to 5,000,000. Because such ions have as many as 4000 charges they can be "weighed" with quadrupole mass filters having an upper limit for m/z of 1500! [T. Nohmi et al., J. Am. Chem. Soc. 114, 3241 (1992)].

ES ions always comprise species that are themselves anions or cations in solution, or are polar molecules to which solute anions or cations are attached by ion-dipole forces. While attachment of charge is the prevalent mode of ion formation, ionization may also occur in a "deduct" mode. In other words, a molecule may be charged by the loss of charged mass. For example, a neutral molecule may become negatively charged by losing a proton with each charge. The term "adduct ion" will be used here to refer to both modes of ion formation. For species large enough to produce ions with multiple charges, the mass spectra always comprise sequences of peaks. The sequence for any particular species is coherent in the sense that the ions of each peak differ only by one charge from those of the nearest peak of the same species (on either side). As discussed by Mann et.al.[(Anal. Chem. 61, 1702 (1989)]such coherence and multiplicity lead to improved precision in the determination of Mr because each peak constitutes an independent measure of the parent ion mass. Averaging over the m/z values of several peaks can substantially reduce random errors, thereby significantly increasing the confidence in, and precision of, mass assignments. However, such averaging has no affect on systematic errors, e.g. those due to errors in the calibration of the instrument mass scale. Thus, although peak multiplicity does make possible an increase in the precision of an Mr determination it does not necessarily provide an increase in its accuracy.

As mentioned above, the potential of peak multiplicity to improve the precision of mass assignment was first recognized by Mann et al. (11) They noted that there are three unknowns associated with the ions of a particular peak: the molecular weight Mr of the parent species, the number i of charges on the ion, and the mass ma of each adduct charge. Therefore, mass/charge (m/z) values for the ions of any three peaks of the same parent species would fix the values of each unknown. However, there is a relation between the peaks such that they form a coherent sequence in which the number of charges i varies by one from peak to peak. Consequently, the m/z values of any pair of peaks are sufficient to fix Mr for the parent species, provided that the masses of the adduct charges are the same for all ions of all the peaks in the sequence. Mann et.al. also described procedures for optimum averaging of the set of Mr values from the m/z values of the possible peak pairings. In addition, they introduced a somewhat different approach by which the measured spectrum with its sequence of peaks for a particular parent species could be transformed into the spectrum that would have been obtained if all the ions of the parent species had had a single massless charge. This single peak, obtained by deconvoluting the measured spectrum, reflects the sum of contributions from all the ions of that parent species, no matter what their charge state. Moreover, because random contributions are not similarly summed, the signal/noise ratio in the transformed spectrum is greater than in the original measured spectrum. The deconvolution procedure can be carried out by direct computer processing of the raw data from the mass spectrometer. Moreover, it can extract an Mr value for each species in a mixture by taking advantage of the coherence in the m/z values for the ions of a particular species. Such resolution of mixtures can be enhanced by so-called "entropy-based" computational procedures described, for example, in a recent paper by Reinhold and Reinhold [J. Am. Scc. Mass Spectrom. 3, 207 (1992)]. Indeed, resolution can be achieved even when some of the ions of different species have almost the same apparent m/z values. i.e. when some of the peaks in the measured spectrum comprise almost-exact superpositions of two or more peaks for ions of different species.

In spite of the effectiveness of this deconvolution procedure as originally described, and in spite of improvements that have since been incorporated by various users, it suffers from some disadvantages. It requires an a priori assumption that the mass of each adduct charge is the same for all ions of a particular species as well as an assumption of a particular value for that mass. If either of these assumptions is faulty, the resulting value of Mr for the parent species may be incorrect. Moreover, even if the assumptions are correct they neither eliminate nor reveal any errors due to faulty calibration of the analyzer's m/z scale. Nor does the deconvoluted spectrum provide any information on the magnitude or direction of the possible error.

BRIEF DESCRIPTION OF THE INVENTION

An object of this invention is to remedy some of the deficiencies of the methods that have been described and which are now in use for interpreting the mass spectra of multiply charged ions. An essential feature of the invention is to carry out the analysis of such spectra by treating $m_a$, the mass of the adduct charge, as a free variable. The net result is that the deconvoluted spectrum becomes a three-dimensional (3D) surface instead of a two-dimensional (2D) plane curve. Indeed, the 2D spectrum produced by the original algorithm is in fact simply the intersection of a plane of constant $m_a$ with that 3D surface showing its contour at a particular value of $m_a$. Another objective of the invention is to provide procedures for producing such a 3D surface and for obtaining from that surface more information than can be obtained from two dimensional representations of the same data.

BRIEF DESCRIPTION OF THE DRAWINGS

FIG. 1*a* is the average of 8 mass scans over the m/z range that includes all the peaks. FIG. 1*b* is a "blow-up" of the peak at m/z =774 due to ions with 16 charges. The analyzer was operating at a resolution of 800.

FIG. 3*a* shows the 3D surface resulting from the deconvolution of the spectrum in FIG. 1*a* according to the invention. Lower FIG. 3*b* is a projection of the 3D surface of 3*a* on the base FIG. corresponding to zero signal amplitude.

FIG. 5*b* shows the projection of the 3D surface of 5*a* on the base plane.

FIG. 6*b* shows the pair of lines defining region B in 6*a*, together with a second pair of lines defining region C, the locus of all possible values of $m_a$ and Mr consistent with the m/z value of a second peak in the measured spectrum adjacent to the peak associated with region B. The area $X_{bc}$ defined by the intersection of the two pairs of lines includes all values of Mr and $m_a$ for which both of the two adjacent peaks in the measured spectrum will contribute to the height of what emerges as a "ridge" in the surface for the deconvoluted spectrum. FIG. 6*c* shows an analogous region $X_{bcd}$ defined by the intersection of three pairs of lines, one pair for each of three peaks in the measured mass spectrum.

FIG. 7*a* shows the intersection of four pairs of lines, one for each of four peaks in the measured spectrum. FIG. 7*b* illustrates what happens to the intersection region when one of the pairs of lines is displaced toward the $M_r$ axis.

FIG. 8*a* shows the deconvoluted peak formed by the intersection of $m_a=1{:}0$ plane with the 3D surface of FIG. 3*a* obtained by deconvoluting the mass spectrum of cytochrome c in FIG. 1*a* that was obtained at a resolution of 800. Actually, it is the peak of FIG. 4 shown on an expanded Mr scale. Lower panel 8*b* is the analogous result obtained by intersecting the $m_a=1.0$ plane with the 3D surface of FIG. 3*a* obtained by deconvoluting the mass spectrum of FIG. 2*a* that was obtained at a resolution of 500.

FIG. 9*a* shows the peak resulting from intersecting the $m_a=19$ plane with the 3D surface of FIG. 3*a* obtained by deconvoluting the measured spectrum of FIG. 1*a*. FIG. 9*b* is the analogous result of intersecting the $m_a=39$ plane with that same 3D surface.

FIG. 10*a* shows the 3D surface resulting from the deconvolution of the spectrum in FIG. 1*a*. Filtering functions have been incorporated in the deconvolution to eliminate the side-band ridges that appear in FIGS. 3*a* and 5*a*. FIG. 10*b* is the projection of the surface of FIG. 10*a* onto the base plane.

FIG. 13*a* is the 3D surface produced by deconvolution of the idealized spectrum of FIG. 12. FIG. 13*b* is the projection of the surface of 13*a* on the base plane.

FIG. 14*a* shows an enlargement of the projection of the high ridge of the 3D surface of FIG. 13*a* in the region close to $m_a=1$. FIG. 14*b* shows an enlargement of the projection of the low ridge of that 3D surface in the region close to $m_a=23$.

FIG. 15*a* shows an electrospray mass spectrum of bovine insulin obtained with a quadrupole mass analyzer providing a resolution of about 1000. Lower FIG. 15*b* shows what happens when the quintuply charged ions that produced the central peak in FIG. 15*a* are analyzed with a magnetic sector instrument providing a resolution of about 10,000.

DETAILED DESCRIPTION OF THE INVENTION

Apparatus and Experiments

Figure 1A:
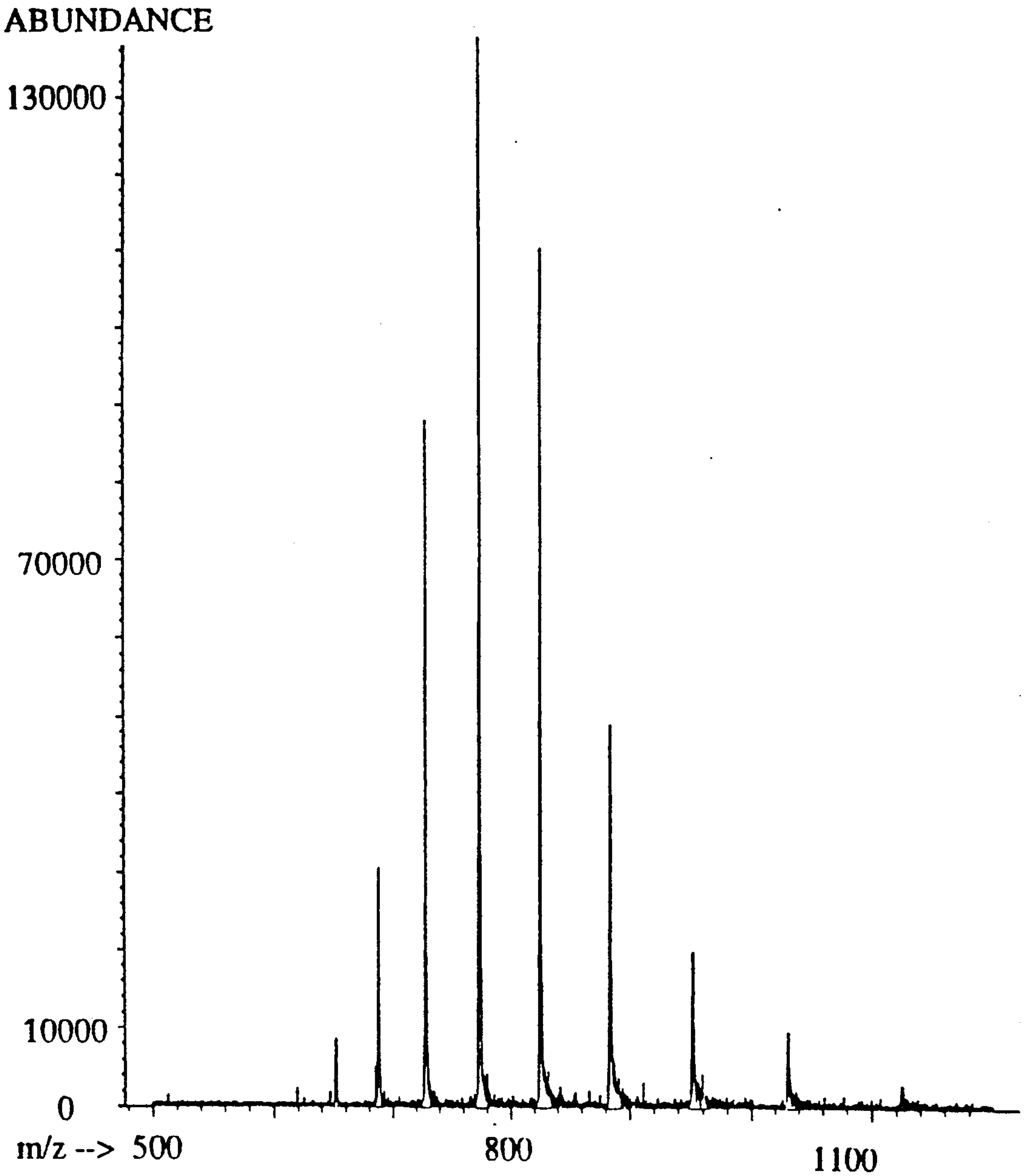
FIG. 1*a*–*b*. A mass spectrum of the ions obtained by electrospraying a solution of cytochrome c, a protein with a molecular weight (Mr) of 12,360, at a concentration of 0.1 g/L in 2 % acetic acid in 1:1 methanol:water.
Figure 1B:
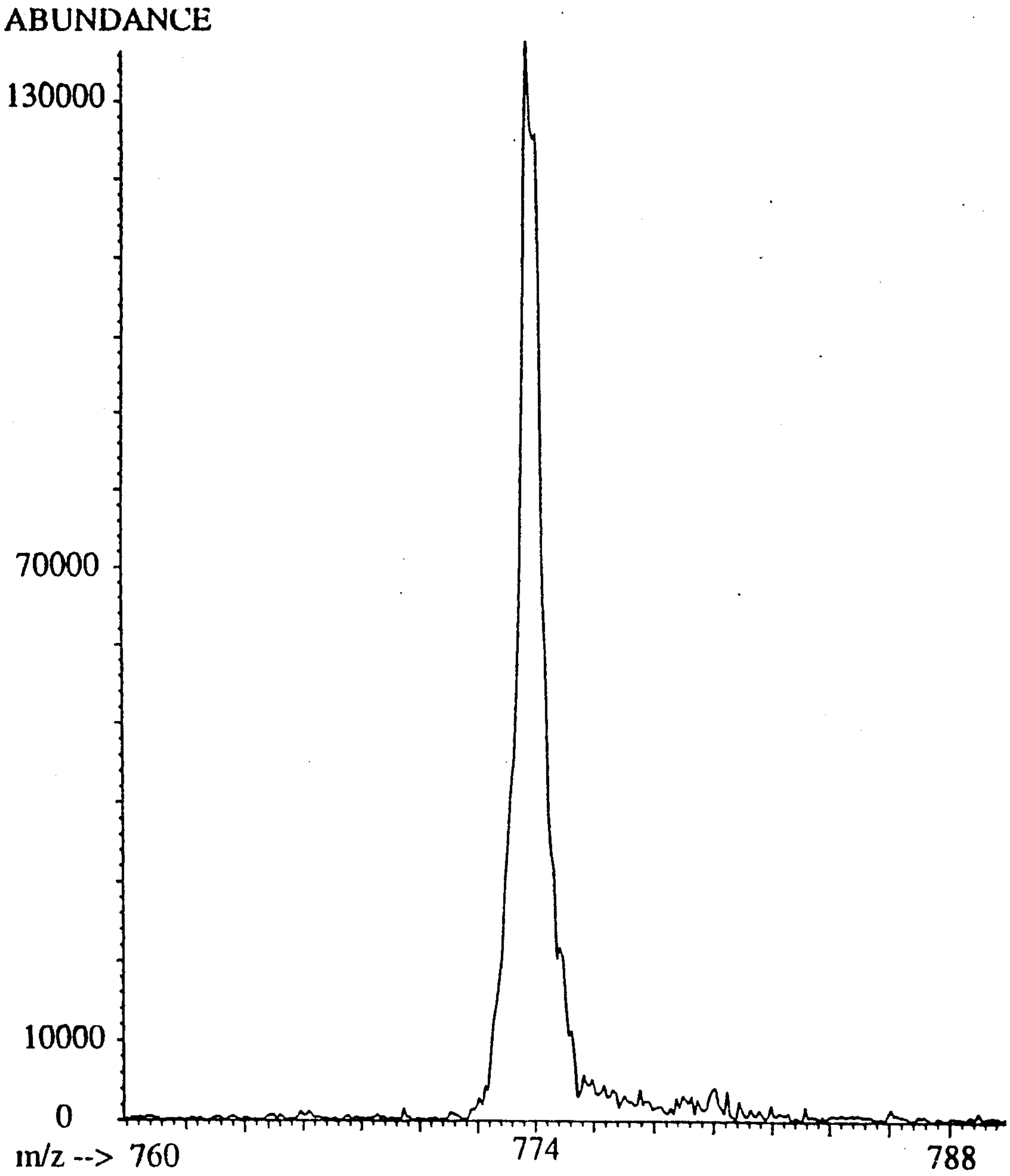
Figure 2A:
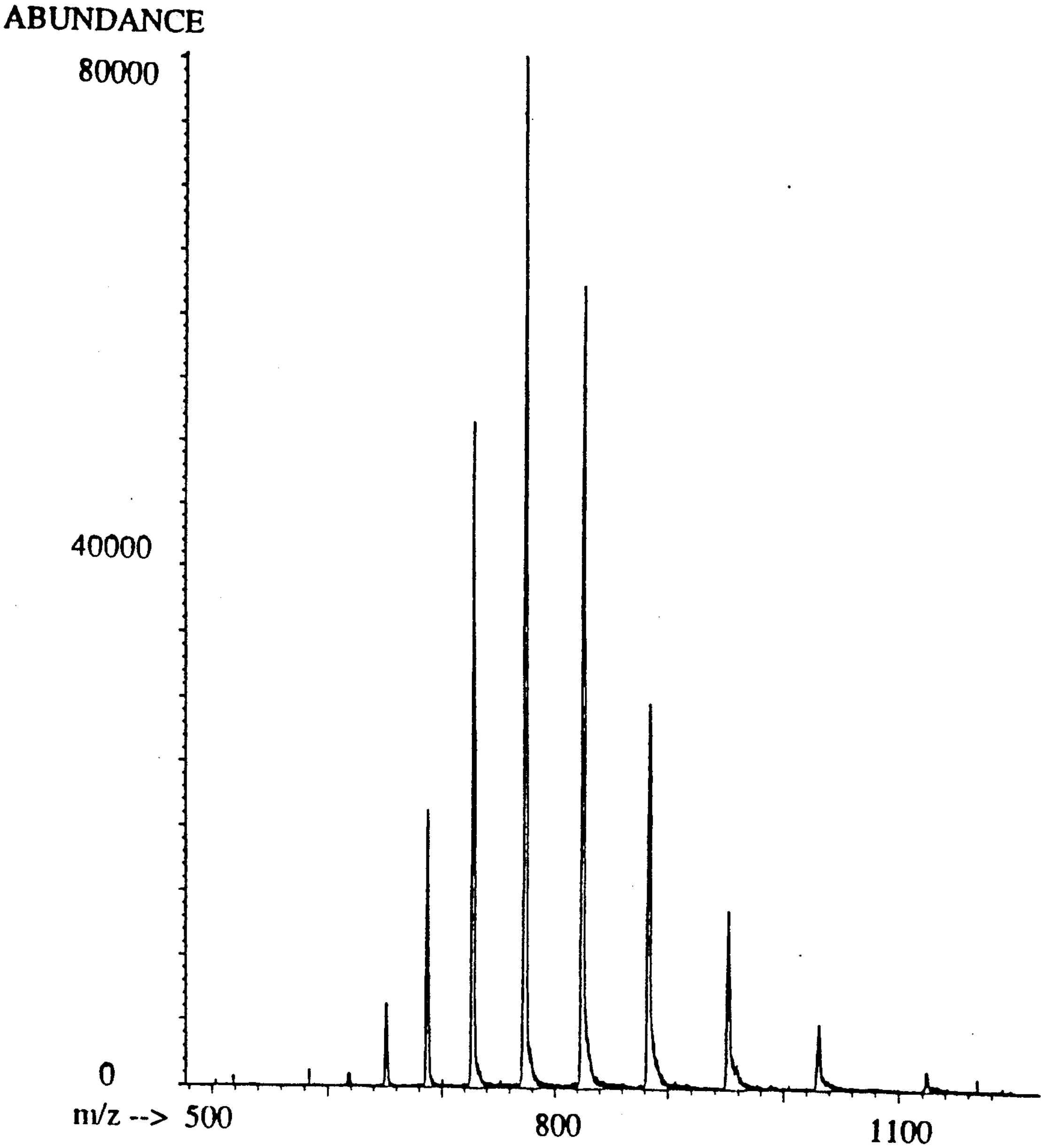
FIG. 2*a*–*b*. A mass spectrum taken with the same solution of cytochrome c from which the spectrum in FIG. 1 was obtained. The difference is that the resolution had been reduced from 800 in FIG. 1 to 500 in FIG. 2.

It is desirable to use real measurements for illustrating the features of data analysis by the invention. Therefore, ESMS spectra were obtained with cytochrome C (Sigma), a much studied protein with an Mr of 12,360. A solution comprising 0.1 g/L in 1:1 methanol:water containing 2 % acetic acid was introduced at a rate of 1 uL/min into an ES ion source (Analytica of Branford) coupled to a quadrupole mass analyzer (Hewlett-Packard 5988) that incorporated a multiplier-detector operating in an analog mode. The data system was modified to allow acquisition and storage of "raw" data in the form of digitized points at intervals of 0.1 dalton from the instrument's standard A/D converter. The typical spectrum shown in FIG. 1*a* is an average of 8 sequential mass scans at a resolution of 800. The peak corresponding to ions with 16 charges (H+) is shown on an expanded scale in FIG. 1*b*. Assignments of m/z values for each point were consistent from scan to scan so that no rounding off was employed. FIG. 2 shows an analogous spectrum taken immediately after the one for FIG. 1 with the same solution under identical conditions except that the analyzer resolution was decreased to 500. Close inspection of these spectra reveals that this change in resolution resulted in a slight shift in the locations of corresponding peaks. Even so, the algorithm to be described was applied directly to each set of data. No corrections or smoothing were applied to achieve "self-consistency." Also to be remembered is that when these data were taken the spectrometer's software fixed the mass scale on the basis of only two calibration points. No corrections were made for non-linearities in the scale between the calibration points.

Outline of the Method

The first reaction of many mass spectrometrists to the unique features of ESMS is often a mixture of disbelief and delight that it can form intact parent ions from such large molecules. Then they become alarmed at the prospect of spectra that have several peaks for each parent species because of an instinctive fear that the resulting complexity will make interpretation difficult or impossible. These understandable fears have proved groundless, primarily because of the coherence of the peaks for any one species. This coherence stems from the discrete nature of the charges and the fact that every population of ES ions from a particular species includes members in every possible charge state from a minimum to a maximum value. For the ions of any one of those charge states we can write:

$$x_i = Mr/i + m_a \qquad (1a)$$

where $x_i$ is the m/z value for an ion comprising a parent molecule of molecular weight Mr with i adduct charges of mass $m_a$ which we will assume for the moment is the same for all ions. Because i can have only integral values the ES mass spectrum of a species that forms multiply charged ions will comprise a peak at $x_i$ plus a series of additional peaks corresponding to ions with i+1, i+2, . . . i+n charges having m/z values of:

$$x_{i+1} = Mr/(i+1) + m_a \qquad (1b)$$

$$x_{i+2} = Mr/(i+2) + m_a \qquad (1c)$$

$$x_{i+3} = Mr/(i+3) + m_a \qquad (1d)$$

As noted earlier, each peak in this series has three unknowns, Mr, i and $m_a$. As long as ma remains the same for all ions associated with each peak, Mr, ma and i can be obtained from the values of x for any three peaks in the series by explicit simultaneous solution of Eqs. 1 for those three peaks. An independent value of Mr can be obtained from each different combination of three peaks. The resulting set of Mr values can be averaged in any of several ways to give a most probable or best value.

The deconvolution alternative to explicitly solving eqs. 1 is to instruct a computer to add measured ion currents at all m/z values in the spectrum that correspond to ions of a test parent species with an assumed value of Mr and some assumed integral number of adduct charges of a specified mass $m_a$. The resulting sum is taken as the current that would have been obtained if all the ions of that parent species had been singly charged. Clearly, in order to carry out such an instruction the computer would have to be provided with values for the masses of the parent and adduct species, both of which are unknown a priori. A value of $m_a$ for the adduct charge can usually be assumed on the basis of the nature of the analyte. For example, with peptides and proteins the adduct charge is a generally a proton. If necessary, the assumed value can be checked experimentally by dosing the sample with additional amounts of the assumed adduct species and noting the effect on the location and height of spectral peaks. However, no such procedures can be invoked to arrive at a value of Mr for the parent species which, after all, is what one wants to learn from the spectrum. To get around this problem the computer is told to carry out the adding procedure for all reasonably possible values of Mr. The value of Mr giving rise to the largest sum is taken to be the correct value for the species because it is the value that best fits the spectrum.

This adding procedure can be represented by:

$$H(Mr^*) = \sum_{i_{min}}^{i_{max}} h(Mr^*/i + m_a) \qquad (2)$$

where $$i_{min} = INT[Mr/(x_f - m_a)]$$
$$i_{max} = INT[Mr/(x_s - m_a)]$$

in which the function INT denotes the integer closest to each argument $Mr^*/(x_f - m_a)$ or $Mr^*/(x_s - m_a)$. $H(Mr^*)$ represents, for a particular initial choice of Mr (i.e. $Mr^*$), the sum of all values of $h = h(Mr^*/i + m_a)$ where h is the ion current (peak height) at an m/z value corresponding to the assumed value of $m_a$ and the chosen value $Mr^*$ with some value of i within the range from $i_{min}$ to $i_{max}$. The summation of Eq. 2 is carried out for all values of $Mr^*$ that are consonant with the range of values for m/z and i spanned by the peaks in the measured spectrum. To define this range it suffices to make rough estimates of i based the locations of any pair of peaks on the m/z scale of the spectrum. It is easy to show that the best value of Mr for the parent species is the $M_r^*$ which provides the largest total for the summation of Eq. 2.

The 3D Treatment With $m_a$ as a Free Variable

The 2D approach described above works very well if the assumed value of mass $m_a$ of the adduct charge and the m/z scale of the analyzer are reasonably accurate. We can avoid the need to assume a value for $m_a$ by allowing the current for a particular ion species to depend upon both Mr and ma. In that case a 3D surface is required for a geometric representation the dependence of ion current on two variables so that Eq. 2 becomes:

$$H(M_r, m_a) = \sum_{i_{min}}^{i_{max}} h(M_r/i + m_a) \qquad (3)$$

where the summation must be carried out over the applicable ranges for both Mr and $m_a$. Thus, the summation of Eq. 2 represents simply the summation of Eq. 3 for a particular value of $m_a$. In geometric terms, the deconvoluted spectrum resulting from Eq. 2 is the intersection of a plane of constant $m_a$ with the surface of Eq. 3. It will emerge that the topography of that surface helps the user identify the optimum value of $m_a$. In addition it provides a measure of the linearity of the m/z scale of the mass analyzer.

Figure 3A:
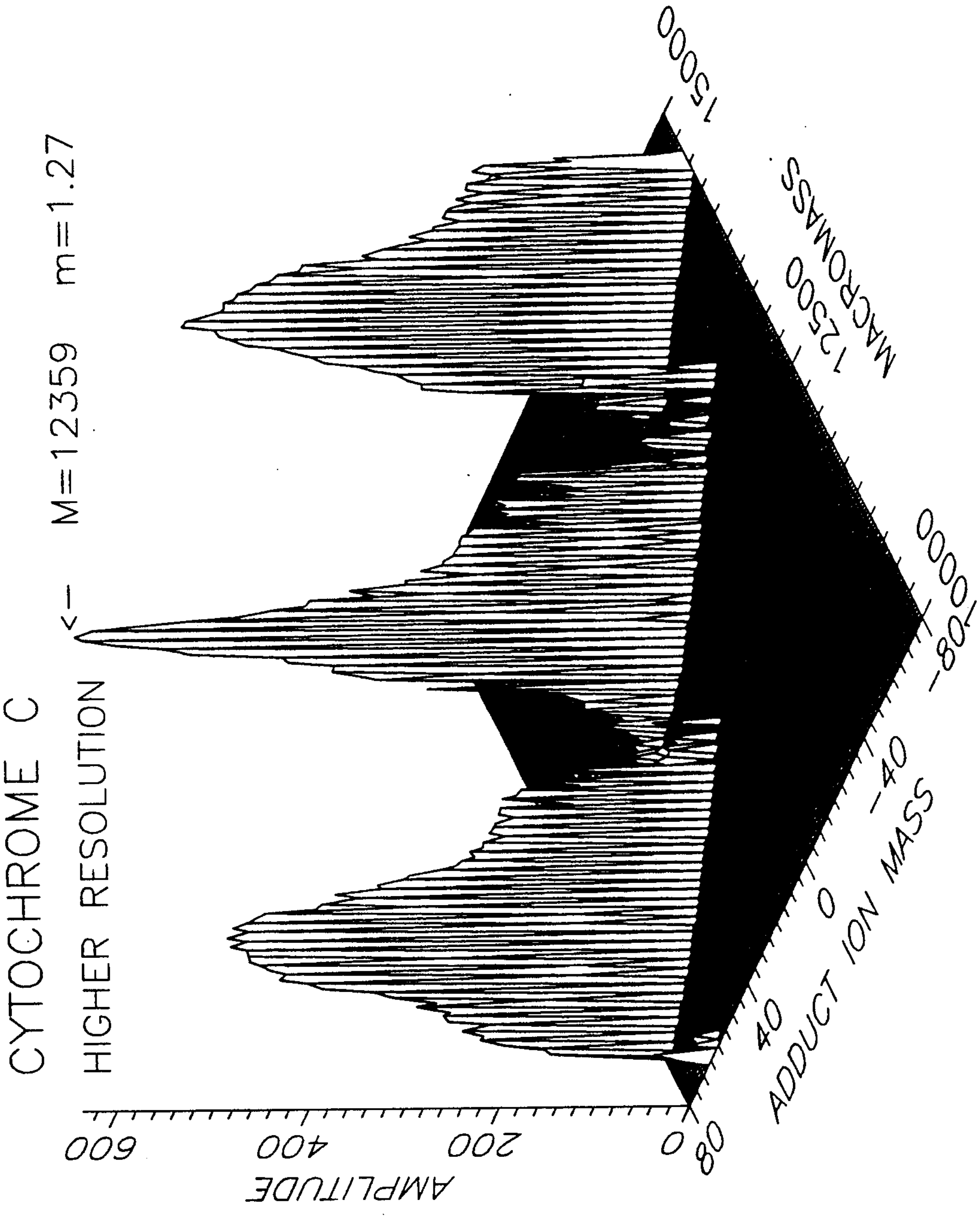
FIG. 3*a*–*b*. Upper
Figure 3B:
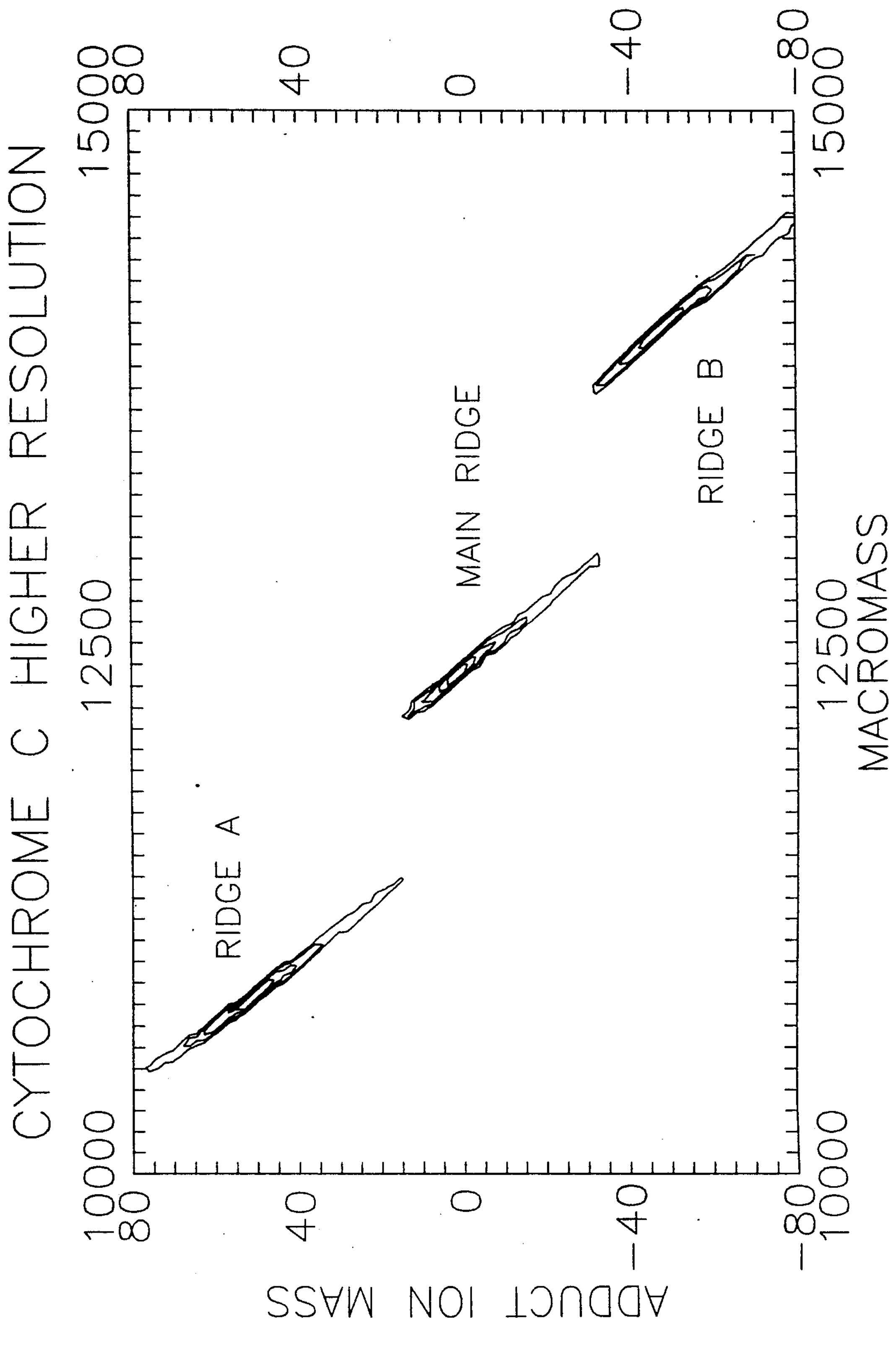

FIG. 3 shows the result of applying the deconvolution procedure of Eq. 3 to the measured spectrum of cytochrome C shown in FIG. 1. FIG. 3*a* represents the 3D surface and shows that it comprises a central ridge with two adjacent parallel ridges, one on either side of the central ridge. The cross-sectional shapes of these ridges are more clearly revealed in FIG. 3*b* which shows the 2D contour map of the surface as viewed from above. The summit contour of the central ridge has a somewhat higher altitude than the summit contours of the side ridge. It will emerge that these side ridges are due to a weaker coherence that is present in the measured spectrum when summation of Eq. 3 assumes that the number of charges i for the ions of each peak is one more or one less than the true number. We defer until later any further discussion of these side ridges and for now will devote our attention to the origin and features of the central ridge.

Figure 4:
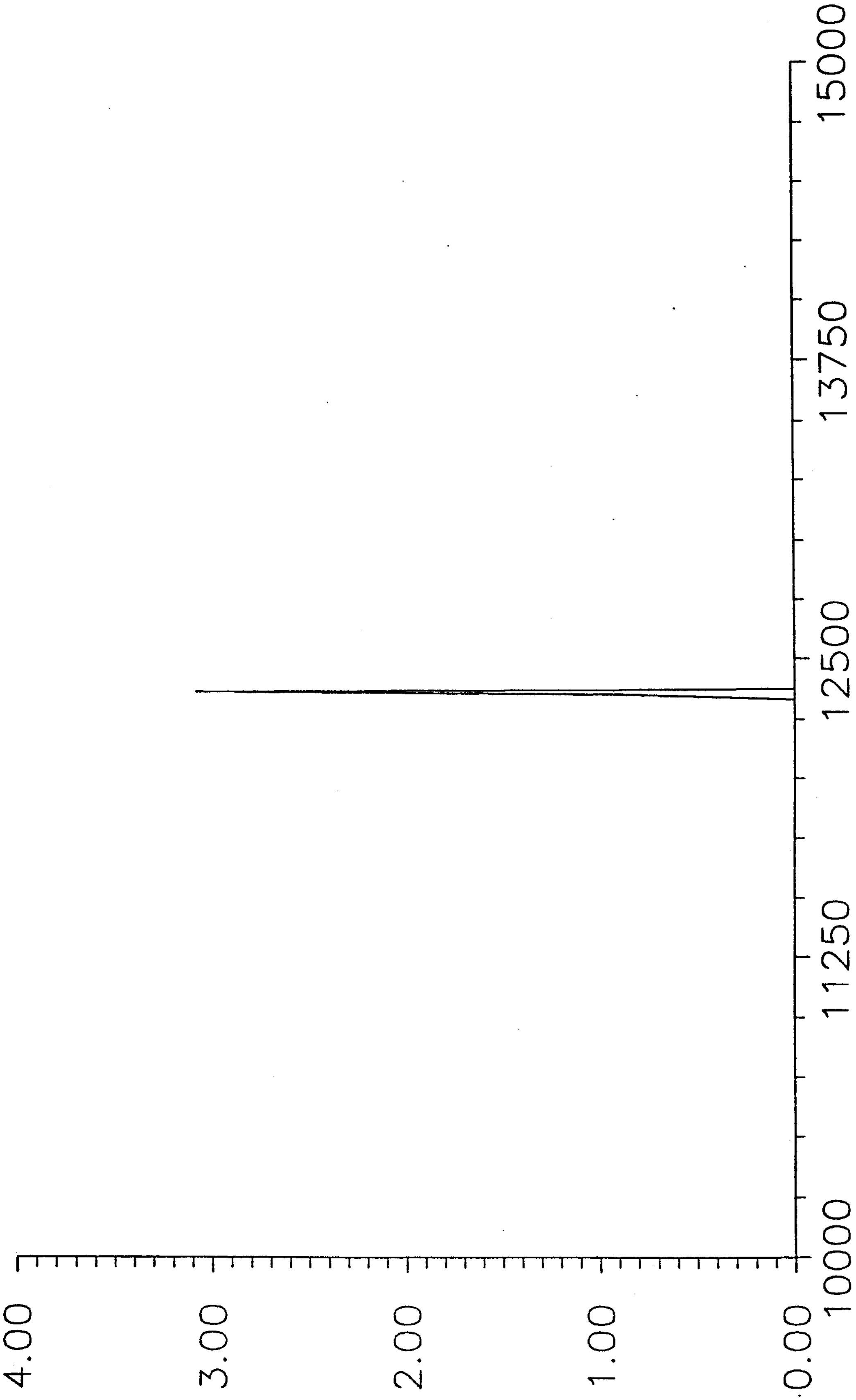
FIG. 4. The curve produced by the intersection of the plane for $m_a=1$ with the 3D surface of FIG. 3*a* obtained by deconvoluting the mass spectrum for cytochrome c in FIG. 1*a*.

The highest point on the central or main ridge corresponds to an Mr of 12,359 and an $m_a$ of 1.27 units, close to the values that would be expected for ion comprising cytochrome C with adduct charges that were H+. FIG. 4 shows a 2D spectrum comprising the intersection of the surface of FIG. 3 with the plane for $m_a=1$. The value of Mr at the highest point of the sharp peak is 12,365. At 95% of this maximum value the width of the peak is 5 Da, corresponding to an uncertainty in Mr of ±2.5 units. However, as shown in FIG. 3, the ridge is much longer than it is wide. Along this length the Mr value of the peak at the same level of uncertainty varies from 12,348 to 12,374. In other words the overall uncertainty in Mr based on the length of the ridge is ±13 as opposed to ±2.5 when only the width of the ridge is taken into account. It is important to assess uncertainty in terms of the length of the ridge because this length has a strong dependence on calibration errors in the m/z scale of the analyzer as well as on errors in the location of peaks on that scale. The unrealistic value of 1.27 for the adduct ion mass, obtained from the location of the highest point on the 3D surface of FIG. 3, is also evidence of errors in the scale calibration. A 2D spectrum that assumed a value of 1.00 for $m_a$ would simply provide an apparent value for Mr about 5 units higher than the value of 12,359 obtained at an $m_a$ of 1.27, the highest point on the ridge. Indeed, in the case of the spectrum of FIG. 1 a simple two point recalibration of the m/z scale, with no corrections for non-linearities, resulted in a deconvoluted value for Mr of 12,361 at an apparent value for $m_a$ of 1.09. The true value of Mr, obtained from the known sequence of amino acids for this compound, is 12,360.

Figure 2B:
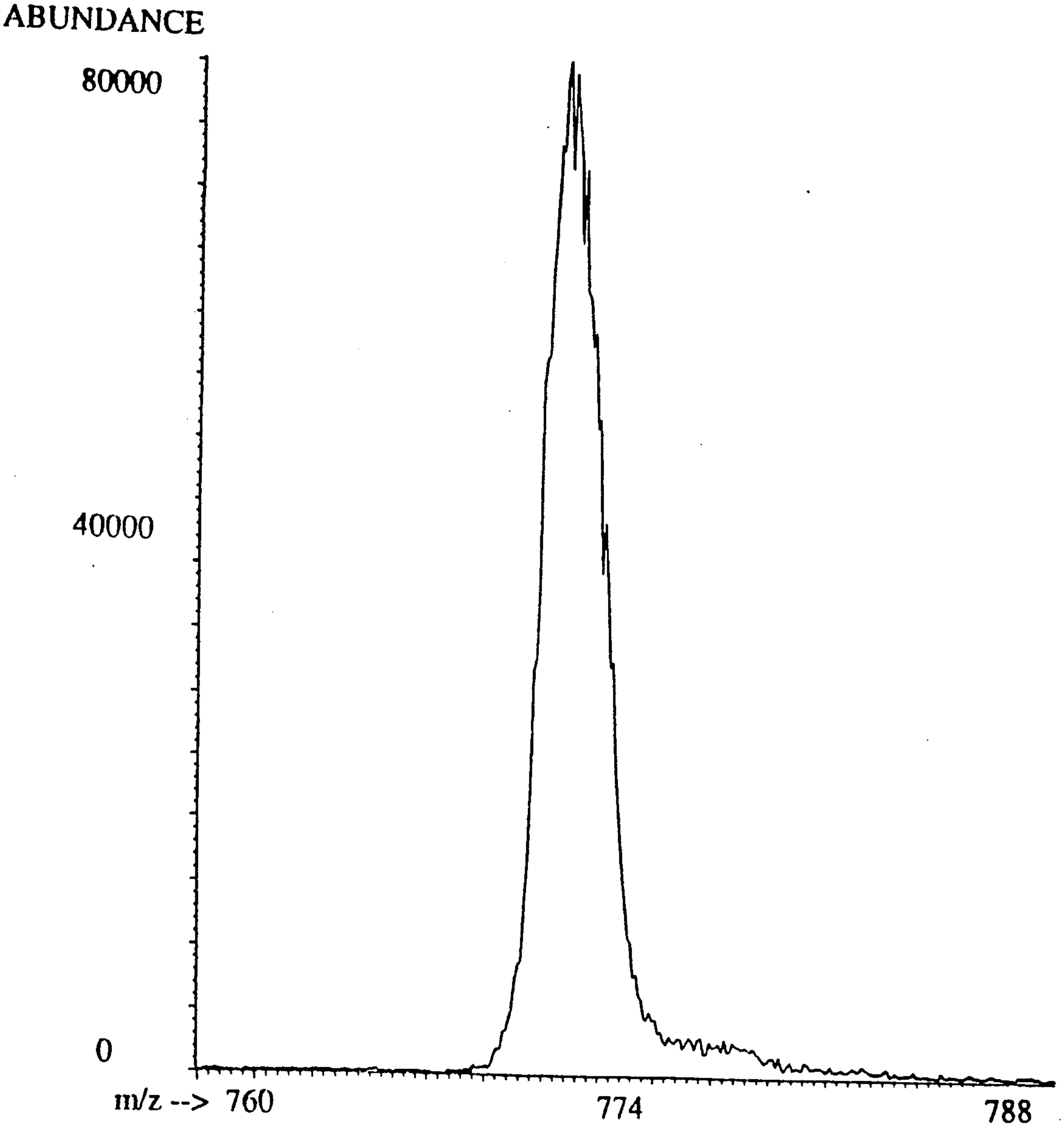

In addition to the accuracy of the scale calibration, the quality of the measured spectrum is also an important factor in determining the accuracy with which Mr can be measured. Spectra with sharp, narrow peaks provide more reliable values than spectra with peaks that are broad or poorly shaped. Observed peak widths and shapes depend upon a number of factors including isotope spread, compound heterogeneity, extent of ion solvation, variation in identity (i.e mass) of adduct charges, and instrument resolving power. To illustrate the effect of resolving power we will compare results obtained with the spectra of FIGS. 1 and 2 which were obtained under identical conditions except that the resolution in FIG. 1 was 800 and in FIG. 2 was 500. (In the following discussions they will be referred to respectively as the "higher resolution spectrum" and the "lower resolution spectrum.") As is clear from comparison of the peaks for ions with 16 charges in FIGS. 1*b* and 2*b*, the peaks in FIG. 2 are broader than those in FIG. 1. This increase in breadth both widens and lengthens the ridges in the 3 surface for the lower resolution spectrum shown in FIG. 5 relative to the ridges in the 3D surface for the higher resolution spectrum shown in FIG. 3. This increase in length and width of the ridges results in a decrease in both the precision and accuracy with which Mr can be determined. It is important, therefore, to examine the origin of these ridges in and how they relate to the properties of the measured spectrum.

The Origins and Significance of Ridges in 3D Mass Spectra

As already pointed out, for any single species large enough and sufficiently polar to retain a plurality of charges, the ES mass spectrum comprises a sequence of peaks, all of which are due to ions comprising the same parent molecule with varying numbers of adduct charges of mass $m_a$. Associated with the ions of any peak in the sequence are the three variables Mr, $m_a$, and i. Therefore, the number of charges on the ions of each peak can be readily determined from the m/z values of any three peaks in the sequence. For any peak in the sequence we can write:

$$m_a = x_b - Mr/i \quad (4a)$$

where i is the number of charges on the ions of the peak, $m_a$ is the mass of each charge and Mr is the molecular weight of the parent species, as before. However, to represent the value of m/z for the ions of the peak we used the symbol x. For a particular values of x and i a plot of $m_a$ vs Mr would be a straight line comprising the locus of all values of these two variables that satisfied Eq. 4a for those particular values of x and i.

These observations apply only to peaks of infinitesimal width for which there is no uncertainty in the value of m/z. As noted above, however, peaks in real spectra have an appreciable width. Even when all the ions have precisely the same mass and the same number of charges, the fact that the resolving power of any analyzer is limited means that those identical ions produce signal over a small but finite interval of m/z. Moreover, for almost all samples of almost all species the ions do not all have precisely the same mass because their component atoms include more than one isotope. For example, the natural abundance of carbon 13 is such that one out of every 100 carbon atoms in a molecule or a population of molecules has a mass one Da higher than the other 99. Thus, what might appear as a single broad peak in a spectrum obtained with a low resolution analyzer would be revealed as a multiplicity of closely spaced peaks if the spectrum were to be obtained with an analyzer having high resolution. The extent of that multiplicity would depend on the number of carbon atoms per ion in the population represented by the peak. Similar peak multiplicity can result in cases for which other species of atoms in the ions comprise mixtures of isotopes. The implications of resolution with respect to peak coherence and "adjacency" will be discussed after in more detail.

Figure 6A:
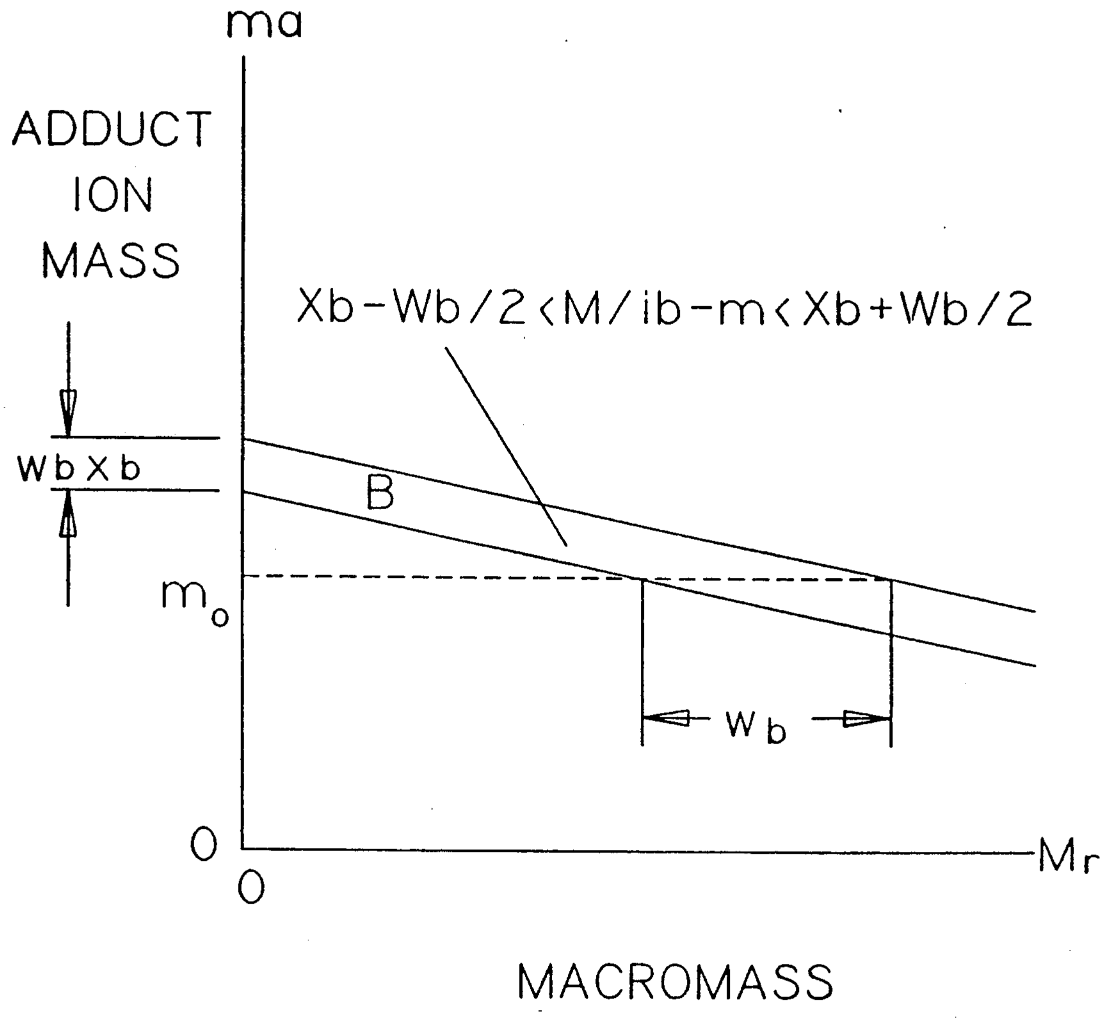
FIG. 6*a*–*d*. The region B between the two lines in FIG. 6*a* includes all points corresponding to combinations of parent ion mass Mr and adduct ion mass $m_a$ that could give rise to the m/z value of one particular peak in the measured mass spectrum for multiply charged ions of a single parent species. The distance L between the two lines at a constant value of $m_a$ represents the uncertainty in the value of m/z for the particular peak in the measured spectrum.

Whether due to isotope spread or imperfect resolution, the result of significant peak width is an uncertainty in the value of m/z In this consideration w allow for that uncertainty by replacing Eq. 4a with the pair of equations:

$$m_a = x_b + w_b/2 - Mr/ib \quad 4b$$

$$m_a = x_b - w_b/2 - Mr/ib \quad 4c$$

where w is the peak width, arbitrarily taken to be FW.95M, as described above. Eqs. 4b and 4c are represented respectively by the pair of parallel lines enclosing area B in FIG. 6*a*. This area is the locus of all points corresponding to values of $m_a$ and Mr that are within the uncertainty distance of w/2 units of m/z from the straight line defined by Eq. 4a. That line, it will be recalled, represents the locus of all points corresponding to values of $m_a$ and Mr that would satisfy Eq. 4 for a particular value of i. In other words, any combination of values for Mr and $m_a$ that falls in region B would be consistent with a peak of width w at $x_b$ when $i = i_b$. Clearly, our subject peak at xb does not contain enough information to specify particular values for either M or $m_a$ because region B covers a very wide range of possible values.

However, the procedure that led to defining area B for a peak with an m/z value of $x_b$, can be repeated for another peak in the sequence. Thus, for example, the adjacent peak at an m/z value of $x_c$ will define region C in FIG. 6*b* that is the locus of all combinations of values for Mr and $m_a$ of ions that could contribute to a peak with an m/z value of $x_c$. The area $X_{bc}$ in the shape of a parallelogram that is common to regions B and C includes only those values of Mr and $m_a$ that could be associated with the ions of both the peak at $x_b$ and the peak at $x_c$. This common area defines the range of values for Mr and $m_a$ over which ions of both peaks contribute to the height of the ridge above it. The length of the ridge is taken as the projection of the ridge contour at FW.95M on the Mr scale and is represented by L2 in FIG. 6*b*. It is the distance on the Mr scale (abscissa) between the vertices of the parallelogram that are located respectively at Mr'2 and Mr"2. The vertex at Mr' is formed by the intersection of the lower borderline of region C with the upper borderline of region B and the vertex at $Mr_2''$ by the intersection of the lower borderline of region B with upper borderline of region C. The two peaks are adjacent so that their ions differ by one charge. Therefore, The distance $L_2$ can be represented by:

$$L_2 = Mr_2'' - Mr_2' = (w_c + w_b)(i_b - 1)i_a \qquad (5a)$$

Figure 6B:
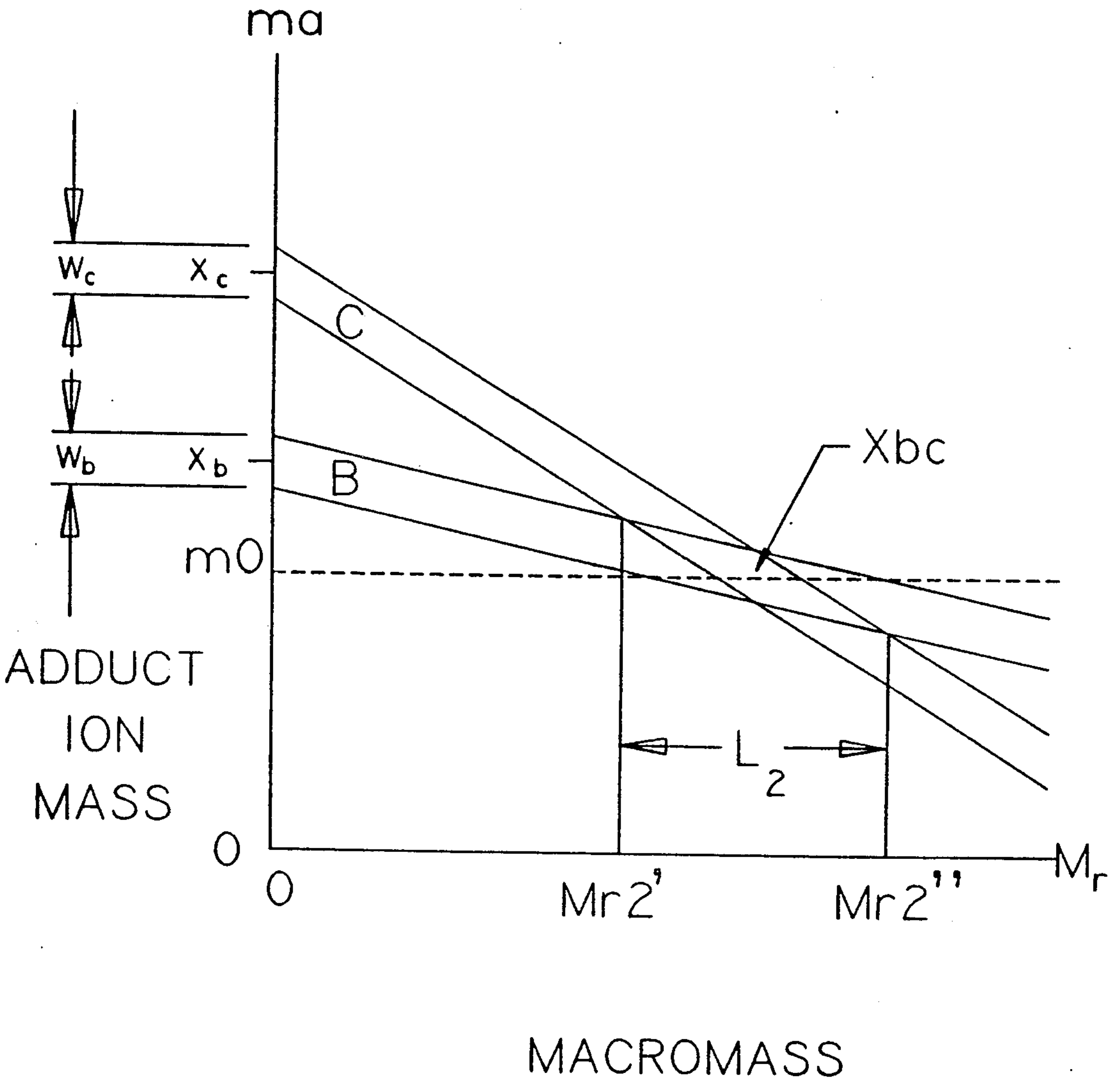

For the simple idealized case in FIG. 6*b*, two adjacent peaks with the same width, Eq. 5a shows that the length L of the region of overlapping values of Mr and $m_a$ increases as the width of the peaks and/or the charge on their ions increase. The point corresponding to values of Mr and $m_a$ consistent with m/z values for ions of both peaks could be anywhere in this overlap region. In other words, the uncertainty in the value of $M_r$ increases with the length of the ridge.

Figure 6C:
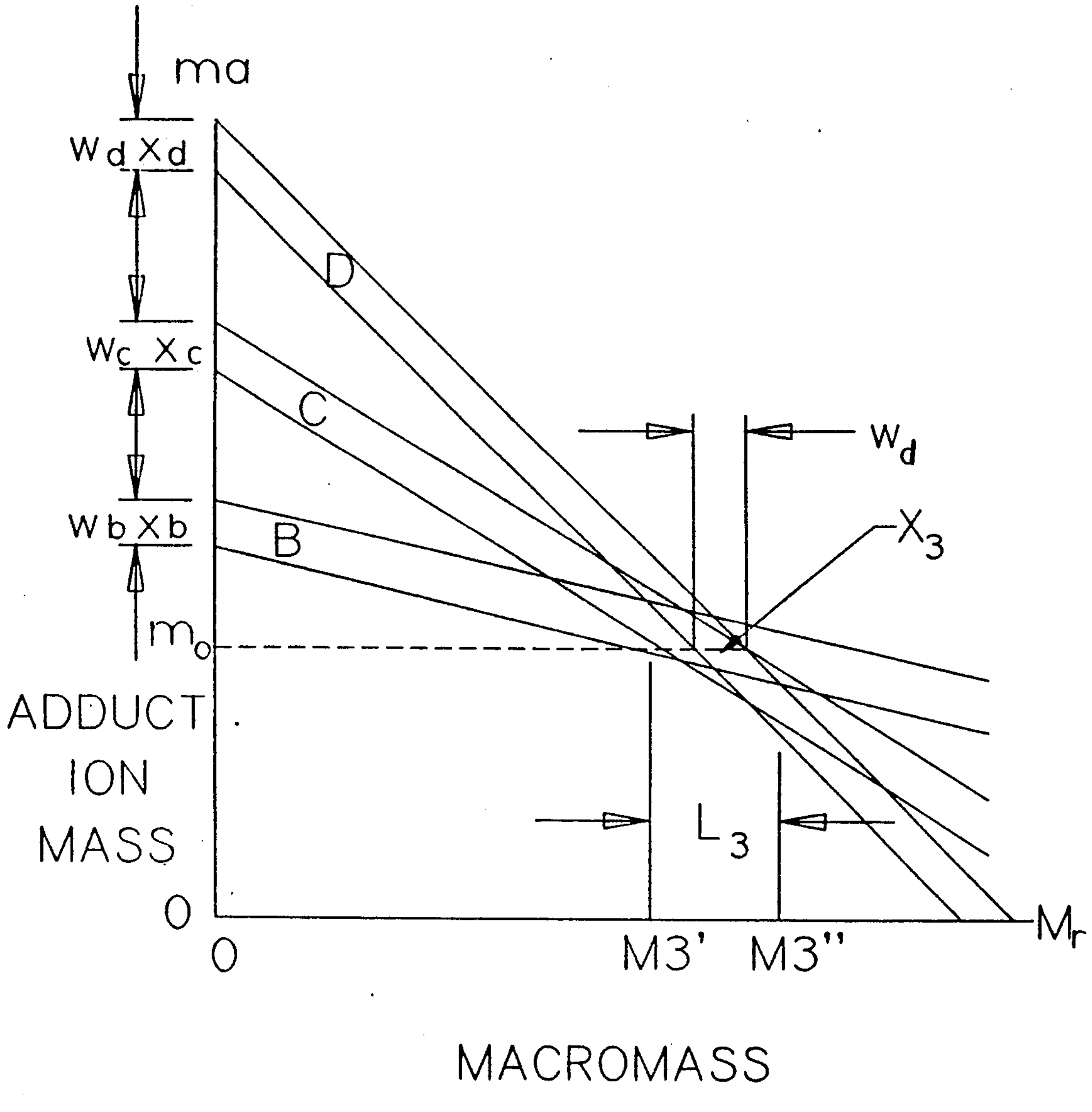
Figure 6D:
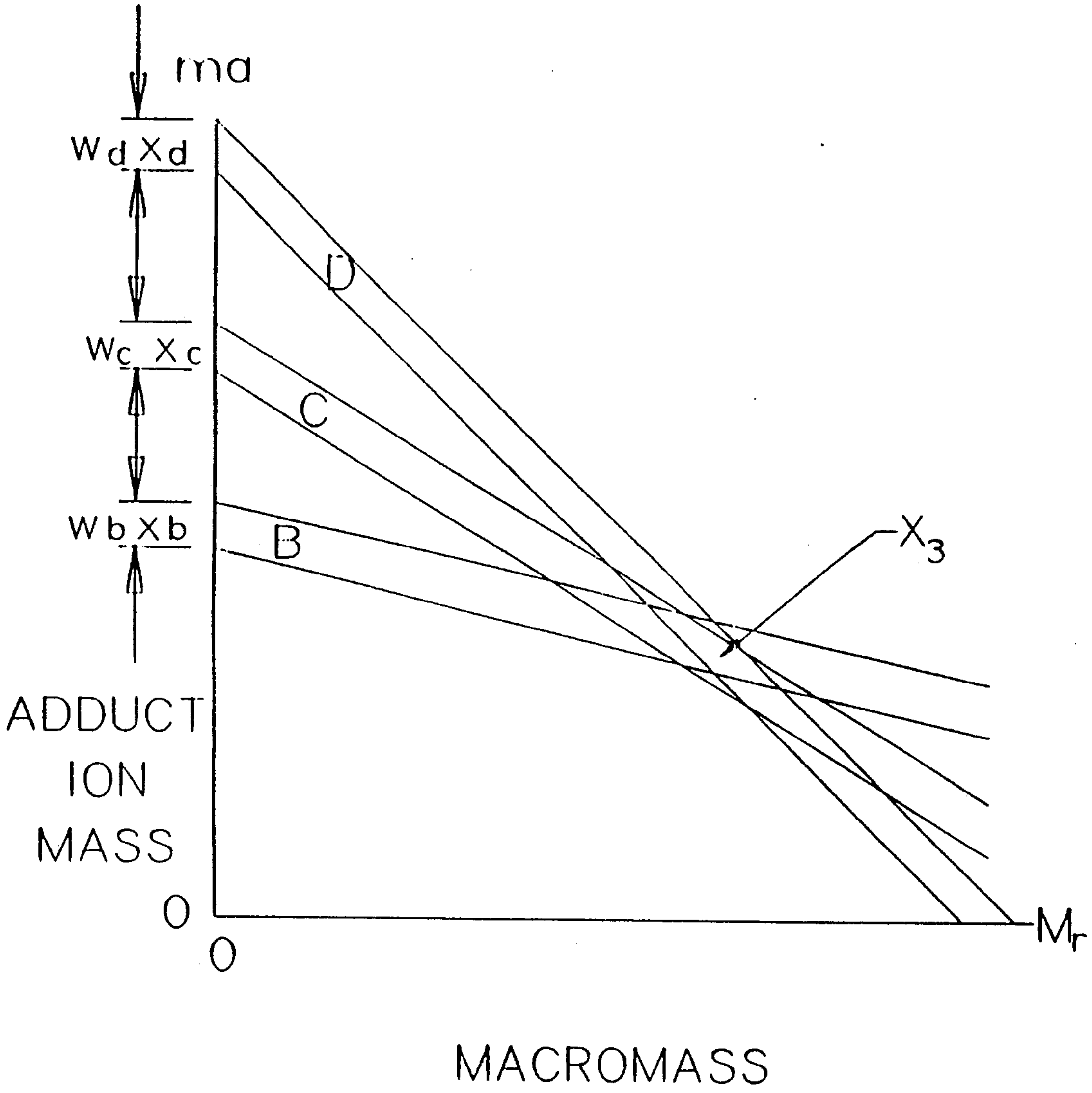

We now consider a third peak in the sequence with an m/z value of $x_d$ which by the procedure applied to the first two peaks gives rise to a region D. It is possible that the intersection of region D with regions B and C could occur at some distance from the intersection of B and C thus producing three separated areas of doubly overlapping regions. That would mean that the ions of those three peaks did not all share common values for $M_r$ and $m_a$ and, therefore, the peaks were not part of a coherent sequence. If the third peak were "coherent" with the first two, all three of the intersections of regions B, C, and D would have to overlap, at least to some extent, as shown in FIG. 6*c*. That is to say, their ions would have the same values for $M_r$ and $m_a$ within the uncertainty of the measurement. In the case of such common coherence, the largest possible area of the triply overlapped region is defined by the intersection of the regions associated respectively with ions in the lowest and highest charge state because they have respectively the largest and smallest slopes. This picture is valid if the peak widths are nearly the same or decrease with increasing charge state, as indeed they should, and if the centerlines of all three regions intersect at the same point. The length $L_3$ of such a triply overlapped region, i.e. the length of the ridge at the contour for 0.95 of the maximum height, is given by $$L_3 = Mr_3 - Mr_3' = (w_b + w_d)(i_b - 2)i_b/2 \qquad (5b)$$

Eq. 5b can easily be generalized to the case of n "coherent" peaks. Again, as long as the specified "ideality" holds, the maximum "length" L of the ridge at the 0.95M contour is determined by the regions of smallest and largest, slopes, corresponding respectively to the peaks for ions with the smallest and largest charge states or values of i. Then $$L = Mr_n'' - Mr_n' = (w_b + w_n)(i_b - n + 1)i_b/(n-1) \qquad (6)$$

The length of this intersection ridge is important because it is a measure of the accuracy of the mass measurement. Clearly, the larger the number r: of peaks in the coherent sequence, and/or the smaller are their widths, the smaller is the uncertainty of the mass determination. "Uncertainty" here refers only to the random errors. Any systematic errors, due for example to an offset that is the same over the whole m/z scale because of poor calibration, will not affect the dimensions of the overlap region or, therefore, the length of the ridge. Equation 6 would apply in such a case but would not reveal the presence of such an error. If, on the other hand, the error in m/z varies at different positions on the analyzer scale, then Eq. 6 cannot be counted upon to provide a reliable value for the maximum dimension of the overlap region. Such a variable offset error would result in larger uncertainties in values for $M_r$ and $m_a$ that could be obtained from the spectrum. We arrived at Eq. 6 by considering an idealized spectrum. In real spectra, peak shapes as well as scale calibration have significant effects on the accuracy of mass assignment. Even so, Eq. 6 is useful because it shows the relation between the length of a ridge on the 3D surface and the charge state of the ions, the number of peaks in the spectrum, and the width of those peaks.

Figure 7A:
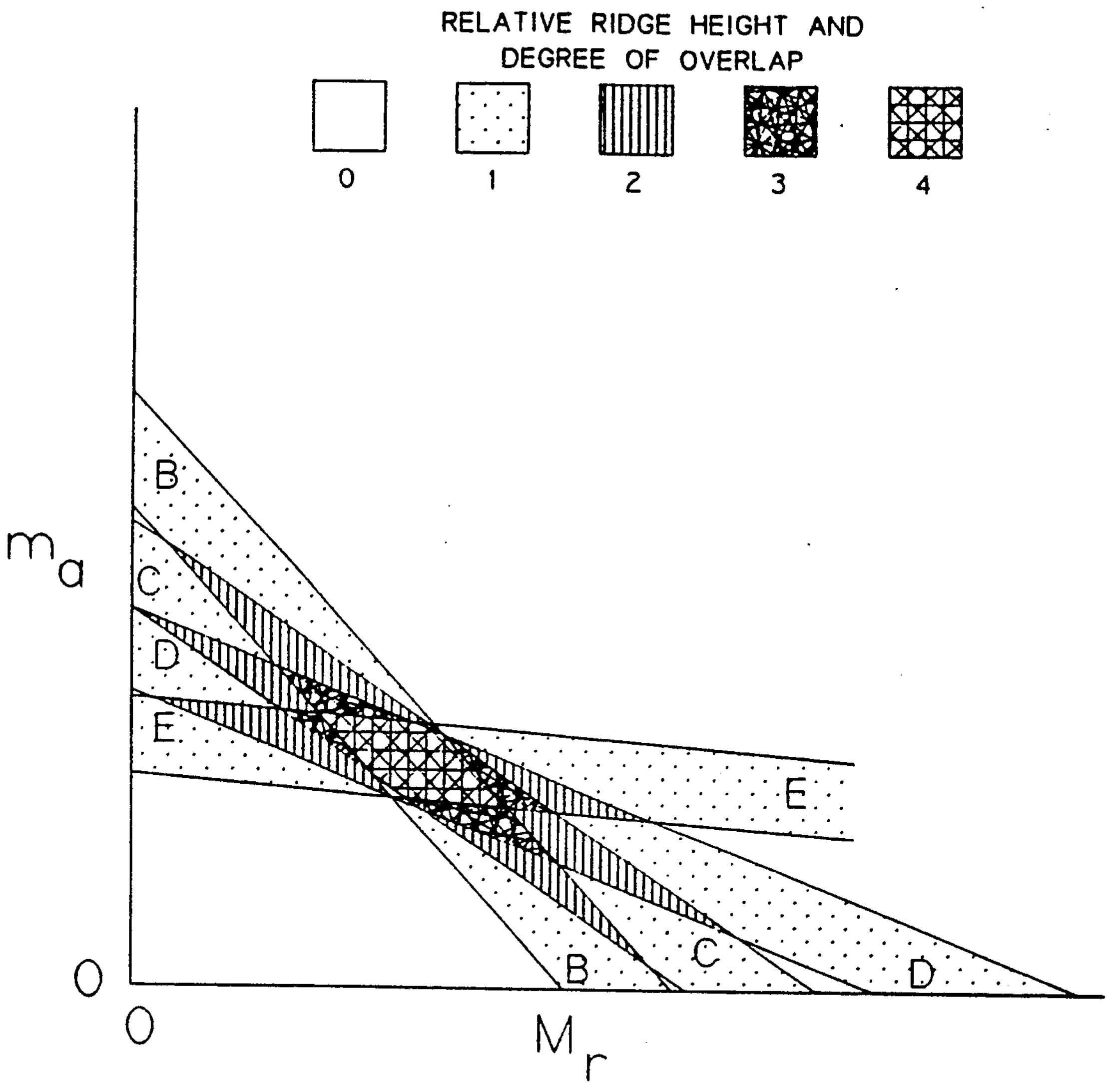
FIG. 7*a*–*b*.

FIG. 7*a* illustrates a case in which four peaks are taken into account, giving rise to regions B,C,D and E corresponding respectively to peaks whose ions have increasing numbers of charges. The speckled areas are those in which there is no overlap. The areas in which two regions overlap, i.e. there are contributions from ions of two peaks, are indicated by shading with vertical lines. Areas common to three regions have continuous shading and the area common to all four is the cross-hatched central parallelogram. The situation is again idealized in that all peaks (regions) are assumed to have the same width. Moreover, these region bands are located so that their centerlines all have a common intersection point. Consequently, the overlap region common to all four has the maximum possible area. That is to say the four peaks have the maximum possible coherence. Therefore, one would feel quite confident that the coordinates of the center of the parallelogram represent the most probably correct values of Mr and m that can be obtained from the m/z values of the peaks in the source spectrum.

Figure 7B:
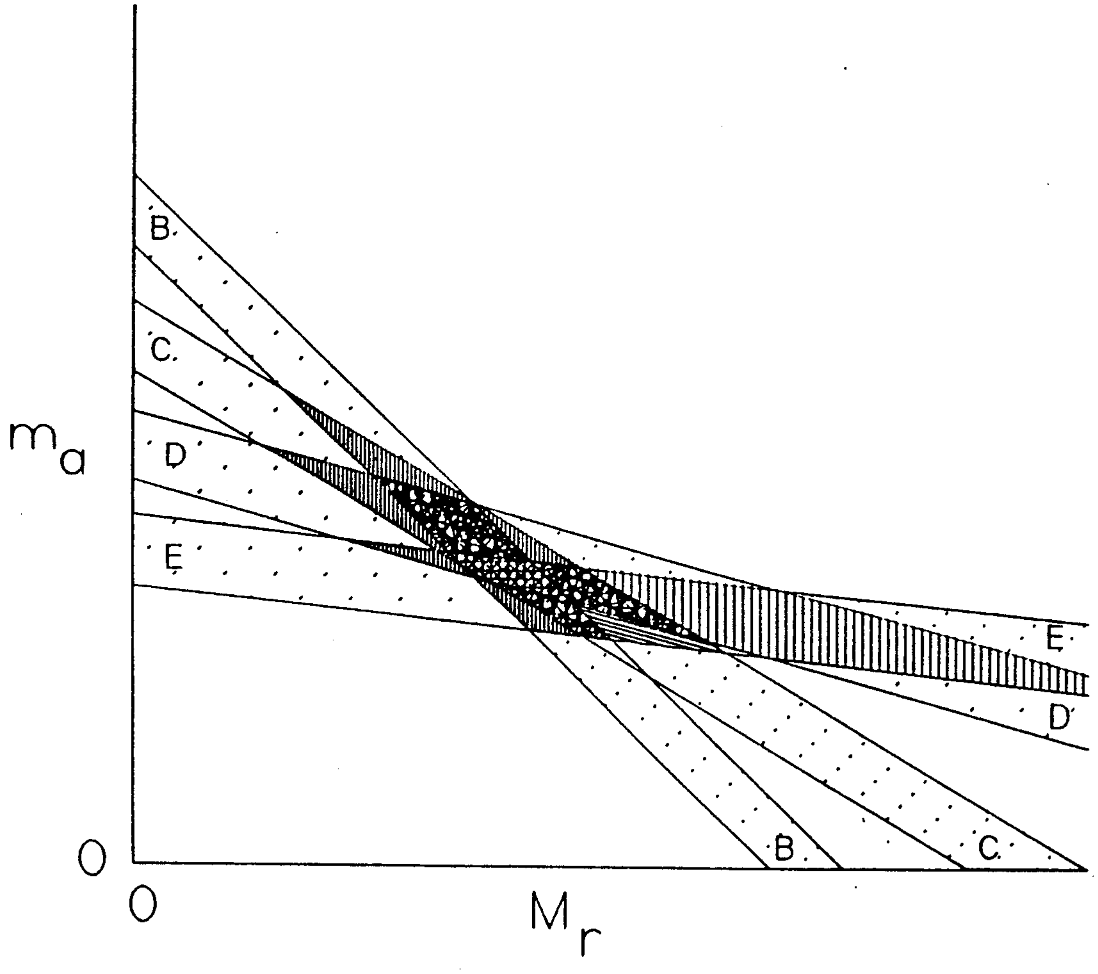

For "real" spectra the situation becomes more complex. For example, in FIG. 7*b* the band of region E in FIG. 7*a* has been displaced toward the Mr axis with the result that the cross-hatched region where all four bands overlap is significant smaller in area and in length L than its counterpart in FIG. 7*a*. Therefore, the four peaks giving rise to FIG. 7*a* have less coherence than those responsible for FIG. 7*b*. Consequently, one would have less confidence in values for Mr and $m_a$ as determined from the maximum of the peak height above the cross-hatched region. Clearly, the length of the cross-hatched region is less in FIG. 7*b* than in FIG. 7*a*, but the uncertainty in Mr and $m_a$ is greater. However, the displacement of region E greatly increased the overall length of the regions of double and triple overlap so that the total length of the ridge, including the sections of lower height over the areas of single, double and triple overlap, is substantially greater in FIG. 7*b* than in FIG. 7*a*. Thus, uncertainty in values for Mr and $m_a$ does indeed increase as the total length of the ridge increases even though the maximum peak height occurs within the same range of Mr and $m_a$ in both FIG. 7*a* and 7b. It should be noted that the representations in FIGS. 6 and 7 are caricatures in which ridge features have been exaggerated in order to make them distinguishable. Bands defining the actual widths, slopes and intercepts of the various regions, as well as the areas of overlap, would be smaller and less discernible. The contour map of a ridge on a "real" 3D surface in FIG. 3*b* gives some idea of what FIG. 7*b* might have looked like had it been drawn in realistic proportions. The extent of uncertainty in the values of Mr and $m_a$ determined from the 3D surface is indicated by the width of the ridge as well as by its length. That ridge width depends o both the locations and widths of the peaks in the measured spectrum. The width $w_b$ of region B in FIG. 6*a* at a particular value of $m_a$ is found from the intersections of the lines defined by Eqs. 4a and 4b with the line $m_a = m_o$. Thus, $$W_b = i_b w_b \quad (8a)$$

Similarly, the widths of regions C and D are $$W_c = (i_b - 1) w_c \quad (8b)$$

and $$W_d = (i_b - 2) w_d \quad (8c)$$

By direct extension the width of region N for the nth peak is $$W_n = (i_b - n + 1) w_n \quad (8d)$$

If the peaks in the measured spectrum are perfectly coherent and have the same width, the base of the ridge would have a width of $W_b$ while the width near the ridge apex (i.e. FW.85M) would be $W_n$.

Figure 8A:
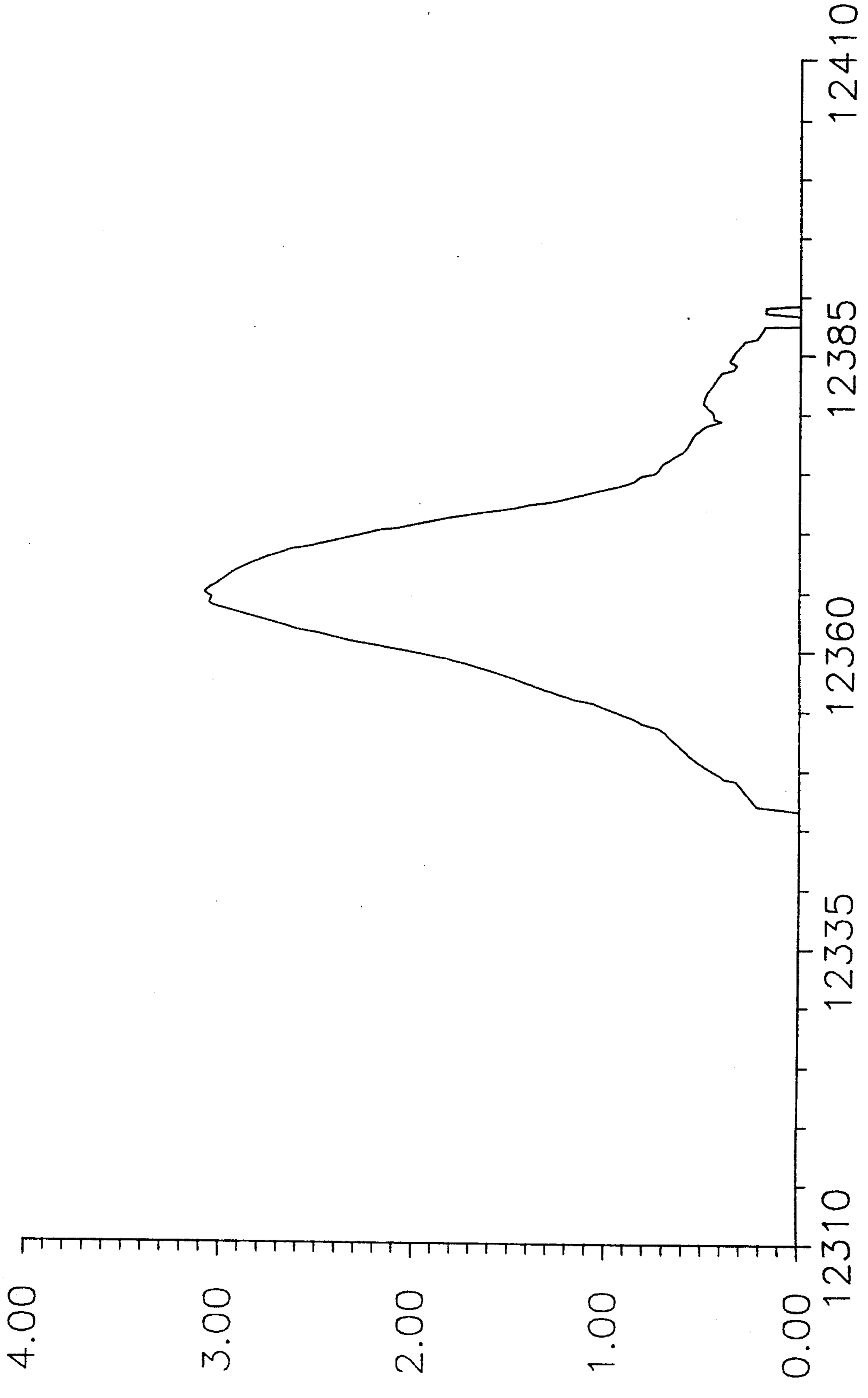
FIG. 8*a*–*b*.
Figure 8B:
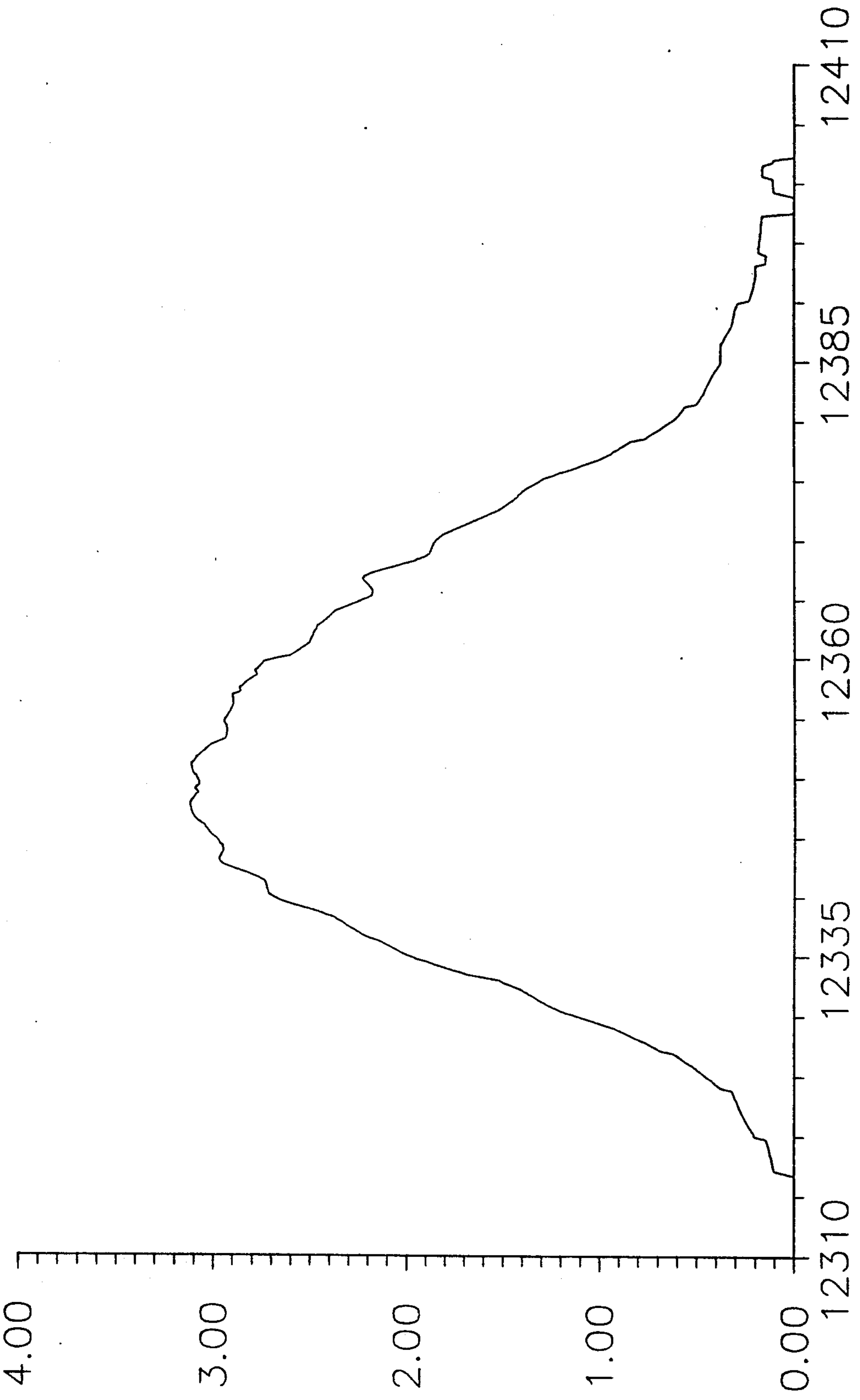

The effect of peak width on ridge width emerges clearly from a comparison of FIGS. 8*a* and 8*b* which show respectively the intersections of the $m_a = 1$ plane with the main ridges of FIG. 3*b* for the "high resolution spectrum" and with the main ridge of FIG. 4*b*. for the "low resolution spectrum." There are two important observations to be made. First, as indicated by Eq. 8c, the narrower peaks in the high resolution spectrum of FIG. 1 relative to the low resolution spectrum of FIG. 2 result in a narrower ridge width of FIG. 8*a* relative to that in FIG. 8*b*. Second, the "peak" (ridge cross section) in FIG. 8*a* is not only wider than the one in FIG. 8*b* but is also shifted toward a lower value of Mr. This shift is a direct reflection of the differences in shape and m/z value for the 16+ peaks shown in FIGS. 1*b* and 2*b*. This discussion of ridge formation and interpretation opens the possibility of using this three dimensional surface as a tool to check the calibration of a mass spectrometer and perhaps provide a means for recalibrating the mass spectrometer. The 3D surface would certainly indicate if the calibration of the mass spectrometer were incorrect. Indications of miscalibration would be "unrealistic" values for the adduct ion mass and broad, poorly defined ridge formations. If either of these is encountered, the calibration of the mass spectrometer should be checked. The question of whether the 3D surface can be used to recalibrate a mass spectrometer is more difficult to answer. It can be used for this purpose in certain situations. For example, if the maximum occurs at a macro mass (Mr) corresponds to the mass of the sample, but the calculated adduct ion mass is "unrealistic" the zero offset of the mass spectrometer is incorrect and should be adjusted. If the calculated macro mass is incorrect and the adduct ion mass is unrealistic, then further adjustment should be made to maximize the amplitude of the calculated signal and to decrease the size of the ridge. This could be done iteratively by first performing a 3D deconvolution then looking back at the measured spectrum to see if the maximum obtains signal from the highest point in each of the peaks in the measured spectrum. The differences should be noted and the mass spectrum adjusted so that to bring the measured peaks into perfect alignment with the calculated peaks. This scheme, however, would only work if the degree of miscalibration is not severe and most of the peaks initially coincide with the contributions to the maximum calculated signals. The adjustment of the few peaks that do not coincide should, in this case be straight forward. Calibration, of course is easier if the molecular weight of the sample is known beforehand or if at least one of the multiply charged peaks is located in a part of the measured spectrum which is known to be precisely calibrated. In either of these two cases, then the molecular weight of the parent molecule is known and the precise location of the peaks determined from $x = M/i + m$ for all peaks in the spectrum.

Ridge Multiplicity

The simple example just discussed illustrates how a single ridge is formed in a deconvoluted 3D surface and how its features relate to the quality of the original measured spectrum. However, FIGS. 3 and 4 show two side ridges in addition to a central main ridge. We now examine the origin and meaning of the side ridges.

First we recall how the deconvolution of a measured spectrum in accordance with Eq. 2 gives rise to a single peak in a plane of constant $m_a$. In effect, the computer produces a fictional spectrum for each of a series of "test" species whose Mr values are separated by some arbitrarily chosen amount, e.g. 2 units. The fictional spectrum for each test species comprises all "peaks" (m/z values) obtained by providing that test species with each of all possible integral numbers i of adduct charges of specified $m_a$ within a chosen interval. The range of values for Mr and the interval of integral charge numbers are truncated so that they include only those combinations that produce m/z values within the range embraced by the measured spectrum. Each of these fictional spectra is compared with the measured spectrum. To obtain a deconvoluted spectrum, the computer sums the heights (h's) of peaks in the measured spectrum at all m/z values for which there are peaks in the fictional spectrum for the test species. This procedure is repeated for all possible test species. Thus the deconvoluted spectrum will have a peak at the Mr value of each test species for which there is at least one peak in both the measured and fictional spectra. The highest peak in this deconvoluted spectrum will clearly be obtained for a test species having the same Mr as the measured species because it will include contributions from all the peaks in the measured spectrum. Note that the deconvoluted spectrum obtained in this way relates to a particular adduct ion mass $m_a$. If the procedure is repeated over a range of ma values there will result a set of deconvoluted spectra, one for each value of $m_a$. This collection of spectra can be represented by a 3D surface whose coordinates are Mr, $m_a$ and H. The contours of the surface are such that its intersection with a plane of constant $m_a$ will produce a curve that is the spectrum obtained by the use of that value of $m_a$ in the deconvolution A ridge in that 3D surface represents the trace of all peaks in the collection of deconvoluted spectra corresponding to a test species with a particular value of Mr. Each peak contributing to that trace differs from the other peaks only the mass $m_a$ of the adduct charge.

In sum, if there is more than one ridge in the 3D spectrum there may be more than one peak in a plane of constant $m_a$ that intersects that surface. Conversely, if there is more than one peak in any spectrum resulting from the 2D deconvolution of a measured spectrum in accordance with Eq. 2, there must be more than one ridge in the 3D convolution. Thus, to learn how multiple ridges can occur in the deconvoluted 3D spectrum is tantamount to learning how multiple peaks can occur in the deconvoluted 2D spectrum. We will now illustrate by specific numerical examples two ways in which such multiple peaks can arise.

First we consider the ESMS spectra that would be produced from compounds of similar structure and composition with Mr values of 6,000 8,000, 9,000, 12,000, 15,000, 16,000 and 18,000. For arithmetical simplicity we assume that $m_a$, the mass of each adduct charge is zero so that the value of m/z for each peak in the spectrum is simply Mr/i where i is the number of charges on the ions for that peak. We further assume that there is a peak of infinitesimal width for each integral value of i between some minimum and some maximum value. Because 18,000 is exactly 4/3 of 12,000, the spectra for Mr =18,000 and Mr =12,000 will have peaks with identical values of m/z for each value of i in the former that is 4/3 of a value of i in the latter. Similarly, a peak in the spectrum for Mr =8,000 will have the same m/z value as a peak in the spectrum for Mr =12,000 when the i value for former is $\frac{2}{3}$ of the i value for the latter. In we show all the m/z values for all peaks in the spectrum for Mr =12,000 with i values from 6 through 18. Also shown are m/z values of peaks in the spectra for Mr =6,000, 8000, 9000, 12,000, 15,000, 16,000 and 18,000 that coincide with a peak in the spectrum for Mr =12,000.

TABLE 1

Selected Values of m/z for ESMS Spectra of Three Compounds
Mr:m/z

| | | | | | | | | | | | | |
|---|---|---|---|---|---|---|---|---|---|---|---|---|
| 18,000:2000 | | 1500 | | 1200 | | 1000 | | 857 | | 750 | | 667 |
| 16,000:2000 | | | 1333 | | | 1000 | | | 800 | | 667 | |
| 15,000: | | 1500 | | | | 1000 | | | | 750 | | |
| 12,000:2000 | 1714 | 1500 | 1333 | 1200 | 1091 | 1000 | 923 | 857 | 800 | 750 | 706 | 667 |
| 9,000: | | 1500 | | | | 1000 | | | | 750 | | |
| 8,000:2000 | | | 1333 | | | 1000 | | | 800 | | | 667 |
| 6,000:2000 | | 1500 | | 1200 | | 1000 | | 857 | | 750 | | 667 |

It is clear from the table that the parent species with an Mr of 12,000 would give rise to peaks at 13 values of m/z in this range. Moreover, species with Mr's of 6,000 and 18,000 would give rise to peaks at 7 of those 13 values. Similarly, species with Mr's of 8,000 and 16,000 would produce peaks at 5 of those 13 values for m/z, and species with Mr's of 9,000 and 15,000 would produce peaks at 3 of them.

We now consider a measured spectrum, for example one obtained with an actual parent species having an Mr of 12,000 so that it would have a peak at each of the m/z values shown in Table 1. We instruct a computer to consider a "test" parent species with some particular value of Mr and to determine the m/z values at which peaks would result from providing that test parent species with some integral number of adduct charges of zero mass. The computer then scans the measured spectrum and stores the value of the height of any peak that has the same m/z value as the peak "synthesized" by assigning the test parent species with a particular number of charges. The computer repeats this process for all numbers of charges that would give rise to m/z values for the test species within the range of m/z values in the measured spectrum. It then sums all the recorded values. Thus, if the test species has an Mr of 12,000, for example, the computer would sum the heights for all the peaks in the measured spectrum for the actual parent species (for which Mr is also 12,000)of which 13 are shown in the table. Similarly, when the test species has an Mr of 8,000 or 16,000, the computer would sum the peak heights in the measured spectrum only at the 5 m/z values of 2000, 1333, 1000, 800 and 667. Or, when the test species has an Mr of 9,000 or 15,000 the computer would sum the peak heights in the measured spectrum at 1500, 1000 and 750, and so on. If we ignore all other possible test species that might produce some peaks at m/z values found for at least some peaks in the measured spectrum the spectrum resulting from this partial deconvolution of the measured spectrum would comprise 7 peaks at Mr values of 6,000, 8,000, 9,000, 12,000, 15,000, 16,000 and 18,000. Clearly, the peak at 12,000 would be the largest because it summed contributions from all the peaks in the measured spectrum. On the other hand, the "side band" peaks at 9,000 and 15,000 would be the smallest because their height would comprise contributions from only 3 peaks in the measured spectrum. Peaks due to test species of 8,000 and 16,000 would be intermediate in height because five peaks in the measured spectrum would have contributed. Somewhat higher than these peaks would be those at 6,000 and 18,000 because their heights included contributions from seven peaks in the measured spectrum. It follows that after the computer has carried out this procedure for test species with all possible values of Mr and charge number it can combine the summed peak heights at each m/z value for each test species to produce a deconvoluted spectrum of peaks. There will be one of these deconvoluted peaks at each value of Mr for which the test species having that same Mr and some integral number of charges could give rise to a value of m/z for which there was an actual peak in the measured spectrum of the sample species whose Mr value was initially unknown. The Mr of the highest peak in this deconvoluted spectrum must be the Mr value for the unknown parent because it is the only one that includes contributions from every peak in the measured spectrum.

We have carried out this exercise on the assumption that the adduct charges had zero mass so that the deconvoluted spectrum had only two dimensions and comprised simple peaks in the $m_a=0$ plane. Clearly, we could carry out an entirely equivalent but somewhat more intricate procedure for a range of $m_a$ values to provide a deconvoluted spectrum comprising a 3D surface in which the peaks of the 2D spectrum become ridges. Also to be noted in this exercise is that the "incidental" coherences that lead to side peaks in each 2D spectrum are "exact" in the sense that they would occur even if the mass analyzer had such high resolving power that the widths of the measured peaks were nearly infinitesimal. In that case the "ridges" in the 3D spectrum would in fact be sequences of vertical lines in a vertical plane of infinitesimal thickness. Clearly, for an actual measured spectrum in which the peaks have finite widths, the possibility arises of incidental coherences that are "inexact." That is to say, apparent coherences can give rise to side peaks in the deconvoluted spectrum because a measured peak with finite width can partially overlap a peak of infinitesimal width in the fictional spectrum calculated for a test species, even when the m/z values of the real and fictional peaks are not exactly coincident.

A major source of such inexact coherences are what we refer to as "charge-shifted" peaks that result when two ions with different values of Mr and i can have m/z values that are quite close together. To illustrate this possibility we again consider a simple idealized case for which the adduct ion mass is zero. Table 2 shows m/z values that could be obtained for various combinations of mass and charge state. The set of values on the left are for Mr's of 14,000, 15,000 and 16,000 with respectively i−1, i and i+1 massless charges. Those on the left are for Mr's of 45,000, 46,000 and 47,000, again with respectively i-1, i and i+1 massless charges.

TABLE 2

Values of m/z for Various Combinations of Mr and i

| | m/z = Mr/i or Mr/(i ± 1) | | | | m/z = Mr/i or Mr/(i ± 1) | | |
|---|---|---|---|---|---|---|---|
| i | 14,000 (i − 1) | 15,000 (i) | 16,000 (i + 1) | i | 45,000 (i − 1) | 46,000 (i) | 47,000 (i + 1) |
| 8 | 2000 | 1875 | 1777 | 40 | 1154 | 1150 | 1146 |
| 9 | 1750 | 1660 | 1600 | 41 | 1125 | 1122 | 1119 |
| 10 | 1556 | 1500 | 1454 | 42 | 1098 | 1095 | 1093 |
| 11 | 1400 | 1363 | 1333 | 43 | 1072 | 1070 | 1068 |
| 12 | 1272 | 1250 | 1231 | 44 | 1047 | 1045 | 1044 |
| 13 | 1166 | 1154 | 1143 | 45 | 1023 | 1022 | 1022 |
| 14 | 1077 | 1071 | 1067 | 46 | 1000 | 1000 | 1000 |
| 15 | 1000 | 1000 | 1000 | 47 | 978 | 978 | 979 |
| 16 | 933 | 938 | 941 | 48 | 957 | 958 | 959 |
| 17 | 875 | 882 | 889 | 49 | 938 | 939 | 940 |
| 18 | 824 | 833 | 842 | 50 | 918 | 920 | 921 |
| 19 | 778 | 789 | 800 | 51 | 900 | 902 | 904 |

TABLE 2-continued

Values of m/z for Various Combinations of Mr and i

| | m/z = Mr/i or Mr/(i ± 1) | | | | m/z = Mr/i or Mr/(i ± 1) | | |
|---|---|---|---|---|---|---|---|
| i | 14,000 (i − 1) | 15,000 (i) | 16,000 (i + 1) | i | 45,000 (i − 1) | 46,000 (i) | 47,000 (i + 1) |
| 20 | 737 | 750 | 762 | 52 | 882 | 885 | 887 |

Inspection of the table reveals that the m/z values for the three parent species are exactly the same in the row for i=15, but show increasing divergence for larger and smaller values of i. Thus, when i =20, the peaks for the three species would not overlap unless the resolution of the mass analyzer were less than 100. For the species with higher Mr's on the right side of the table the situation is quite different. From i =41 through i =52 the spread in m/z values for all three species is never more than 6 units and over much of that range is 2 units or less. Clearly, from a measured mass spectrum of modest resolution the algorithm would produce artifact side peaks for Mr's of 46,000 and 44,000 almost as strong as the true primary peak at 45,000.

The central concern in this account relates to situations in which the mass of the adduct charge can vary so that an additional dimension is needed for adequate representation of the spectrum. This third degree of freedom enhances the possibilities for side-band ridges in 3D spectrum. To illustrate what can happen we consider a measured spectrum obtained from cytochrome C (e.g. FIG. 1) in terms of the following rearrangement of Eq. 1a:

$$m_a = x_i - Mr/i \tag{9}$$

The peaks of that (or any other) spectrum are said to be "coherent" if the values of Mr and $m_a$ are the same for each peak. Thus, for example, we can write for peaks with 12, 15, and 18 charges:

$$\begin{aligned} m_a &= x_{12} - Mr/12 \\ &= x_{15} - Mr/15 \\ &= x_{18} - Mr/18 \end{aligned} \tag{10a}$$

Where as before, x is m/z, Mr is molecular weight of parent species, i is the number of adduct charges and $m_a$ is the mass of each one. In the deconvolution procedure the computer compares all possible values of ($Mr/i + m_a$) (within the range of x covered by the spectrum) with all the measured x values and sums the height of each measured peak whose x value equals the value of ($Mr/i + m_a$) used in the comparison. Thus, for the three x values of Eq.10 we can also write:

$$\begin{aligned} m_a' &= x_{12} - Mr'/13 \\ &= x_{15} - Mr'/16 \\ &= x_{18} - Mr'/19 \end{aligned} \tag{10b}$$

where the number of charges i in the trial value of ($Mr/i = m_a$) has been increased by one relative to the number of charges on the measured peak. Similarly we can decrease i by one to get:

$$m_a'' = x_{12} - Mr''/11 \quad (10c)$$
$$= x_{15} - Mr''/14$$
$$= x_{18} - Mr''/17$$

Figure 11:
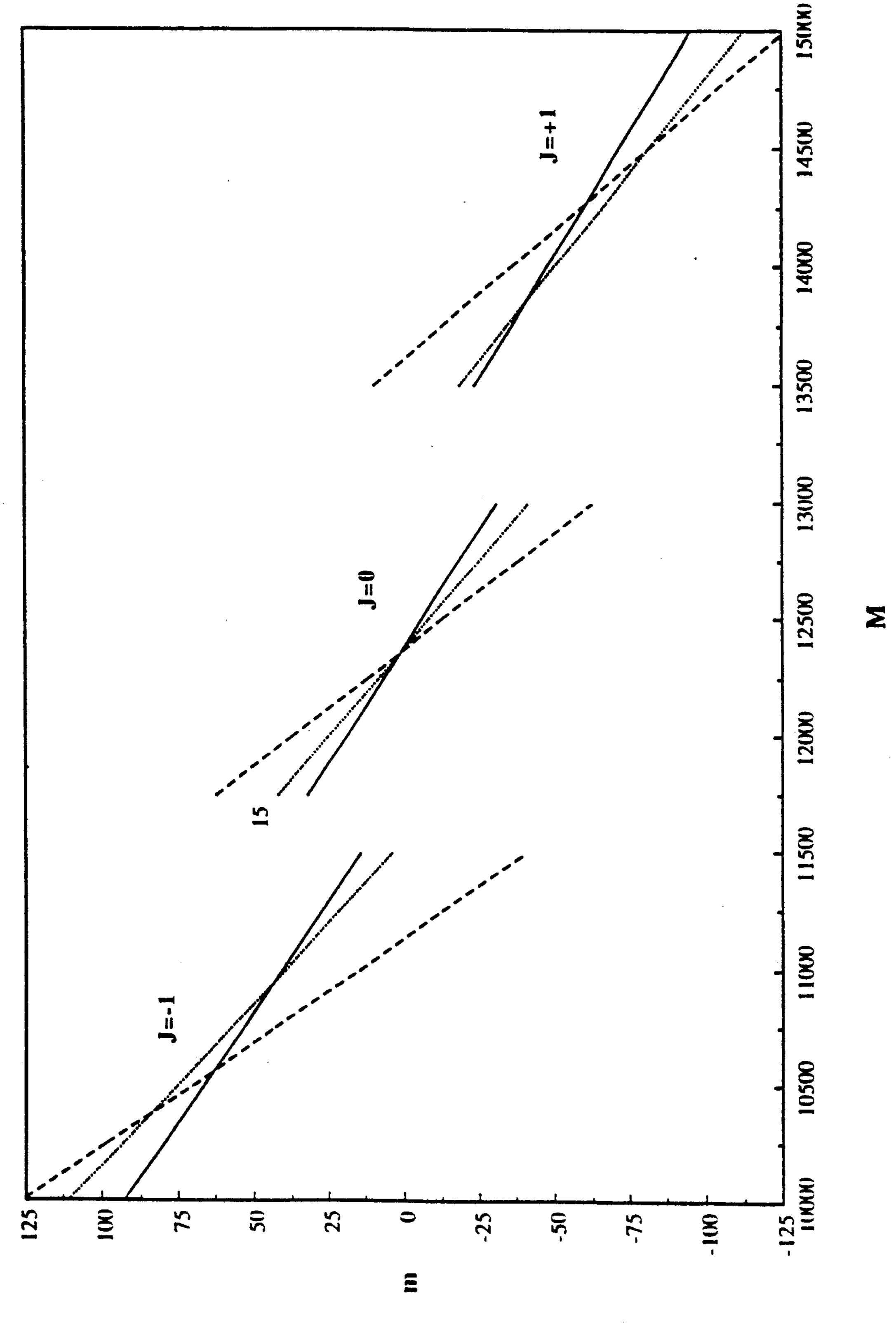
FIG. 11. Idealized representation of how the unfiltered deconvolution algorithm can produce side-band ridges from charge-shifting. The central set of lines corresponds to the actual number of charges on the ions of the measured spectrum. The set to the left results from the same set of m/z values when the nominal number of charges on each ion is increased by one. The set on the right results when that number of charges is decreased by one.

Each of Eqs. 10a, 10b and 10c can be represented by a straight line that is the envelope of all values of $m_a$ and Mr that exactly satisfy that equation. FIG. 11 shows the lines for each set of three equations. The central "triplet" of lines for Eqs. 10a corresponds directly to the measured spectrum. The three lines pass through the point whose $m_a$ and Mr coordinates are respectively 1 for the H+ adduct and 12360 for cytochrome C. Lines corresponding to the other charge states are not shown but they too would all pass through the same point. All of these lines are of infinitesimal width because they are calculated from the masses of the analyte and its adduct for which exact values have been assumed. Consequently, their intersection is a geometric point and the 3D spectrum resulting from deconvolution would comprise a single vertical line at that point. In an actual measured spectrum, as in FIGS. 1 and 2, the resolution would be finite and the lines would have a finite "width", i.e be replaced by pairs of lines a distance apart determined by the uncertainty in the measured values of m/z, as illustrated in FIGS. 6 and 7. Superposition would then produce a "ridge" whose length and width would depend upon the widths of the lines. As noted in the discussion of those figures the effective "widths" of the lines are determined by the effective resolution of the analyzer and any uncertainties due to random errors in measurement or inaccuracies in analyzer's m/z scale.

Figure 5A:
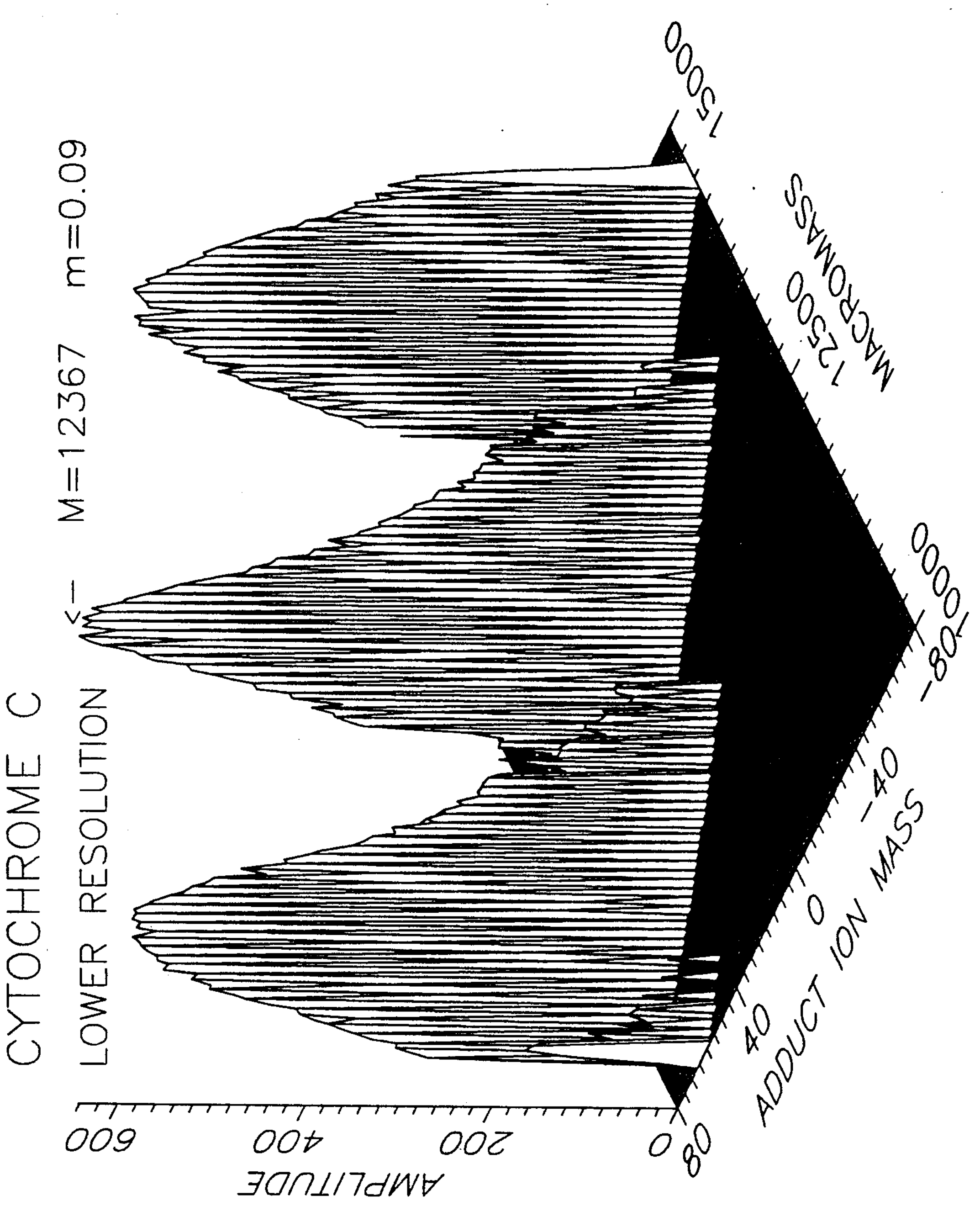
FIG. 5*a*–*b*. The upper panel 5*a* shows the 3D surface obtained by deconvoluting the mass spectrum for cytochrome c in FIG. 2*a* in accordance with the invention. The difference between 5*a* and 3*a* is that the former was obtained by mass analysis at a resolution of 500, the latter at a resolution of 300. Lower
Figure 5B:
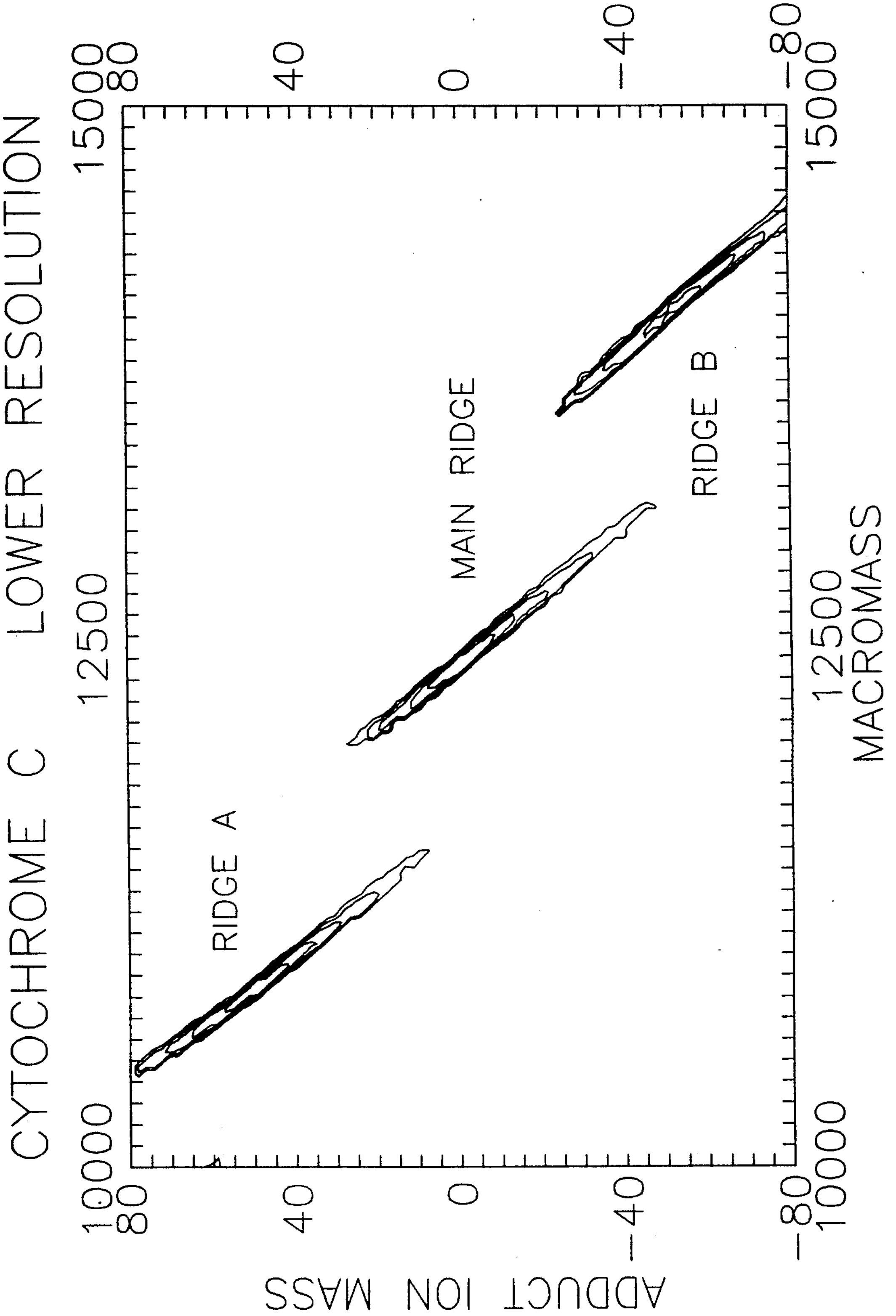
Figure 10A:
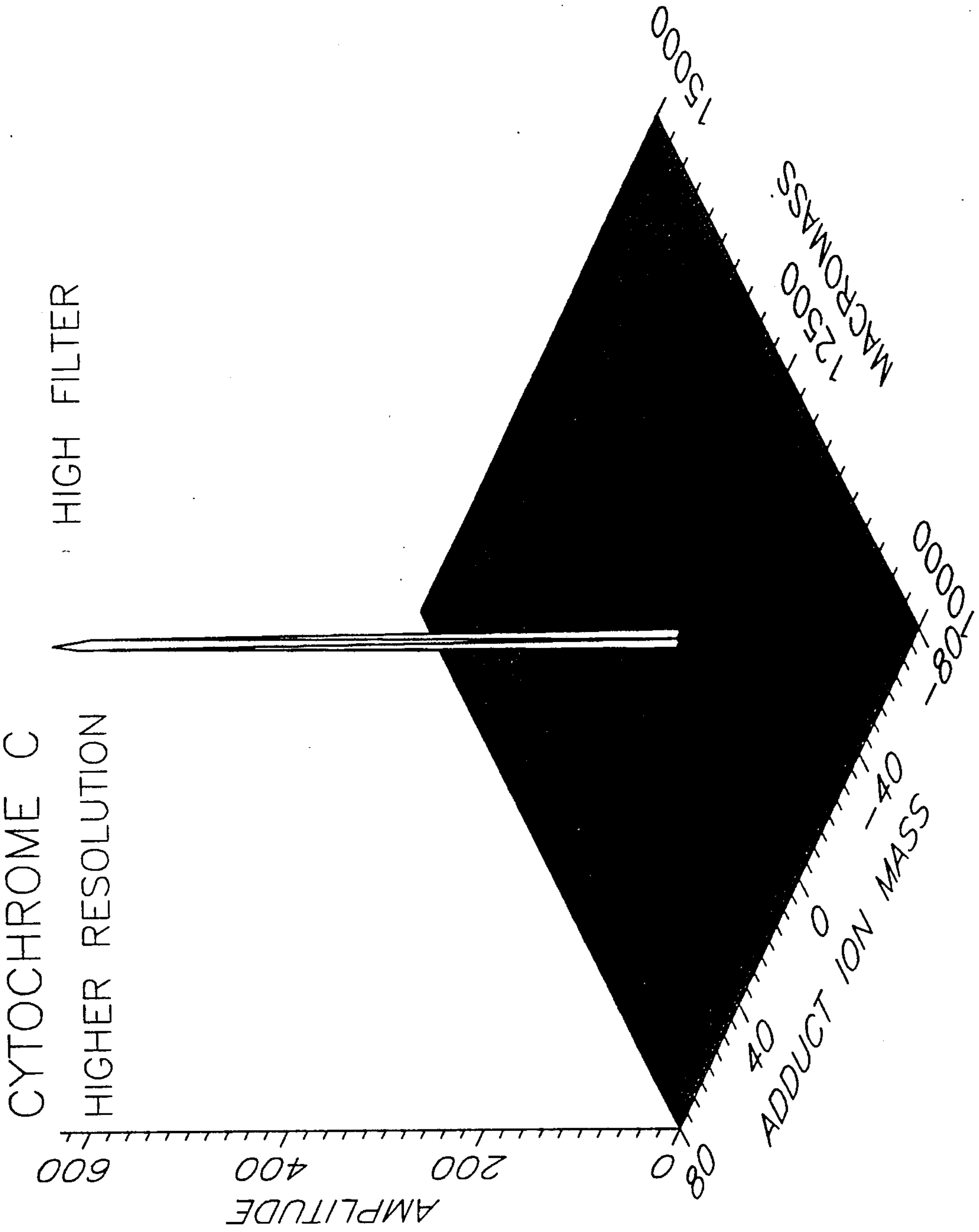
FIG. 10*a*–*b*.
Figure 10B:
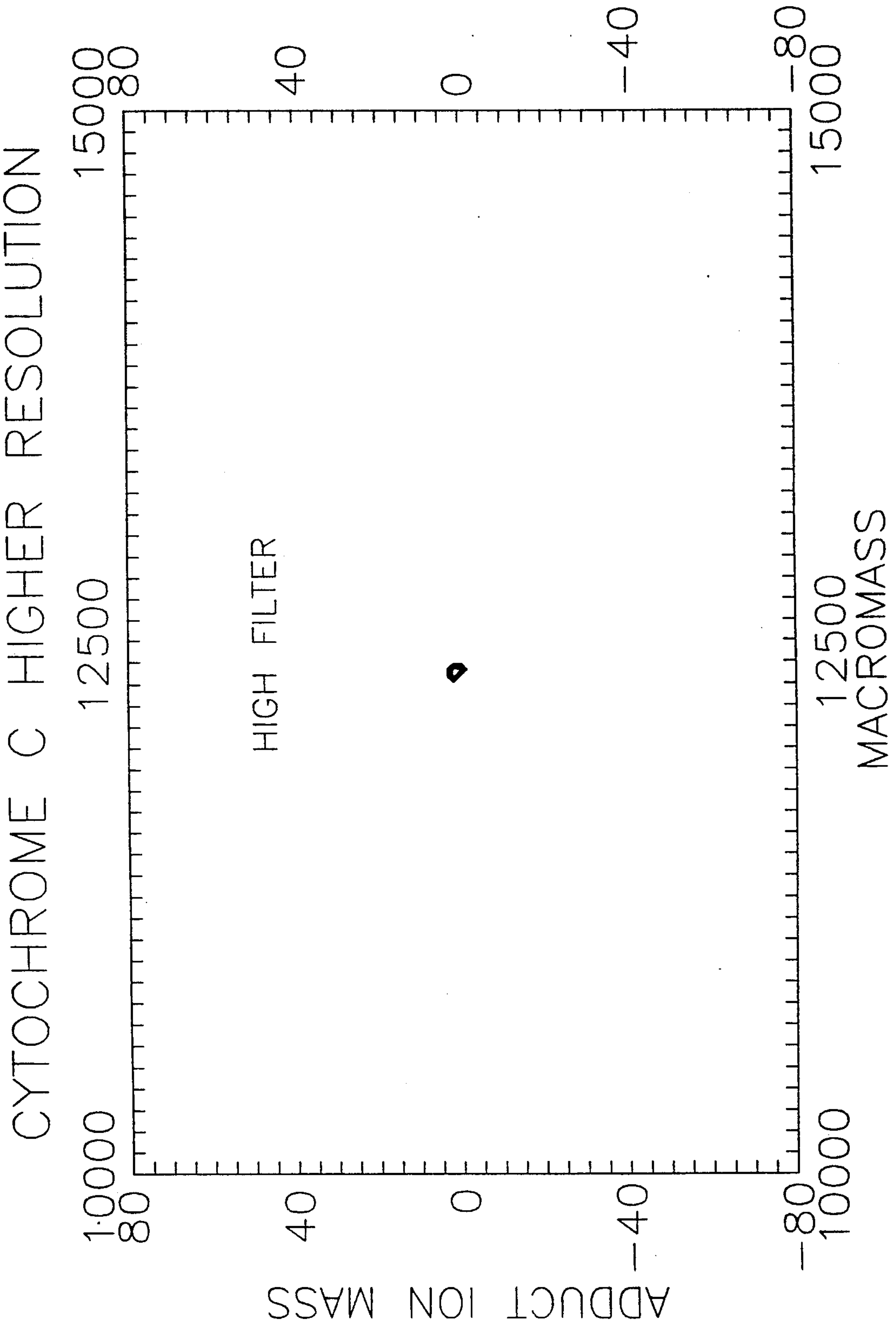

The line "triplets" to the left and right of the center set in FIG. 10 result from "charge shifting". The trio on the left results from increasing the value of i by one unit according to Eqs. 10b and the trio on the right a unit increase in i according to Eqs. 10c. To be noted is that these "shifts" in the numbers of charges apply only to the divisors of Mr in Eqs. 10. Also noteworthy is that unlike the lines in the central group that relate directly to the measured spectrum; the three lines in the charge-shifted cases do not have a common intersection because the coherence is not exact so that no single pair of values for Mr and $m_a$ that will satisfy all three equations. If the lines corresponding to other possible values of i were also included in all three groups, those in the central group would all have a common intersection. In the charge-shifted cases there would result a set of two-line intersections comprising geometric points because the calculated lines have only infinitesimal widths. These points might be close together but would not be exactly coincident. As discussed above, however, the deconvolution of a real spectrum the "lines" would have finite widths and would in general overlap enough to produce a ridge whose width and height would be determined by the resolution of the analyzer, the accuracy of its m/z scale and the extent of random error in assigning an m/z values to the peaks in the measured spectrum. The side-ridges in FIGS. 3 and 5 illustrate the consequence of this charge-shifted coherence in the deconvolution of a real spectrum with peaks of finite width. If the ridges all had the same height, it would not be possible to decide which was the "main" ridge from which the true parent mass could be obtained. Fortunately, as has been emphasized, coherent peaks reinforce one another. Because coherence is more complete in the measured spectrum than in its charge-shifted counterparts, of its peaks contribute in full measure to the deconvoluted peaks. Therefore, the ridge produced directly from the measured spectrum is easily identified because it is always higher than the ridges resulting from charge-shifting or any other "incidental coherences."

Figure 9A:
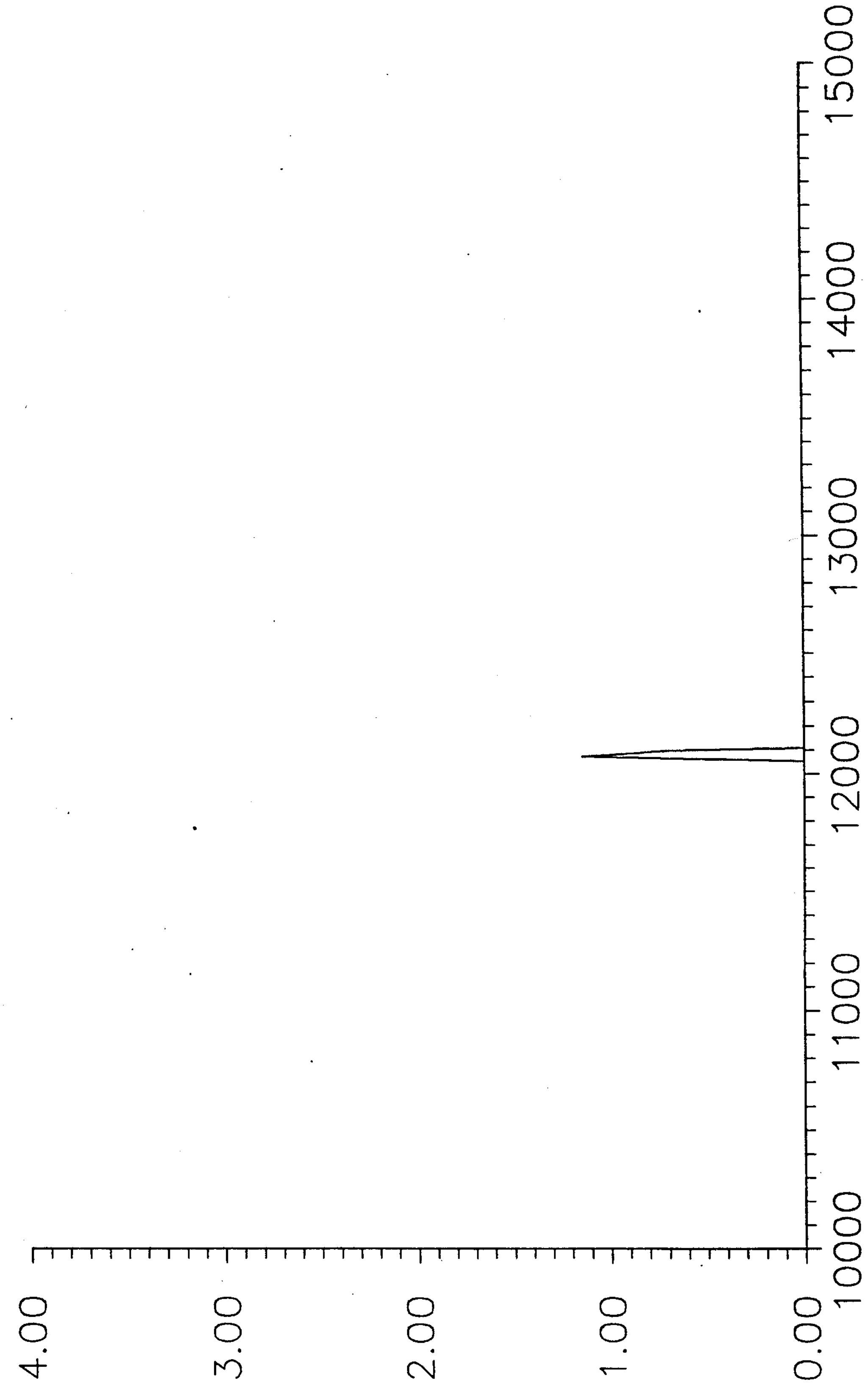
FIG. 9*a*–*b*.
Figure 9B:
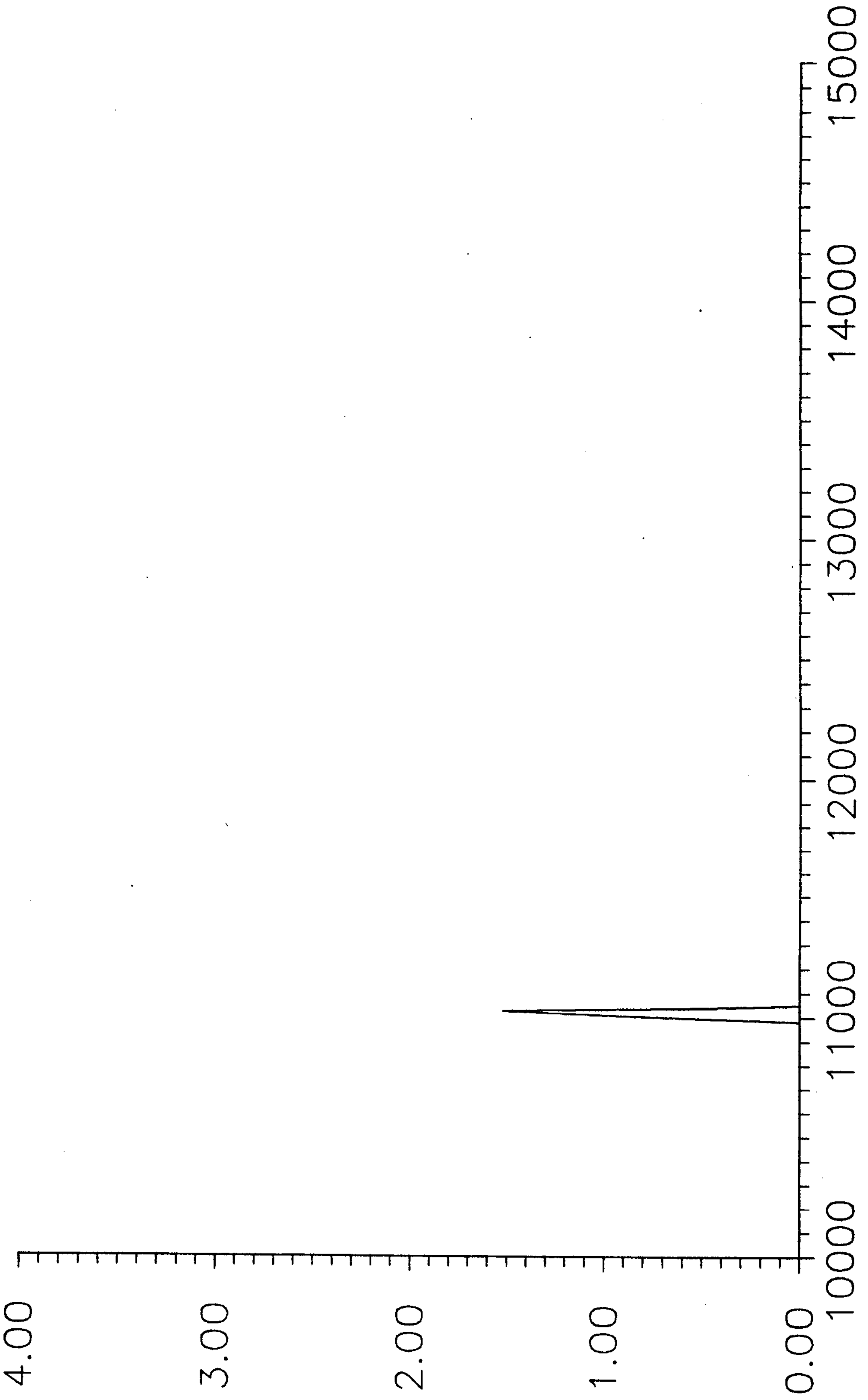

It is appropriate here to identify an important advantage that a 3D representation of mass spectral data can provide. Suppose for the spectrum represented in FIG. 1*a* we had carried out a 2D deconvolution assuming that the adduct ions were a hydrated protons. The deconvoluted spectrum would be the curve defined by the intersection of the $m_a=19$ plane with the central ridge of FIG. 3*a*. That intersection is shown in FIG. 9*a* as a peak whose apex occurs at an Mr value of 12,077. But in fact, as a glance at FIG. 3*a* clearly shows, the highest point on the main ridge occurs at an Mr value much nearer to the true value of 12,360 (for cytochrome C), a value that would be obtained from the peak generated by the intersection of the $m_a=1$ plane with the central ridge of FIG. 3*a*. The point is that the 3D representation of a spectrum shows what the best value for ma actually is and avoids the substantial error that can result when one must assume a value and then makes a wrong choice. The error would be much worse if it had been assumed that the adduct charge were a potassium ion. The m =39 plane would intersect ridge A of FIG. 3*a* to produce the spectrum in FIG. 9*b*, the deconvoluted 2D spectrum that would have been obtained from an assumption that the adduct charges are potassium ions. The peak in that spectrum occurs at an Mr of 11,027, off by 1333 units from the true value.

On the basis of these features of 3D spectra and their interdependence, deconvolution algorithms can be designed that will quickly identify the most probable values for Mr and $m_a$ of the sample species and "filter out" the side-band contributions so that the deconvoluted spectrum comprises but a single ridge. This "filtering" is applied only during the deconvolution and does not affect the original measured spectrum. The deconvoluted 3D spectra of FIGS. 3 and 5 have been subject to just enough filtering to eliminate all but the two principal side-band ridges. FIG. 10 shows the result of sufficient filtering to remove all side-band ridges. The "slightly filtered" 3D surfaces of FIGS. 3 and 5 along with the "highly filtered" 3D surface of FIG. 10 were all obtained from the measured spectra for cytochrome c shown in FIGS. 1 and 2. Filtering functions are particularly useful in deconvoluting the spectra of multiply charged ions from mixtures of parent species, particularly when some of the mixture components are present in very small proportions. They will be described later.

Heterogeneity in Adduct Ion Mass

In our considerations thus far we have tacitly assumed that all adduct charges on every multiply charged ion had the same mass so that the value of $m_a$ was constant. In principle $m_a$ can vary and in practice it sometimes does. For example, spectra have been obtained for some proteins in which both Na+ and H+ are contributors to an ES ion's charge. It is appropriate, therefore, to consider what can be expected when 3D deconvolution is applied to spectra with heterogeneity in the adduct ion mass. For simplicity we treat the case involving two different adduct ion masses (Extension of the argument to a larger number is straightforward but gets rapidly more intricate as the number increases.) First we note that in the case of a single adduct ion mass Eq. 1 for a spectral peak can be rewritten: $x_i = (Mr + i m_a)/i$. For the case of two masses $m_a$ and $m_a'$ we can thus write: where q is the number of adduct ions having mass $m_a'$ so that $(i-q)$ is the number having mass $m_a$ $$x_i = \frac{Mr + (i-q)m_a + qm_a'}{i} \quad (11a)$$

$$= \frac{Mr + im_a + q(m_a' - m_a)}{i} \quad (11b)$$

$$= \frac{Mr + q((m_a' - m_a)}{i} + m_a \quad (11c)$$

where q is the number of adduct ions having mass $m_a'$ so that $(i-q)$ is the number having mass ma. We now recognize that Eq. 11c would hold, just as written, for the case in which all of the charges, i in number, were carried by adducts of mass $m_a$ so that the $q(m_a'-m_a)$ component of the numerator in the first term on the rhs becomes in effect a supplement to the mass of the uncharged parent species. This result is equivalent to an assumption that actual adduct charges of mass $m_a'$ can be treated as comprising a neutral mass $(m_a'-m_a)$ coupled with a charge whose mass is $m_a$. The component of adduct ion mass that is assumed to be neutral is thus simply added to Mr. Indeed, it would be impossible to distinguish between these two possibilities by mass measurements alone. It follows from this interpretation of Eq. 11c that in a measured mass spectrum a peak for the ions of a particular charge state could have an effective parent mass $(M_{eff})$ equal to $Mr + q(m_a'-m_a)$ where q can have any value from 0 to i. A value of 0 for q corresponds to the case for which all of the actual adduct charges have a mass of $m_a$ and Mr is both the true and effective mass of the parent species. A value of i for q could correspond to the case for which all the adduct charges had a mass $m_a'$.

We now consider possible results of applying the 3D convolution to a spectrum for which q has a value between 0 and i. A measured spectrum taken with an analyzer having relatively low resolution would show a sequence of peaks, each peak corresponding to the ions having a particular charge state. Each peak would have a base width approximately equal to $(q_{max}-q_{min})(m_a-m_a')/i$ plus any additional contributions due to slit width, random errors, and non-linearities in the m/z scale. The deconvoluted 2D spectrum would comprise a single broad peak, provided that side peaks were removed by suitable filtering. The deconvoluted 3D spectrum, again with suitable filtering, would comprise a single broad ridge. The base widths of the peak and the ridge would be according to Eq.(8a) approximately equal to the term $(q_{max}-q_{min})(m_a-m_a')$ plus additional components due to slit width, random errors, and nonlinearities in the analyzer's m/z scale. Note that there is no division by i for the deconvoluted spectrum because the peak width is in terms of m whereas in the measured spectrum it is in terms of m/z.

Unfortunately, it would be impossible to determine the true parent mass Mr from deconvolution of a spectrum such as the one just described without further information on the distribution and identity of the adduct ions. In other words, we need to know q, $m_a$ and $m_a'$ in order to determine the true value of Mr from the effective value obtained from the coordinates of the ridge peak. It is often possible to add various adduct ion species to the analyte solution and determine from the effect on the spectrum which ones were present. Armed with that information one can sometimes then adjust the composition of the analyte solution so as make one species dominant. In this way one can directly, or by extrapolation to high concentration, obtain a spectrum in which all the adduct charges on all the ions of all the peaks have the same identity. Deconvolution of that limiting spectrum would then be a straightforward route to determining the true value of Mr.

Another approach to obtaining the additional information on adduct charge heterogeneity is by mass-analyzing the ions at higher resolution. If the mass analyzer has sufficient resolving power, each broad peak in the measured spectrum for ions of a particular charge state i would be resolved into a set of individual peaks, one for each value of q between 0 and i. Of course, there will be such peaks only for those values of q for which the corresponding ions are present and not all possible values of q will always be represented. Application of the algorithm would then give the same kind of result as in the case of a mixture of parent species, all of whose ions all have the same adduct charge species. Each particular combination of parent and adduct would form its own coherent series of peaks that upon deconvolution would give rise to a unique ridge from which values for Mr, $m_a$ and $m_a'$ could be deduced. Unfortunately, there as yet seems to be no way to determine the true value of q when the number of charges is greater than one or two, usually the case for ES ions of large species. Clearly, if all the ions in a population being analyzed are multiply charged, and if all of them including those with the smallest number of charges incorporate say two K+ions, then the apparent Mr of the parent species will include 2(39−1) or 76 units due to the K+ if the charge-carrying adduct is taken as H+. There are no features in the spectrum that can indicate this excess mass, no matter how high the resolution of the analyzer.

Figure 12:
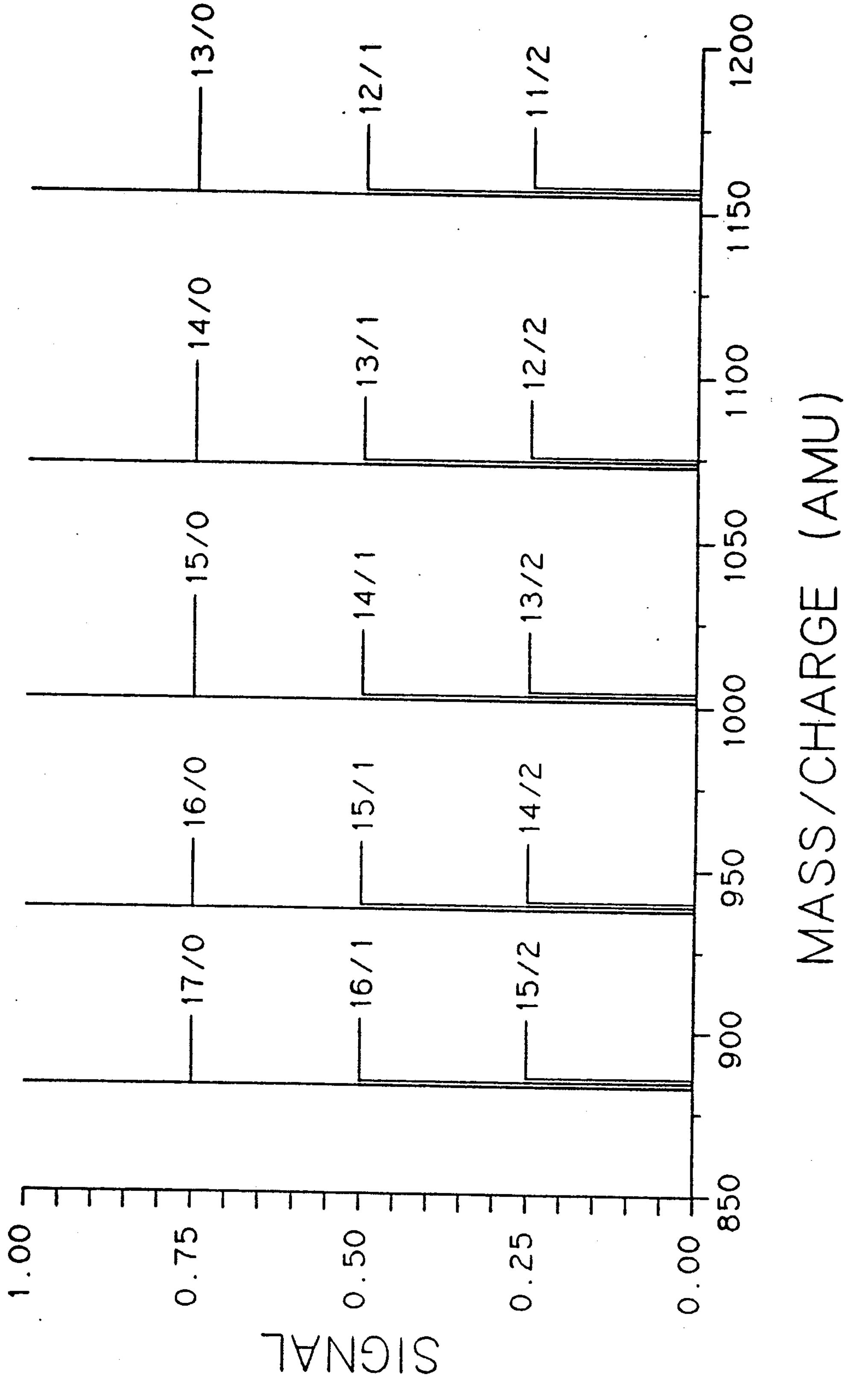
FIG. 12. A synthetic idealized mass spectrum for ions of a parent species with $M_r=15{,}000$ from which ions are formed by selected combinations of Na+ and H+ as adduct charges.
Figure 13A:
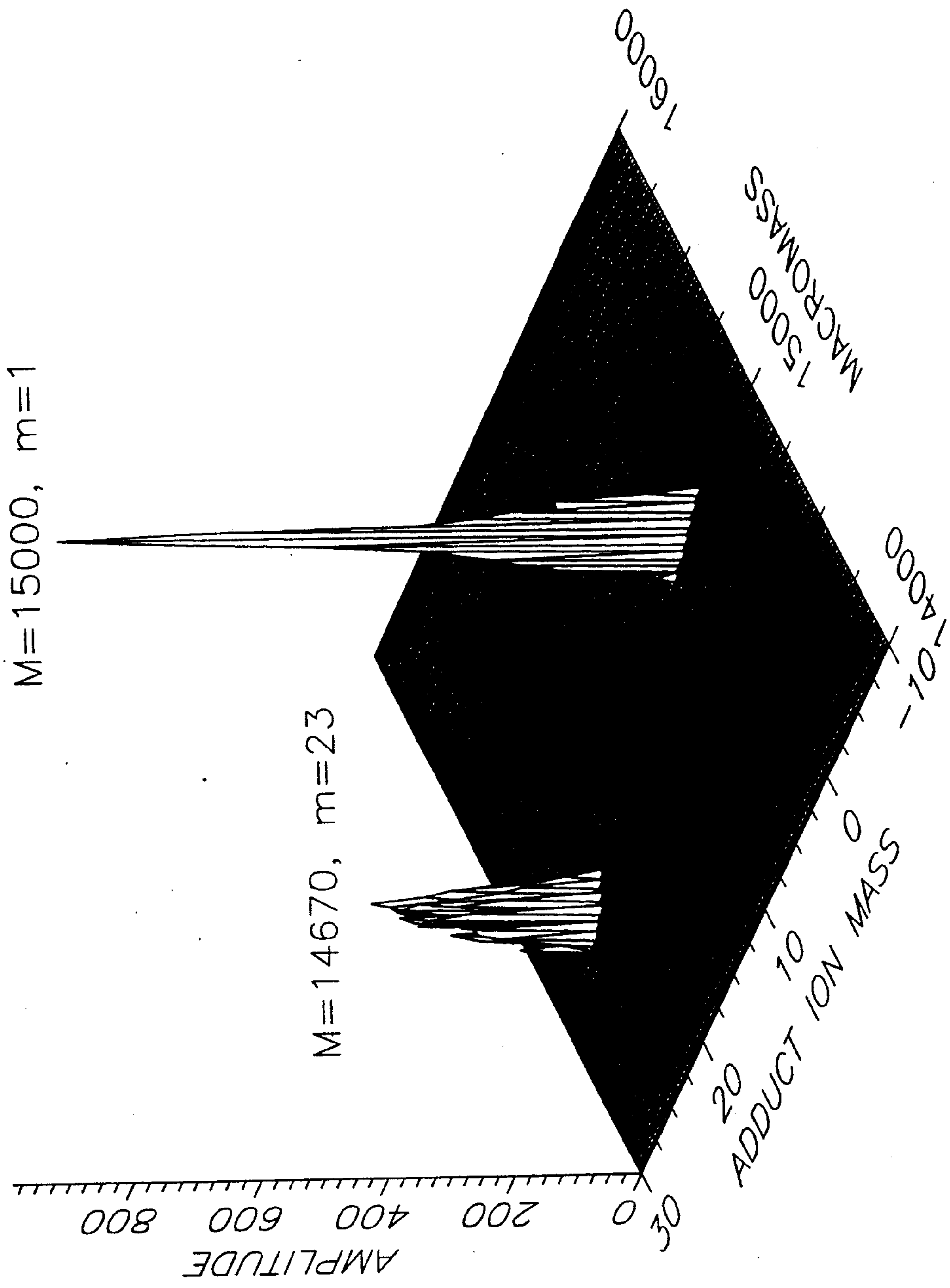
FIG. 13*a*–*b*.

It may be illuminating to examine the results of 3D deconvolution in a particular idealized case of adduct-charge heterogeneity. FIG. 12 shows a synthesized spectrum for a parent molecule with an Mr of 15,000 and adduct charges comprising combinations of H+ and Na+. The peaks relate to totals of 17, 16, 15, 14 and 13 charges with 0, 1, and 2 Na+, the remainder being H+ in each case. For convenience and simplicity the peaks for ions with only H+ adducts have been given a relative height of unity. Peaks for ions in which one H+ has been replaced by an Na+ have a relative height of 0.5 and those for ions with 2 Na+ replacements have a relative height of 0.25. In this figure, the first number refers to the number of H+ ions on the peak and the second number refers to the number of Na+. For example, 15/1 is the peak on which there are 15 H+ and 1 Na+. FIG. 13*a* shows the 3D surface obtained by deconvolution of this synthetic spectrum with enough filtering to eliminate side ridges. It contains two ridges so short and narrow that they constitute fairly sharp peaks. The ridge widths would have been infinitesimal if the peaks in the "measured" spectrum of FIG. 12 had been characterized solely by the indicated values of 15,000, 1 and 23 for Mr, $m_a$, and $m_a'$ respectively. Consequently, we deliberately broadened the peaks in FIG. 12 by a small amount in order to provide a perceptible width to the ridges on the deconvolution surface of FIG. 13*a*.

Not only are the ridges in FIG. 12*a* relatively "thin" they are also very short because of the exact coherence of the peaks on the source spectrum. A cursory glance at that spectrum is enough to reveal the source of the taller surface "peak" (short ridge) with coordinates Mr =15,000 and $m_a$=1. The 5 highest peaks, corresponding to ions of the parent species with 17, 16, 15, 14 and 13 adduct protons, clearly constitute a primary sequence that is exactly coherent. Not so obvious is the origin of the ridge peak at M =14,670 and $m_a$=23 but it stems from some of the secondary sequences, one of which, for example, comprises the 13/0, 13/1 and 13/2 peaks. In this series the difference between adjacent peaks is one Na+ adduct so the deconvolution algorithm will sum their heights when the correct Mr is paired with an $m_a$ of 23 and comparison-tested with the synthetic spectrum.

Figure 13B:
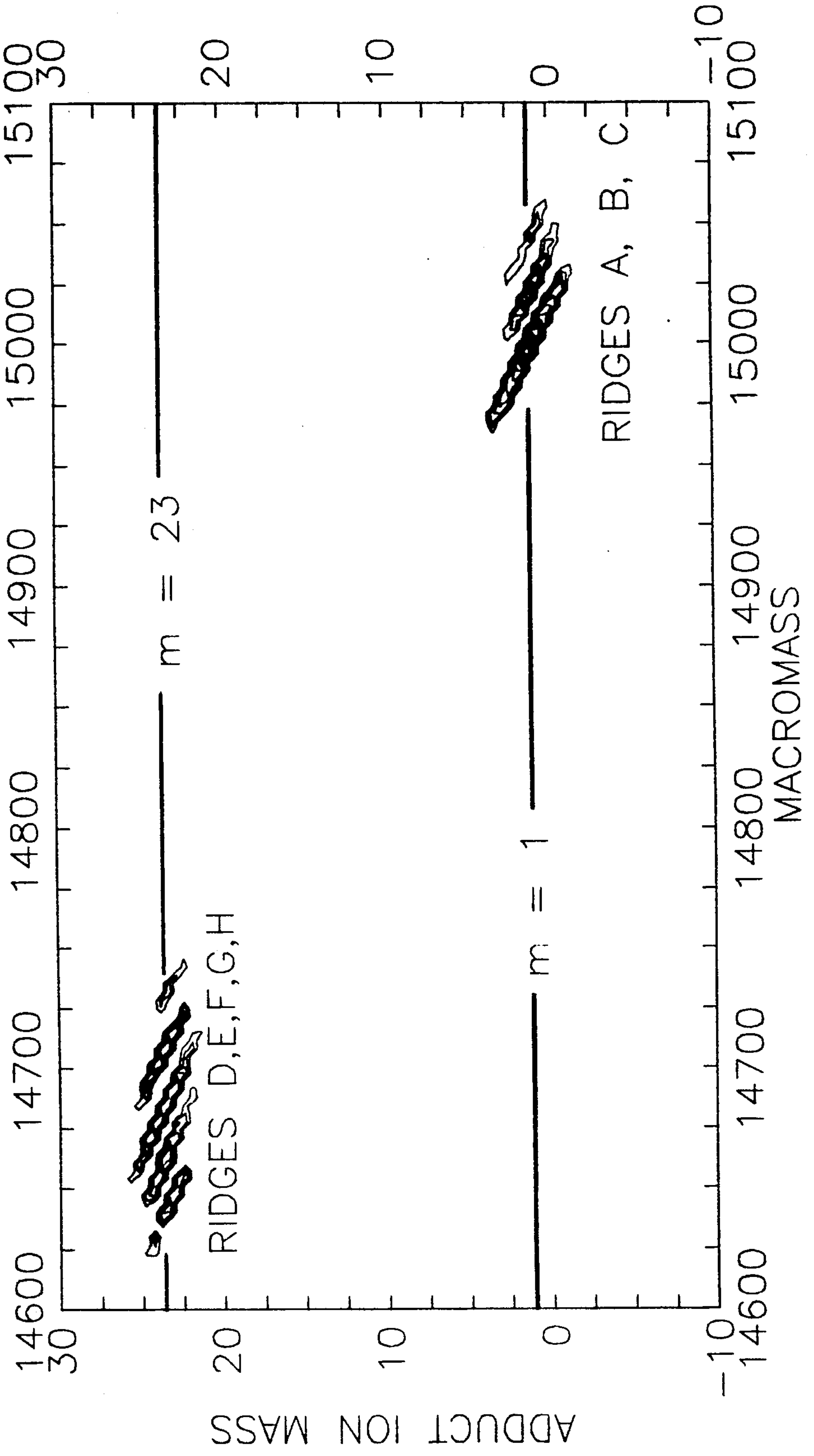
Figure 14A:
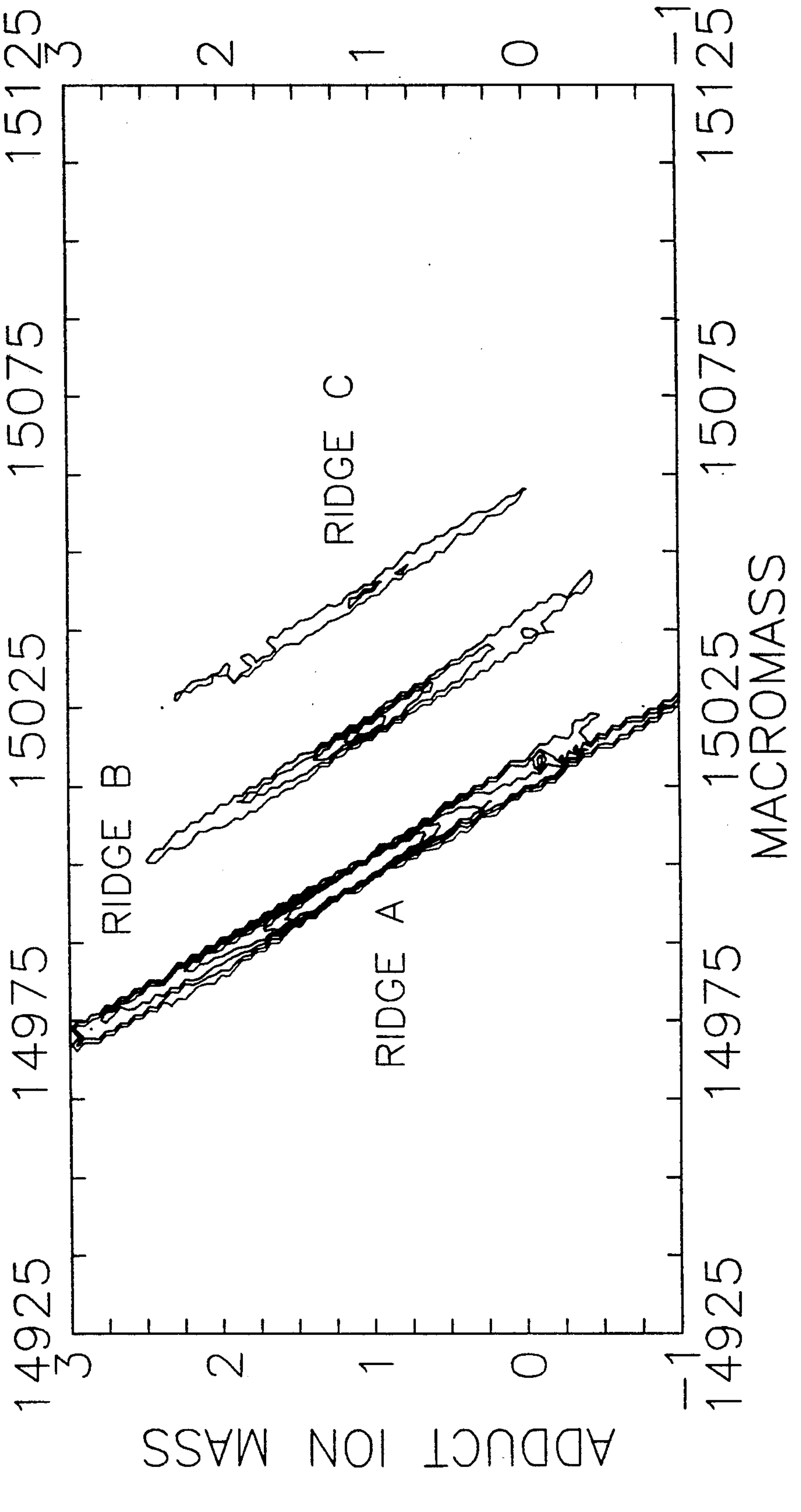
FIG. 14*a*–*b*.
Figure 14B:
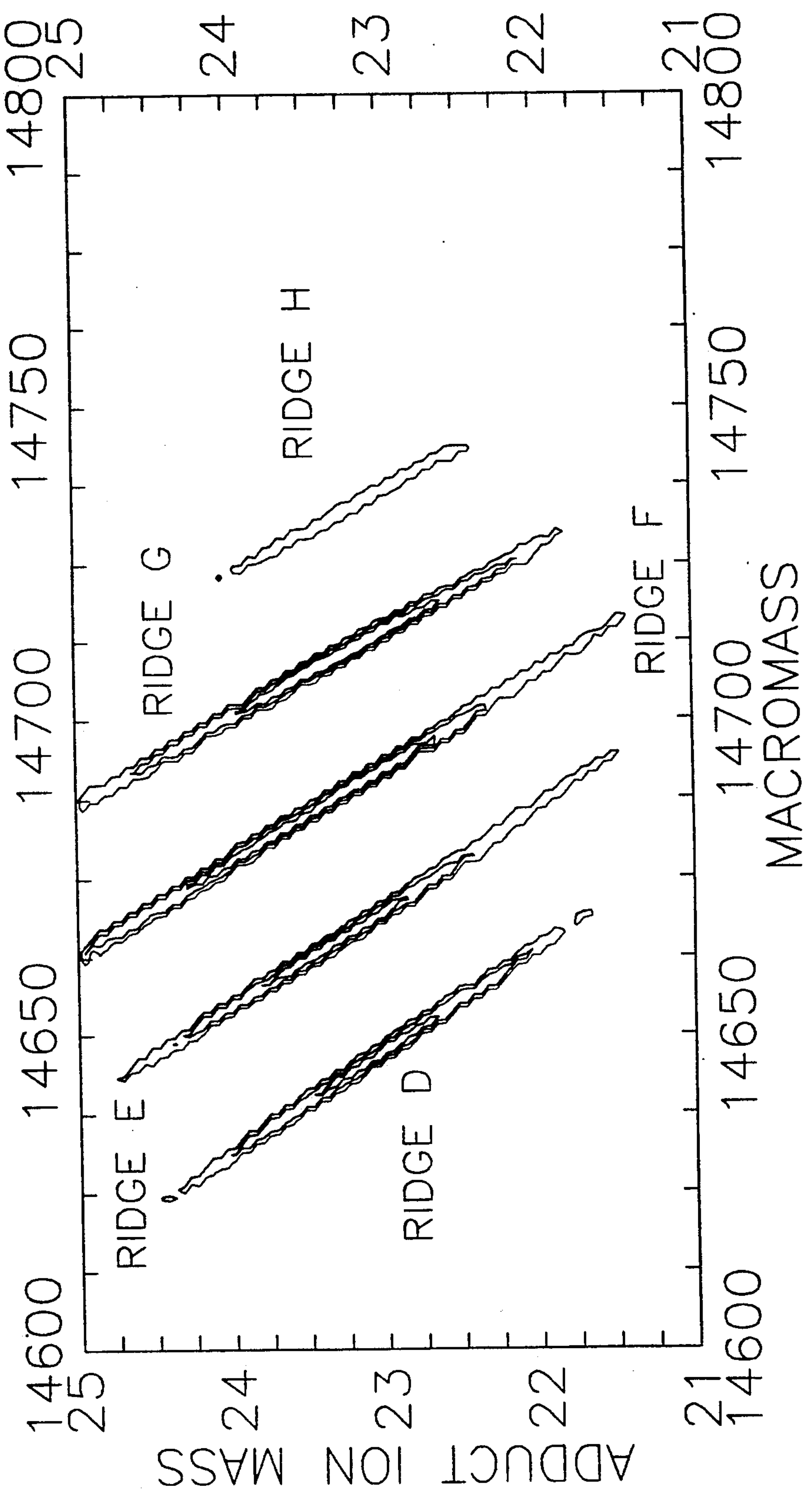

Close examination of the 3D surface in FIG. 13*a* reveals that each of the two peaks is actually composed of several "ridgelets" which show up more clearly in the contour map of FIG. 13*b* of which sections are enlarged in FIG. 14*a* and 14*b*. Ridgelet A is the highest because it stems from the sequence (13/0, 14/0, 15/0, 16/0 and 17/0) for which all peaks have a relative amplitude 1.00, the largest in the spectrum. It corresponds, of course, to the deconvolution sum of Eqs. 11c for values of i from 12 to 16 when Mr =15,000, ma =1.000 and q =0. Ridgelet B comes from the sequence (12/1, 13/1, 14/1, 15/1 and 16/1) in which the adduct charge difference from peak to peak is also always one H+ but the ions of each peak also incorporate one Na+. Thus, in Eq. 11c for each i the values of q, ma and $m_a'$ are respectively 1.0, 23 and 1.0 so that the effective Mr for this sequence becomes 15,022. Similarly, for the peaks in the sequence 11/2, 12/2, 13/2, 14/2, and 15/2, $m_a$ and $m_a'$ are again 1.0 and 23 but q is 2 so that the high point in ridgelet B occurs at Mr =15,044.

Ridgelets D, E, F, G and H in FIG. 14*b* are due respectively to sequences (16/0 and 16/1), (15/0, 15/1, and 15/2), (14/0, 14/1 and 14/2), (13/0, 13/1, and 13/2) and (12/1, 12/2). Note that for a given sequence, the number of H+ ions remains constant and the number of Na+ ions increases by one. In other words, these sequences are generated by "adding" Na+. For these sequences, therefore, the "added" adduct ion mass is 23, m' =1 and q ranges from 16 to 12. The high points on the ridgelets thus occur along the line m =23 at values of $M_{eff}$ values of 14,648, 14,670, 14,692, 14,714 and 14,736.

Altogether in this 3D surface of deconvolution there are 8 high points at 8 different values of Mr. The highest point is at Mr=15,000, the true value of Mr for the parent species, but only because in the synthetic spectrum to which the algorithm was applied, the peaks for the unambiguous case of a single adduct species (H+) were arbitrarily made twice as high as any of the peaks for ions in which both H+ and Na+ were adduct species. If the three peaks in the sequence (14/0,14/1 and 14/2) in the synthetic spectrum had been made much higher than all the others, the highest point on the 3D surface would have occurred at Mr =14,692 even though the true value would still have been 15,000. If the spectrum had been the result of an actual mass analysis for an unknown sample, we would have no basis or justification in the spectrum itself for identifying any particular one of the 8 high points as representing the true parent mass. Unfortunately, this ambiguity seems to be inherent unless independent information is available on the identities and distributions of the adduct ions. The point is that when a value of x is measured for a particular spectral peak, there remain 5 unknowns in Eq. 11c: Mr, i, $m_a$, $m_a'$ and q. To determine a value for Mr, therefore, i, ma, ma' and q must be known. The value of i has to be integral so that it is readily determined from the spacing between the peaks because it is not very sensitive to the value of $m_a$. One might think that x values for three peaks might be sufficient to fix values for the three remaining unknowns, $m_a$, $m_a'$ and q. Unfortunately, the very coherence of those peaks means that one of the unknowns must remain uncertain to the extent of an additive constant, no matter how many peaks one has values of x for. That additive constant can be determined only if experimental data can pin down its absolute value, for example if there were one peak for which i was unity so that q must vanish. In their original paper Mann et.al. noted that the value of $m_a$ must be independently known or assumed if an unambiguous value of Mr is to be obtained from the coherent series of peaks that is a characteristic feature of ES spectra for multiply charged ions. That observation remains all too true. As has been mentioned earlier, the only yet-apparent way to obtain independent information on the identities of $m_a$ and $m_a'$ is by determining the dependence of spectral features on deliberate variations in the concentration of various adduct ion species. Fortunately, it turns out that in the important case of proteins $m_a$ almost always is H+. Consequently, one will not often get into trouble by assuming that it is. As our experience accumulates it may well turn out that other such empirical rules will emerge. One of the virtue of the deconvolution procedures described here is that the nature of the resulting 3D surface provides evidence of errors in an assumed value of $m_a$, for example by showing a multiplicity of high peaks.

Absorbed Solvent Molecules

Another effect which might broaden "peaks" and influence the contours or ridges of a macrosurface is the presence of solvent molecules which attach to the macromolecule. Suppose the solvent molecule has a molecular weight of s. Depending on the amount of solvent present ( and the resolution of the mass spectrometer) there may be several peaks with a total charge i: Suppose one of these peaks has q solvent molecules, we may then write:

$$x_i = (M + qs + im)/i \quad (11d)$$
$$= (M + (i - q)m + q(s + m))/i \quad (11e)$$

Eqn.(11e) is identical in form to Eqn.(11a) if s is replaced by m'−m. In other words, a molecule with absorbed solvent molecules would behave as if it had attached to it a mixture of two adduct ions one with a mass m'=s +m and the other the mass of the true adduct ion (m). This means that parallel ridges similar to those found in FIG.(14) may be expected when solvent molecules are attached to the macromolecule.

Parent Molecule Disassociation

Suppose next that a parent molecule partially dissociates or fragments either in solution or as a result of ionization. (There is little evidence to date which would indicate that molecules dissociate due to Electrospray ionization.) Consider first the case in which the loss in the molecular weight is independent of the amount of charge present. Suppose further that the parent molecule loses mass in units of n Da, resulting in a distribution of molecular weights. In light of this there may be several peaks with a total charge of i. If one of these peaks has lost q units of mass n then:

$$xi = (M - qn + im)/i \quad (11f)$$
$$= (M + (i - q)m + q(m - n))/i \quad (11g)$$

Again, Eqn.(11g) is identical to Eqn.(11a). This means a macromolecule which loses mass in fixed amounts of mass n would behave as if it had a mixture of adduct ions attached to t, one adduct ion with a mass of m, the other with a mass of m−n. Note that if n is larger than m then this second adduct ion would have a "negative" mass.

On the other hand, if a macromolecule loses n units of mass for each charge then:

$$xi=(M-i\,n)\,/\,i=M/i-n \quad (11h)$$

which would be the case of a molecule that has an adduct ion mass of −n. If there are no fragments other than those resulting from charging, then there will be no shifting as there was in the case above, The main ridge would appear, however, in the negative "adduct" ion mass region of the macrosurface. This would be the case for example with negative ion formation where a proton may be lost for each negative charge. Note even in this case where the parent molecule loses mass with each charge, the unit of mass lost is still referred to as the "adduct ion" mass.

Further Discussion

Throughout this discussion the term "coherence" as applied to a sequence of peaks in a spectrum of multiply charged ions has referred to the consistent difference, from peak to peak in the sequence, of a single charge between ions of adjacent peaks in that sequence, provided that those adjacent peaks are due to ions of the same species. In some spectra there may be peaks due to ions of a different species that intervene between peaks for ions of the same parent species. Although one of these intervening peaks may be adjacent to a peak in the coherent sequence, the number of its charges may well differ by more than one from its nearest neighbor in the spectrum so that it does not belong to the coherent sequence comprising peaks due to ions of the same parent molecular species. If that coherent sequence has at least three or more peaks it is usually straightforward to identify and ignore the peaks that do not belong. Some of the problems that can arise in identifying the non-coherent peaks have been examined in the foregoing account. The point to be emphasized here is that in the present context the term "same parent molecular species" means molecular species for which ions having the same number of charges are indistinguishable by the analyzer used to determine the m/z values for the ions of the spectrum.

Figure 15A:
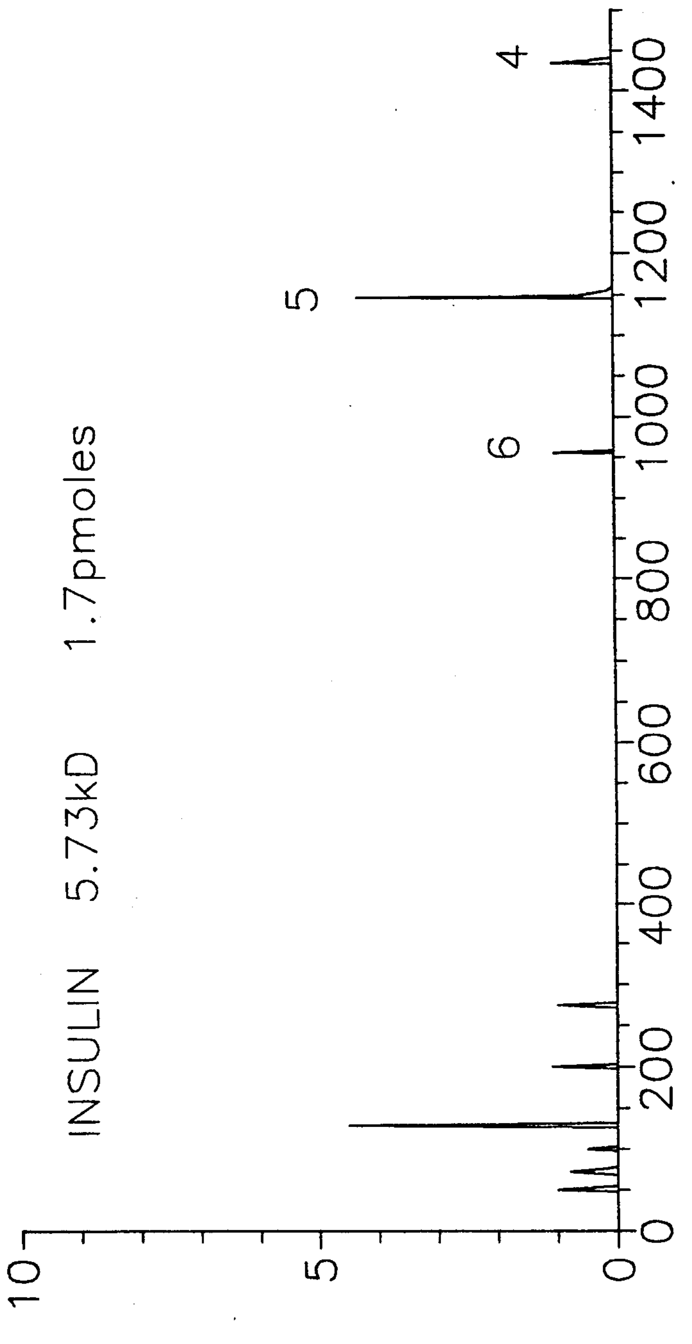
FIG. 15*a*–*b*. Upper
Figure 15B:
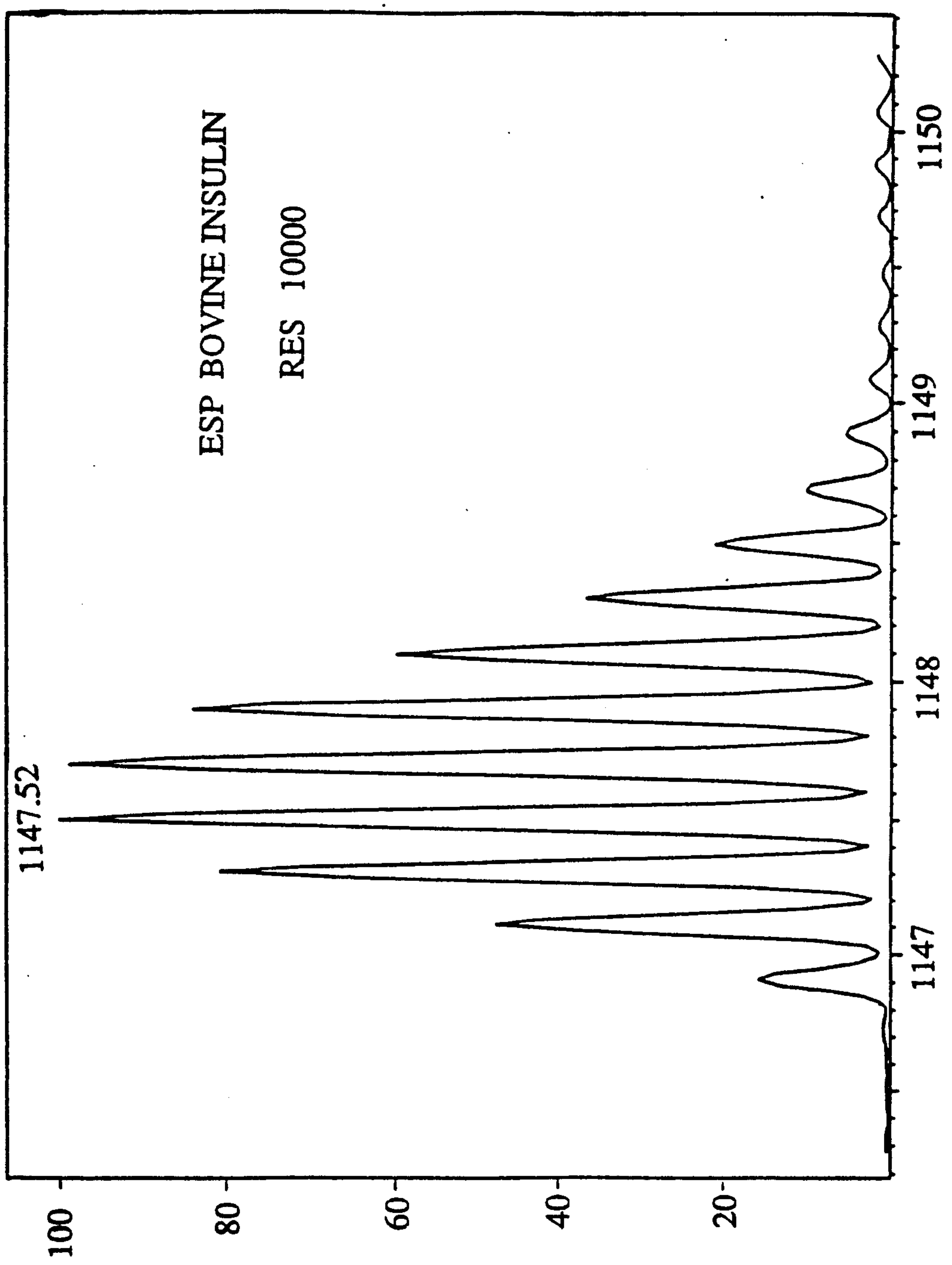

Whether the species of adjacent peaks are the same or not depends to some extent on the resolving power of the analyzer. For example, FIG. 15*a* shows an ES mass spectrum for bovine insulin obtained with a quadrupole mass filter having a resolving power of about 1000 which means it can distinguish between or "resolve" two peaks whose ions have m/z values of 999 and 1000. The numbers 6, 5, and 4 on the three peaks between m/z values of 900 and 1500 refer to the number of charges on the ions giving rise to those peaks. Clearly the number of charges on the ions of the middle peak (5) is one less than the number on the ions of the nearest or adjacent peak on the left (6) and one more than the number on the ions of the nearest peak on the right. FIG. 15*b* shows the result when the ions of that same middle peak (bovine insulin molecules with five charges) are analyzed by a magnetic sector analyzer with an effective resolution of 10,000. What was a single peak at a resolution of 1000 becomes a dozen or more peaks at a resolution of 10,000. In this high resolution spectrum the ions of adjacent peaks have the same number of charges but differ in mass by one dalton and, therefore, in m/z units by 1/5 or 0.2. These differences in mass and m/z reflect a difference of one in the number of the molecule's carbon atoms that have an extra neutron in the nucleus, i.e. are carbon 13 rather than carbon 12 isotopes. The quadrupole analyzer of FIG. 15*a* cannot distinguish between, i.e. resolve, such small differences in mass and m/z. Therefore, the dozen or so peaks for ions with five charges that are distinguishable in FIG. 15*b* become merged into the single peak of FIG. 15*a* for ions with five charges. On the other hand, the change in m/z due to a difference of one in the number of charges on an ion is generally much larger, in this case, for example, 5,730/5−5730/4 or 285 units. Of course, when the number of charges becomes large, the shift in m/z gets proportionately smaller. Thus, the difference between ions with 99 and 100 charges would be only 10 units in m/z for a parent molecule having an Mr of 100,000. A number much smaller than 285 but still large enough to be readily distinguished by an analyzer with a resolving power of only 1000. On the other hand, a resolving power of 100,000 would be required to differentiate between two ions comprising 100 charges on parent molecules with Mr's of 100,000 and 100,001!

To the magnetic sector analyzer of FIG. 15*b* with high resolution the masses of the parent species of the ions forming immediately adjacent peaks are distinguishably different with respect to mass but have the same number of charges. Relative to any one reference peak for quintuply charged ions in the "band" of FIG. 15*b*, the "adjacent" peak in its coherent sequence with one charge less or more is many actual peaks away, off scale to the right for one charge less—off scale to the left for one charge more. "Its coherent sequence" includes, of course, only those peaks produced by ions from parent species having masses that (to the sector analyzer that produced the spectrum) are identical, i.e have the same distributions of carbon isotopes.

Now to be described are calculation procedures for a preferred mode of practicing the invention. Other possible variations will occur to those skilled in the relevant arts. To put these procedures in perspective it will be useful to review briefly how, prior to the invention, deconvolution analysis was carried out on mass spectra comprising sequences of peaks for ions of a particular parent species with varying numbers of charges. The approach usually involved some variation of the following procedure. Equation 2 was evaluated over the range of possible i values consistent with the measured spectrum for each of a sequence of values for Mr* between a starting value $Mr^*_s$ and a finishing value $Mr^*_f$, respectively the lowest and highest values of Mr consistent with the range of m/z embraced by the peaks in that measured spectrum. Estimates for these lowest and highest values of Mr* were obtained from the observed values of x =m/z and an approximation for the number of charges i, estimated as described earlier. One began with the evaluation of Eq. 2 for $Mr^*_s$ and recorded the result. A similar evaluation was then carried out for a second value of $Mr^*_2$ equal to $Mr^*_s$+dMr where dMr was an increment of arbitrarily chosen magnitude, e.g. 1.0 dalton. The smaller the increment the smaller was the chance of error but the longer was the time required to complete the calculation over the desired mass range. The evaluation was then carried out for $Mr^*_3=Mr^*_2+dMr$. This stepwise advance continued until the highest value of Mr in the desired range, $Mr^*_f$ was reached. The true value of Mr was assumed to be equal to the value of Mr* that produced the highest total for the summations carried out according to Eq. 2. That assumption was justified on the basis that the highest total must occur for the Mr* that resulted in contributions from the greatest number of peaks in the measured spectrum. In other words it was the value of Mr for which the series of terms in the summation was most coherent with the series of measured values of $x_i$ for the peaks in the measured spectrum. A possible exception to the validity of this assumption will be discussed in what follows.

As mentioned earlier, there were and are some difficulties with this previous approach. One must assume a value for the adduct ion mass. A wrong choice, e.g. H+($m_a$=1) when the actual adduct is Na+ ($m_a$=23), would lead to a gross error. If the mass scale of the analyzer is off, even the right choice for $m_a$ would lead to a wrong value of Mr and there would be no obvious indication of any error. Another problem is that the "direct march" technique of previous practice can require a large amount of computation time, especially when dM is made small enough to avoid the possibility of skipping what would be a bona fide peak in the deconvoluted spectrum. Even more troublesome are cases in which there may be more than one adduct ion species in the ions of the population being analyzed. Moreover, one cannot be sure which value of Mr* will give the highest total until the calculation is complete, i.e. all values have been tried.

Other problems with this previous practice include the way in which the height of a deconvoluted peak is calculated. Inherent in Eq. 2 is a strong bias toward high mass. The larger the value of Mr* the greater is the number of terms that contribute to the total of the summation. For example, we consider a case in which the original spectrum is a scan from 500 to 1500 daltons. For Mr* =2000 the values of $i_{min}$ and $i_{max}$ would be respectively 2 and 4 so that there would be three terms in the summation of Eq. 2. For Mr* of 20,000 the values of $i_{min}$ and $i_{max}$ would be respectively 13 and 40 and there would be 28 terms in the summation of Eq. 2. The more terms in the summation the greater is the number of possible contributions from the measured spectrum to the summation. To be remembered is the underlying assumption of the analysis that the summation of Eq. 2 will be maximum when there is maximum coherence between the measured $x_i$=m/z values for the peaks in the experimental spectrum and the calculated values based on a trial value of Mr*. The summation of Eq. 2 can have a positive value even in the absence of coherence because of chance coincidences between the argument of the summation and $x_i$=m/z values for peaks in the spectrum. Because of the bias toward high mass mentioned above these chance coincidences increase as Mr* increases so that the base line of the deconvoluted spectrum rises with increasing Mr. This rise or "uphill" climb of the base line may invalidate the assumption that the "best" value of Mr* is simply the one that gives the largest total for the summation of Eq. 2. Chance coincidences also contribute to "noise" in the deconvoluted spectrum.

The procedure to be used in practicing the present invention, now to be set forth, also involves several steps but differs substantially from that just described. Instead of Eq. 2 it is based on the formulation of Eq. 3 which for convenience is repeated here with a slight modification:

$$H(Mr^*, m_a) = F\left[\sum_{i_{min}}^{i_{max}} h(Mr^*/i + m_a)\right] \quad (12)$$

An important change in Eqs. 3 and 12 relative to Eq. 2 is that $m_a$ is a treated as a free variable like Mr* and does not require any assumption as to its value. In addition, Eq. 12 incorporates a symbol F that represents one or more of several possible filter-functions that can be applied and will be described. These filter functions can exclude noise and allow contributions to the summation only from those terms of the measured spectrum that have a designated coherence. They are analogous to conventional electrical filters that combine "high-pass" and "low-pass" elements so as to pass only those signals within a specified frequency range. The filters F of Eq. 12 have "high-pass" and "low-pass" coherence characteristics. The low-pass filter sets the calculated signal (H) for a given point (Mr*,$m_a$) to zero unless there are at least a specified minimum number of consecutive terms in Eq. 12 for which the measured signal(h) is greater than a specified minimum or threshold value. In other words, the calculated signal (H) for a particular value of Mr* will be zero unless there is a contribution greater than the threshold value from each of a minimum number of consecutive signals in the measured spectrum. For example, if the low-pass filter is set at 2, then the signal (H) calculated from Eq. 12 for a particular test values of Mr* and $m_a$ will be zero unless at least two consecutive terms (for two consecutive values of i) have a value above the specified threshold. In other words there will be no contribution from incidental peaks whose m/z values happen to coincide with one particular combination of values for Mr*, $m_a$ and i, unless there are two such incidental peaks for which there is coincidence with terms in the summation for two consecutive values of i. Increasing the setting (number of consecutive terms required) for the low-pass filter increases the filtering effect by eliminating more noise and decreasing the probability of chance coincidence.

An important feature of a filter is its "threshold" setting. If this setting is too low, then the filtering effect may be too small to serve any useful purpose. Indeed, if it is set at zero or below, then there is no filtering effect. Increasing the threshold value increases the filtering effect, allowing a smaller portion of peak height(signal) in the measured spectrum to be included in the summation. If the threshold is set too high, i.e. above the signal strength from the highest peak in the measured spectrum, then there will be no contribution at all from the measured spectrum to the summation.

The high-pass filter works in a similar way except that it reduces the calculated signal (H) to zero if more than a specified number of consecutive terms in Eq.(12) are greater than the threshold value. For example, if the high-pass filter is set to 5, then any value of Mr* and Ma, for which there are more than 5 consecutive summation terms greater than the threshold, will give rise to a zero calculated signal (H). Working with the low and high filters, one can "tune" the nature of the deconvoluted spectrum to the requirements of a particular case. For example, if both high-pass and low-pass filters are set to 4, then only those values of Mr* that give rise to four, and only four, consecutive summation terms (coherent peaks) with magnitudes greater than the threshold value will produce a non-zero value for the summation of Eq. 12.

It should be mentioned that the above filters can also be applied in conjunction with a certain specified high limit on the signal. The high limit works in a similar way to the threshold limit except the high limit sets to zero any measured signal that is greater than a certain specified value. This high limit can effectively be used to block out the contributions of dominant peaks in the measured spectrum. This would be desirable, for example, when one is interested in identifying the mass of secondary components represented in the spectrum.

The coherence filter described above may also include a shape filter. The envelop over the peaks in a multiply charged polyatomic molecule usually monotonically increases at low m/z, reaches a maximum and then monotonically decreases at higher m/z values. The spectrum shown in FIGS.(*1a*) and (*2a*) are fairly typical of this monotonically increasing and monotonically decreasing behavior. It is rare that the increase or decrease is non-monotonic. A shape filter would reject any set of otherwise coherent series of peaks that is non-monotonic. The filter can reject either the entire series or it could reject that part that is non-monotonic. Such a filter would work as follows. After selecting values of Mr* and $m_a$, the summation in Eqn.(12) is performed. If the signal in the measured spectrum (h) at a summation point , Mr*/i $+m_a$, is less than a certain specified percentage of the signals at Mr*/(i+1) +ma and Mr*/(i-1)+$m_a$, then the measured signal at that summation point is treated as if it has a value of zero for this particular combination of Mr* and $m_a$. If the remaining summation points in the series exhibit the appropriate monotonic increase/decrease behavior and the number of such summation points (terms) is sufficient to pass through the coherence filter then a non-zero signal (H) will be calculated for Mr*,$m_a$. If, on the other hand the number of well behaved summation points(terms) does not pass through the coherence filter, Mr*,$m_a$ is assigned a calculated signal (H) of zero.

Various other modifications can be made to basic equation 12. For example, an "enhancer" function can be provided by an appropriate exponent N so that Eq. 12 becomes:

$$H(M^*, m_a) = F\left[\left\{\sum_{i_{min}}^{i_{max}} h(M^*/i + m_a)\right\}^N\right] \qquad (13)$$

If the enhancer exponent N is set at a value greater than 1, its effect is to enhance contributions to the summation from the higher peaks in the measured spectrum and to attenuate contributions from the smaller peaks. Such enhancement of the contribution of the larger peaks makes identification of the true value of Mr more rapid and more positive for major species in the analyte sample. If the enhancer exponent N is set to a value less than 1 but greater than zero, the difference in contribution from the high and low peaks in the spectrum is decreased. If N is given a negative value, contributions from the smaller peaks in the measured spectrum are enhanced relative to contributions from larger peaks. Such "negative enhancement" can be very useful when one is interested in trace components in a sample mixture. A value of zero for N represents a special case for which the summation of Eq. 13 becomes either unity or zero. This choice for N can provide a convenient means of determining whether species with particular values of Mr are present or absent in a sample. When N is unity, of course, Eq. 13 becomes identical with Eq. 12 and nothing is enhanced.

Another variation of Eq. 12 can be written:

$$H(Mr^*, m_a) = F\left[\sum_{i_{min}}^{i_{max}} \{h(Mr^*/i + m)\}^N\right] \qquad (14)$$

In this form the operation defined by the equation produces an effect similar to that of Eq. (13). When the enhancer exponent is set to 0 in this case the summation total is equal to the number of peaks in the parent spectrum that form part of a coherent series. Consequently, the result produced by Eq. 14 with N =0 may be considered a "coherence check." It allows the user to find the value of Mr* whose ions provide the greatest number of peaks in a coherent sequence. This coherence check has the effect of making all terms in the argument of the summation in Eq. 13 have the same value, i.e. unity. In other words, all peaks in the measured spectrum that are part of a coherent series are given the same weighting.

Still other forms of Eq. 12 may be useful. For example, as Eq. 15 it can be used to determine average contribution of each term to the summation total:

$$H(Mr^*, m_a) = F\left[\sum_{i_{min}}^{i_{max}} h(Mr^*/i + m_a)/(i_{max} - i_{min} + 1)\right] \qquad (15)$$

Such averaging can also be carried with enhancing in place by:

$$H(Mr^*, m_a) = F\left[\sum_{i_{min}}^{i_{max}} \{h(Mr^*/i + m_a)/(i_{max} - i_{min} + 1)\}^N\right] \qquad (16)$$

or $$H(Mr^*, m_a) = F\left[\left\{\sum_{i_{min}}^{i_{max}} h(Mr^*/i + m_a)/(i_{max} - i_{min} + 1)\right\}^N\right] \qquad (17)$$

It will be clear to those skilled in the art that there are many other variations on the theme of Eqs.12-17 that can be formulated to achieve a particular purpose.

In order to use Eqs. 12-17, or other variations of the principles they embody, in practicing the invention, one must first stipulate proper and appropriate definitions of the quantities they incorporate. These quantities include the limits defining the ranges of the variables including the mass of the parent species ($Mr^*_s$, $Mr^*_f$), the mass of the adduct charges ($m_{as}$, $m_{af}$), and the number of charges on the ions ($i_{max}$, $i_{min}$). In addition, to achieve a desired purpose the particular equation selected must be appropriately formulated by specifying such characteristics as the filter functions (F's) and their settings, as well as the values and operands of any operators to achieve particular effects such as preferential enhancement by exponent N.

After the appropriate form of the deconvolution equation has been selected and values or ranges specified for its terms, a procedure for carrying out the calculations necessary to "solve" the deconvolution equation must be chosen. One approach is to specify a particular value for $m_a$ in the selected equation and then to carry out the indicated summation at successively increasing values of Mr* over the prescribed range in the kind of forward-marching technique that was described earlier. This process is repeated for successively increasing values of $m_a$ over its prescribed range. Even though it is carried out by computer, this calculation can be tedious, especially if the increments in $m_a$ and Mr* are small enough to ensure that bona fide peaks are not skipped. To be remembered is that the 3D surface to be covered may include a very large area. If the analyte is an unknown, one might have to scan an area that has dimensions of 10,000 daltons in Mr and 200 daltons in $m_a$. Most of that area will usually contribute little or nothing to the summation so that much of the computation time will be wasted.

One way to decrease the amount of computation and increase its efficiency is to change the method of choosing $m_a$-Mr* combinations for comparison with the measured spectrum. In the "forward marching" approach described above, one systematically checks all possible combinations in and ordered sequence. A much faster approach is to choose the $m_a$-Mr* pairs by random selection in what will be referred to as the "Monte Carlo" method. Because any pair is as likely to be selected as any other, the features of the entire surface begin to emerge simultaneously soon after the calculation is started. The features are faint at first but become more distinct as more summations are carried out. This behavior resembles what happens during development of a latent image in a photograph. The details of the image may not become completely clear until development is complete but its general features become apparent at very early stages. In the Monte Carlo technique for carrying out the deconvolution one can very soon discern the general features of the whole surface and thus be able to decide whether the calculation should be continued or whether it should be terminated and tried again with a different set of boundary conditions, e.g. filter settings. In the direct marching approach, on the other hand, the calculation is completed element by element sequentially across the area to be covered. Thus, halfway through the process there is complete information available on half the surface but no information at all on the other half Consequently, most if not all of the calculation must be carried out to obtain information on the surface as a whole In other words, one may be forced to complete the calculation in order to find out whether it is worth completing!

Although this "pure" Monte Carlo method offers many advantages over the direct march approach, it often leaves much to be desired in speed and efficiency, especially when the area of the 3D surface is large. Efficiency is used here to mean the percentage of calculations which result in a non-zero calculated signal (H). The efficiency of both the direct march and the unguided Monte Carlo method is typically very low. Many of the calculation points yield no or little signal. It is quite clear that if the efficiency of the calculation can be improved, then the speed at which the final result can be obtained will be improved. In this regard, a "guided Monte Carlo" method can significantly increase efficiency . The term "guided Monte Carlo method" is used here to describe any method in which the calculation points are chosen at random within restricted areas on the 3D surface . The restricted areas are those in which there is a significant likelihood of non-zero calculated signal Another way of choosing calculation points is a "deterministic method". In a deterministic method, a predetermined formula is used to select points within the restricted areas. Whether using a guided Monte Carlo or a deterministic method, the size and location of these restricted area can be determined from information available from the original spectrum as follows.

If, as is usually the case, ma is numerically small with respect to the values of x (i.e. m/z) for the peaks in the measured spectrum for a single species, the difference in m/z values for any two peaks will yield a good approximation for the value of Mr. For such a pair of peaks with m/z values of xb and xc that are 1 charge apart $$x_b = Mr/i_b + m_a \quad (18a)$$

and $$x_c = Mr/(i_b+1) + m_a \quad (18c)$$

If $m_a$ is small in magnitude relative to x, which is usually the case, Eqs. 18a and 18b can be combined to give:

$$i_b = INT[x_c/(x_b - x_c)] \quad (19)$$

where the function INT represents the value of the integer closest to the value of the term in the brackets because the number of charges on an ion must be integral. With the value of $i_b$ thus established, Mr and ma can both be found by simultaneous solution of Eqs. 18a and 18b.

$$M_r = [(x_b - x_c)(i_b + i)]i_b \quad (20)$$

$$m_a = x_b - [(x_c - x_b)(i_b + 1)] \quad (21)$$

Equations 18a and 18b contain 3 unknowns ($m_a$,Mr,ib) but constitute only two relations between these unknowns. A further condition results from the fact that charge must be an integer. Eq. 19 yields one such value. Unfortunately, as noted earlier, this requirement does not fully specify a particular value of i because if it is satisfied by any particular value of i, for example $i_x$, it is also satisfied by any other value $i_x + k$ where k is any integer. In other words, in the absence of other information, i remains uncertain to the extent of an additive constant. The required "other information" might be independent observations that would specify applicable values for any one of the other variables. For example, information on $m_a$ might be obtained from experimental observations on the effect of adding to the sample solution known amounts of species that might be adduct ions. The number of charges i might be obtained directly from mass analysis at a resolution high enough to determine the difference in m/z for peaks due to ions with different isotopic content, e.g. different numbers of carbon 13 atoms.

The point of this discussion is that in the absence of other information one is naturally inclined to take the number for i given in Eq.19 for two peaks in the measured spectrum. The pair of values for $m_a$ and Mr arrived at in this way are an appropriate choice with which to start the deconvolution calculations defined by Eq. 12 or any of its modifications. Any other pair of values for $m_a$ and Mr that would arise from a different choice for the unknown additive constant contribution to i would also be useful starting points. Because they were arrived at from the m/z values of two peaks, all such pairs would automatically have a coherence factor of at least two.

If the peaks in the measured spectrum were infinitesimally thin, there would not be any need to use either the deterministic or the guided Monte Carlo methods. One would only need to perform calculations at Mr-ma pairs resulting from the maxima of the various peak pairs. However, as was shown above, the peaks have a certain width and each pair of peaks may define a large area in the 3D surface. Thus, the guided Monte Carlo and deterministic methods begins by obtaining values for Mr and $m_a$ from the m/z values of various pairs of peaks in the measured spectrum and carrying out the summation as defined by the appropriate form of the deconvolution equation, e.g. Eq.12.

Whether using a guided Monte Carlo method or a deterministic method, not all pairs of peaks need be examined. Indeed, for a given peak, only those peaks which fall within the "coherence widow" of this peak need be considered. If actual adjacent peaks in a measured spectrum are too close to any particular reference peak, the value of Mr calculated from the m/z values of the reference peak and any one of these adjacent peaks will be outside the range of values appropriate for the coherent sequence. If the actual adjacent peaks are too far apart, the resulting Mr value will be too small. Peaks whose separation leads to values within the limits are said to be in the coherence window for the reference peak. In other words, if $x_b$ is the m/z value for the reference peak, then for any other peak at $x_c$ to fall within the coherence window, the following relation must apply:

$$[x_b+Mr_f/(I_f-1)]<x_c<[x_b+Mr_s/(I_s)\,(I_s-1)] \qquad (22)$$

where subscript s refers to the value of the variable at which the deconvolution summing of the applicable form of Eq. 12 starts and subscript f to its value at the finish. In other words s and f identify the limiting values of the variables as defined earlier in the discussion preceding the introduction of Eq. 12. Thus, $I_f$ is the largest integer by which $(x_b-m_{as})$ can be multiplied to give a product less than $Mr_f$. Similarly, $I_s$ is the smallest integer by which $(xb-m_{as})$ can be multiplied to give a product greater than $Mr_s$. These limits represent the extent of the coherence window to the right of a particular peak (i.e. in the high mass direction). An equivalent expression can be written to define the extent of the coherence window to the left of the particular peak (i.e in the low mass direction.)

After the coherence windows are defined, the deconvolution procedure may start with the highest peak in the original spectrum and carry out the summing of the applicable form of Eq. 12 for all of the possible combinations with other peaks in its coherence window. Then the values for Mr-$m_a$ pairs are generated from the second highest peak with the other peaks in its coherent window, care being taken to avoid duplication. This procedure is repeated until all or most of the various peak pairings have been examined. It is to be noted that by starting with the highest peak, one calculates the masses of the most plentiful molecular species first. If the spectrum examined is for a mixture of species and one is interested in those that are present in trace amounts, one may start the process with the smallest peak in the original spectrum first and then proceed to the next highest peak and so on up to the highest peak. Another alternative is to start with the peak that has the lowest m/z value and march up the m/z scale. Still another strategy would be to choose the peaks randomly. The first of these procedures, starting with the highest peak, rapidly calculates the mass of the most abundant species, in the spectrum, that is, not necessarily in the sample solution. The second scheme, starting with the smallest peak, calculates the masses of the trace species first. The results obtained by the last two approaches, starting with the highest m/z value or selecting peaks at random, are not affected by the relative abundance of species in the population of ions that gave rise to the spectrum. The choice of a particular strategy should be determined by the objective of the investigator.

The determination of values for Mr and $m_a$ from pairs of peaks as Just described, together with some simple averaging, would provide essentially all the information that could be obtained from the measured spectrum, if the peaks in that spectrum were infinitesimally thin and the analyzer's mass scale were perfectly calibrated over the range of m/z that included all the ions produced from the analyte that was introduced. Neither of these prerequisites are generally realized in practice. The peaks in real spectra have a finite width. Consequently, the values of Mr and $m_a$ to be associated with a peak will depend upon which of the m/z (x) values embraced by the peak is used. No is it advisable simply to take the m/z value of the apex of a peak (maximum signal) even when a precise value can be assigned to that apex because it is very sharp. The sometimes substantial width of the base in a measured spectral peak may contain valuable information because it might result from variegation in the mass of the adduct charges or from the presence of neutral adducts on the parent species such as molecules of solvent or, for example, carbohydrate entities in glycoproteins. Therefore, one should often carry out the deconvolution by summing over a band of m/z values in each peak. One deterministic way of doing this is to divide each peak into L differential "slices" each of which is associated with its own value of m/z. One can start with the m/z value of the first slice of the first peak and couple it with the m/z value of the first slice of the second peak to obtain a pair of Mr-$m_a$ values associated with that pair of slices. The summation of the deconvolution equation is then applied to this pair of values for Mr and $m_a$. Next the first slice of the first peak is paired with the second slice of the second peak, then with the third slice of the second peak, and so on, marching over the m/z range of each peak base, applying the deconvolution summing over the Mr and $m_a$ values from all possible pairs of slices.

A second deterministic approach may be to use select Mr-ma pairs from predetermined sections of each pair. For example, one might use the half-height m/z values on peak one with the half-height m/z's on the second peak to obtain pairs of Mr-ma and then apply the summation deconvolution. Or, one may use the maxima of one peak with the half-height m/z of another to obtain Mr-ma pairs and so on.

A third approach may be to use guided Monte Carlo sampling to randomly chose the m/z values within each of the peaks that are used to select Mr-ma points. For example, An m/z value is randomly selected in one peak and an m/z value is randomly selected in the second peak .The values of Mr and ma are then determined from Eqn.(20) and (21) using I values in the range of that given in Eqn.(19) and the deconvolution summation of Eqn.12 or its applicable modificate is performed. If several such random selections are made, then the essential features of the relevant section of the 3D surface rapidly emerge.

Any of these methods for choosing m/z values within the peaks can be used either individually or in combination with the others. The guided Monte Carlo method, however, has the advantage of being easier to implement and can quickly reveal the essential feature of the 3D surface.

After a number of peak pairs have been examined in this way it is sometimes useful to guide the Monte Carlo selection by applying it in the vicinity of points on the surface that have a high calculated signal. As noted above, such guiding defines the nature of the surface more quickly and clearly in the regions of more importance, i.e. that have more structure. The most efficient calculation procedure will use the pure, guided Monte Carlo and deterministic methods and, in fact, may alternate among them. Such alternation insures that that the entire surface is examined with the most careful scrutiny being reserved for the most important regions. It is important to note that these Monte Carlo and deterministic methods are also very valuable and effective when applied to the two dimensional deconvolution of the prior art in which the adduct ion mass is assumed to be known and constant. The desired 2D spectrum containing single peak for each species is obtained much more rapidly by these methods than by the methods now in use which generally are based on a direct marching approach.

The final step in the procedure is to terminate the calculation and to interpret the structure of the surface. Termination should occur when changes in the structure or definition of the 3D surface become very small per unit of additional calculation time. The interpretation of the surface features has been previously discussed in some detail in the description of the invention. In general, the coordinates of the point of maximum height represent the values of Mr and $m_a$ that best characterize the ions of the analyte species, subject to the caveats that were identified in that earlier detailed discussion. If more than one species was present in the sample solution, there will be such a peak summit on the surface for each of those species from which ions are produced. As mentioned earlier, various effects can obscure the true values of Mr and $m_a$ or otherwise confuse interpretation of the surface. For example, heterogeneity in adduct ion mass can produce a multiplicity of peak summits in close proximity, as can neutral adducts such as molecules of solvation. Whether such adducts result in peak multiplicity, or simply in peak breadth, depends upon the resolving power of the mass analyzer with which the ions were weighed. As also discussed in the detailed description of the invention, peaks can be elongated into ridges by calibration errors in the analyzer's mass scale, by random errors in the measurements and uncertainties in the mass, or by heterogeneity and impurities in the analyte species of the sample. The widths of these ridges is also a measure of errors in the analysis and heterogeneity in the sample. Multiplicity of ridges can result from incidental coincidences of peaks in a measured spectrum with peaks in a calculated spectrum based on values of Mr and $m_a$ that differ from the true values. Such ridge multiplicity, or peak multiplicity in a two dimensional deconvolution, can be eliminated by incorporation of appropriate filter functions in the deconvolution algorithm. Another symptom of error is the occurrence of a peak summit at an unrealistic value of $m_a$, 0.5 for example. However, one should not be surprised to find peak summits at negative values of the ma coordinate. Some ions result from the loss of a charged entity from the parent species. Such loss is frequently encountered in the formation of negative ions, for example by dissociation of a cation from a carboxylic acid or salt. In sum, there is an abundance of information in the topography of a 3D surface produced by deconvoluting a measured mass spectrum in accordance with the procedures taught by the invention. By accumulating experience in practicing its deconvolution approach, an investigator develops skill and insight in "reading" the surface and becomes increasingly able to recover the wealth of information it contains with facility and dispatch.

In this account the invention and its practice have been described largely in terms of geometric or pictorial representations in the form of "spectra" that represent the data from mass analysis of ions as well as curves and surfaces that represent numbers and relations resulting from manipulation of that data. Such resort to graphic representation is only for convenience and simplicity in describing and explaining the nature of the invention and what it achieves. One can reap the benefits of practicing the invention without the aid of any diagram or graph showing a mass spectrum or a pictorial display of a deconvolution surface. Electrical signals from the mass analyzer can be fed directly into a suitably programmed computer which in turn will print out the desired result of the analysis, a number representing the molecular weight Mr of each parent analyte species and the mass $m_a$ of the adduct charges. Those skilled in the art will readily recognize that invention contemplates and covers any method for producing this desired result that is based on the steps of examining the properties and behavior of multiply charged ions produced from parent analyte species, said examination and behavior of said ions including determination, by whatever means, of the actual or conjectured and calculated dependence of the true and apparent masses of said ions, of their adduct charges and of the masses of the parent molecular species, on the number of charges per ion, the effective masses of those charges, and the pattern of distribution of those charges among the ions produced from the sample. A unique feature of the practice of the invention, no matter in what terms its operations and results are cast, is to treat as a free variable the mass $m_a$ of the adduct charges that transform a parent species into a multiply charged ion. Another unique feature is the use of Monte Carlo techniques in choosing representative combinations of parent species molecular weight Mr and adduct charge mass $m_a$, for use in the deconvolution procedure that reveals the important features of the dependence of parent species molecular weight Mr on adduct charge mass $m_a$. Still another unique feature of the invention is its provision of filtering functions that can reduce noise as well as highlight particular characteristics of an analyzed sample.

SUMMARY

In summary, the patent describes a method by which the spectrum of a multiply charged molecule is transformed into a three dimensional "macro spectrum" in which each molecule is represented as a singly charged molecule.

. The method involves several steps:

1. Properly formulating the problem so there are no peak to peak adduct ion variations.
2. Defining the calculated signal in terms of a three dimensional surface in which the signal depends on the effective adduct ion mass as well as the effective macro mass.
3. Using coherence filters in this signal definition to eliminate noise and to have the ability to "tune" the macro signal.
4. Using an enhancer in this signal definition to enhance either the high peaks or the small peaks or to do a coherence check throughout the macro spectrum.
5. After properly defining the calculated signal the search parameters are specified. These parameters include the search area as well as the coherence filter values and the enhancer value.
6. After the peaks have been grouped, the method of calculation point selection is chosen. The method of calculation point selection may be either a direct march, an unguided Monte Carlo Method or a guided Monte Carlo method or a deterministic method. The guided Monte Carlo method is the method of choice but is most effective when used in conjunction with other methods.
7. The peaks are then coherence paired. This means that peaks are grouped with other peaks that are within their "coherence windows". These coherence windows are dependent on the search parameters.
8. When the calculation begins, a point is selected for calculation. The calculated signal equation is evaluated at this point. The value of this signal is then recorded either in a computer video display or in a file or both.
9. After the calculated signal is determined at one point, the next point is selected and process is repeated over and over again until either a. A specified number of calculations have been performed, or b. There is little noticeable change in the macro surface with each additional calculation.
10. The calculation is terminated.
11. The 3D surface is recorded in a file.
12. The 3D surface is then examined to determine the mass of the molecules present in the original spectrum, to ascertain the accuracy of that mass assignment and/or to check the calibration of the mass spectrometer.

I claim as follows:

1. An improved method for determining the molecular weight of a distinct polyatomic parent molecular species by mass analysis of a population of multiply charged ions each of which is formed by attachment of a plurality of adduct ions to a molecule of said parent molecular species, said improved method avoiding the need to assume a value for the adduct ion mass, as required by previous methods, and comprising the steps of:

(i) Producing a primary population of multiply charged ions of a distinct polyatomic parent molecular species, all molecules of said distinct polyatomic parent molecular species being indistinguishable from each other by said method, each one of said multiply charged ions being characterizable by the symbol xi, the numerical value of xi being the m/z value for said one of said multiply charged ions such that xi=Mr/i+ma wherein Mr is the molecular weight of said distinct parent molecular species, i is an integer equal to the number of charges attached to said distinct parent molecular species to form said multiply charged ion, and ma is the mass of said individual adduct charges, said primary population of ions comprising a plurality of sub-populations, the ions of each sub-population having the same values for i, ma and Mr, and therefore the same value of xi, said plurality of said sub-populations comprising at least one sub-population of each possible integral value of i beginning with a minimum value and extending to and including a maximum value equal to the minimum value plus an integer no smaller than two;

(ii) mass-analyzing the ions of said primary population to obtain a set of experimental values for the relative abundances of ions in each of said sub-populations constituting said primary population of ions, said experimental values for the relative abundances of ions comprising the measured currents due to the ions of each of said sub-populations after said ions of said sub-population have been selected from said primary population by a mass analyzer;

(iii) applying a deconvolution algorithm to said set of experimental values for the relative abundances of ions in each of said sub-populations, said deconvolution algorithm defining for each of said sub-populations the regime of values for ma and Mr that in combination with the value of i for said sub-population will give rise to a calculated value of Xi=Mr/i+ma that coincides with an experimentally determined value of xi at which there is a detectable contribution to said measured current due to ions of one of said sub-populations;

(iv) identifying as the best experimental value for the molecular weight Mr of said distinct parent molecular species, and the best experimental value for the mass ma of the adduct charges on said ions of said distinct parent molecular species, those values of Mr and ma that together, and successively in conjunction with each of all values of i for which there is a sub-population in said primary population, give rise to a set of calculated values of xi for which the associated relative ion abundances in the said set of experimental values for the relative abundances of the ions of each of said sub-populations constituting said primary population of ions, add up to a larger total value than do the relative abundances of ions associated with the set of calculated xi values resulting from any other combination of values for Mr and ma.

2. The method of claim 1 in which the minimum value of i is at least 3 and the maximum value is at least 6.

3. The method of claim 1 in which the deconvolution operation is carried out with pairs of values for the variables ma and Mr that are selected at random from the set of values for each variable that in combination with a value of i for which there is at least one sub-population of ions in the said plurality of sub-populations, will produce a value of xi within the range of values of xi that extends inclusively from the highest measured value to the lowest measured value in said primary population of ions.

4. The method of claim 1 in which the deconvolution algorithm incorporates filter functions based on coherence that eliminate from the deconvoluted spectrum those contribution due to noise and to ions in said primary population whose coherence falls outside specified coherence limits.

5. The method of claim 1 in which the deconvolution algorithm incorporates filter functions based on coherence together with enhancement operators, said filter functions serving to eliminate contributions to the deconvoluted spectrum from noise and from ions in said primary population whose coherence falls outside specified coherence limits, said enhancement operations producing enhancement of the measured ion current values at the calculated values of xi within a selected range.

6. An improved method for determining the molecular weight of a distinct polyatomic parent molecular species by mass analysis of a population of multiply charged ions each of which is formed by attachment of a plurality of adduct ions to a molecule of said parent molecular species, said improved method avoiding the need to assume a value for the adduct ion mass, as required by previous methods, and comprising the steps of:

(i) Producing a primary population of multiply charged ions from a sample containing said distinct polyatomic parent molecular species, all molecules of said distinct polyatomic parent molecular species being indistinguishable from each other by said method, each one of said multiply charged ions being characterizable by the symbol xi, the numerical value of xi being the m/z value for said one of said multiply charged ions such that xi=Mr/i+ma wherein Mr is the molecular weight of said distinct parent molecular species, i is an integer equal to the number of charges attached to said distinct parent molecular species to form said multiply charged ion, and ma is the mass of said individual adduct charges, said primary population of ions comprising a plurality of sub-populations, the ions of each sub-population having the same values for i, ma and Mr, and therefore the same value of xi, said plurality of said sub-populations comprising at least one sub-population for each possible integral value of i beginning with a minimum value and extending to and including a maximum ue equal to the minimum value plus an integer no smaller than two;

(ii) mass-analyzing the ions of said primary population to obtain a set of experimental values for the relative abundances of ions in each of said sub-populations constituting said primary population of ions, said experimental values for the relative abundances of ions comprising the measured currents due to the ions of each of said sub-populations after said ions of said sub-population have been selected from said primary population by the mass analyzer;

(iii) Representing said set of experimental values for the relative abundances of the ions in each of said sub-populations as a mass spectrum comprising a graph of points in an xy plane, the x value of each point being equal to the measured xi=m/z value for the ions with i charges constituting one of said sub-populations of said primary population of said ions, the y value of each of said points representing the said measured current due to the ions that have been selected from the primary population by the mass analyzer at the xi=m/z value for that point, the disposition of said points in said graph on said xy plane being such that a complex curve drawn through said points on said graph traces out a sequence of peaks, each peak comprising points representing the measured currents for ions of one of said sub-populations selected by the mass analyzer from said primary population of ions, the abscissa (x) value for the point at the apex of each peak representing the most probable experimental value of xi for the ions of said one of said sub-populations, the ions of any one peak, in the said sequence of peaks due to ions of particular parent molecular species, differing by a single charge from the ions of the immediately adjacent peaks in said sequence;

(iv) applying a deconvolution algorithm that transforms the mass spectrum comprising said set of peaks traced out by said curve through said points in said xy plane into a three dimensional surface in Mr, ma, H space that is the locus of all points for which the coordinate value H of any particular point represents the sum of the y values of all points of all the peaks of the said mass spectrum in the said xy plane for which the x=xi coordinate value is equal to the quantity (Mr/i+ma) wherein the values of Mr and ma are the coordinates of said particular point on said three dimensional surface and i can have any value for which there are at least some ions in said primary population of ions;

(v) identifying as the best experimental values for the molecular weight Mr of said distinct polyatomic parent molecular species, and the mass ma of the adduct charges on said multiply charged ions of said primary population of ions, the coordinates of the point on said three dimensional surface that has the highest value of said coordinate H.

7. The method of claim 6 in which the deconvolution operation is carried out on pairs of values for the variables ma and Mr that are selected successively at random from the set of values for each variable that in combination with a value of i for which there is at least one sub-population in said plurality of sub-populations, will produce a value of xi within the range of values of xi that extends inclusively from the highest measured value to the lowest measured value in said primary population of multiply charged ions.

8. The method of claim 6 in which the deconvolution algorithm incorporates at least one filter function based on coherence that can eliminate at least some contributions to the deconvoluted spectrum from extraneous sources including noise and ions in said primary population whose coherence falls outside some chosen coherence limits.

9. The method of claim 6 in which the deconvolution algorithms incorporates at least one enhancement operator as well as at least one filter function, aid filter function serving to eliminate at least some contributions to the deconvoluted spectrum from extraneous sources including noise and ions in said primary population whose coherence falls outside specified coherence limits, said enhancement operators producing enhancement of the measured ion current values at the calculated values of xi within a selected range.

10. An improved method for determining the molecular weight of, and judging the accuracy of said molecular weight for, at least one of the distinct polyatomic parent molecular species in a mixture comprising at least two different distinct polyatomic parent molecular species, by mass analysis of an ensemble of multiply charged ions each of which is formed by attachment of a plurality of adduct ions to a molecule of one of said parent molecular species in said mixture, said improved method avoiding the need to assume a value for the adduct ion mass, as required by previous methods, and comprising the steps of:

(i) producing a primary ensemble of multiply charged ions from a sample containing said mixture of said distinct polyatomic parent molecular species, all molecules of said distinct polyatomic parent molecular species being indistinguishable from each other by said method, each one of said multiply charged ions being characterizable by the symbol xi, the numerical value of xi being the m/z value for said one of said multiply charged ions such that si=Mr/i+ma wherein Mr is the molecular weight of one of said distinct parent molecular species in said mixture, i is an integer equal to the number of charges attached to said distinct parent molecular species to form said multiply charged ion, and ma is the mass of one of said individual adduct charges attached to said multiply charged ion, said primary ensemble of multiply charged ions comprising at least two primary populations of ions, one such primary population for each of said distinct polyatomic parent molecular species in said mixture, each of said primary populations of ions in said primary ensemble of ions comprising a plurality of sub-populations, the ions of each sub-population having the same values for i, ma and Mr, and therefore the same value of xi, said plurality of said sub-populations comprising at least one sub-population for each possible integral value of i beginning with a minimum value and extending to and including a maximum value equal to the minimum value plus an integer no smaller than two;

(ii) mass-analyzing the ions of said primary ensemble to obtain a set of experimental values for the relative abundances of the ions of each of said sub-populations constituting said primary populations of ions contained in said primary ensemble, said experimental values for the relative abundances of ions comprising the measured currents due to the ions of each of said sub-populations after said ions of said sub-population have been selected from said primary population by the mass analyzer;

(iii) Representing said set of experimental values for the relative abundances of the ions of each of said sub-populations in said ensemble of ions as a mass spectrum comprising a graph of points in any xy plane, the x value of each point being equal to the measured xi=m/z value for the ions with i charges constituting one of said sub-populations of said ensemble of ions, the y value of each of said points representing the said measured current due to the ions that have been selected form the primary population by the mass analyzer at the xi=m/z value for that point, the disposition of said points in said graph on said xy plane being such that a complex curve drawn through said points on said graph traces out a sequence of peaks, each peak comprising points representing the measured currents for ions of one of said sub-populations selected by the mass analyzer from said primary population of ions, the abscissa (x) value for the point at the apex of each peak representing the most probable experimental value of xi for the ions of said one of said sub-populations, the ions of each peak, in said sequence of the peaks due to ions of one of said distinct parent molecular species, differing by a single charge from the ions of the peaks immediately adjacent to said peak in said sequence, (iv) applying a deconvolution algorithm that transforms the mass spectrum comprising said set of peaks traced out by said curve through said points in said xy plane into a three dimensional surface in Mr, ma, H space that is the locus of all points for which the coordinate value H of any particular point represents the sum of the y values of all points of all the peaks of the said mass spectrum in the said xy plane for which the x=xi coordinate value is equal to the quantity (Mr/i+ma) wherein the values of Mr and ma are the coordinates of said particular point on said three dimensional surface and i can have any value for which there are at least some ions in said primary ensemble of ions, said three dimensional surface showing a separate peak for each of the said distinct polyatomic parent molecular species in said mixture;

(v) identifying as the best experimental values for the molecular weight Mr of one of said distinct polyatomic parent molecular species in said mixture, and the mass ma of the adduct charge on said multiply charged ions of said primary population of ions, the ma and Mr coordinates of the apex of the peak on said three dimensional surface that is associated with said one of said distinct polyatomic parent molecular species in said mixture.

11. The method of claim 10 in which the deconvolution operation is carried out on pairs of values for the variables ma and Mr that are selected successively at random from the set of values for each variable that in combination with a value of i for which there is at least one sub-population in said plurality of sub-populations in said ensemble of ions, will produce a value of xi within the range of values of xi that extends inclusively from the highest measured value to the lowest measured value in said ensemble of multiply charged ions.

12. The method of claim 10 in which the deconvolution algorithm incorporates at least one filter function based on coherence that can eliminate at least some contributions to the deconvoluted spectrum from extraneous sources including noise and ions in said primary ensemble of multiply charged ions whose coherence falls outside some chosen coherence limits.

13. The method of claim 6 in which the deconvolution algorithm incorporates at least one enhancement operator as well as at least one filter function, said filter function serving to eliminate at least some contributions to the deconvoluted spectrum from extraneous sources including noise and ions in said primary ensemble of multiply charged ions whose coherence falls outside specified coherence limits, said enhancement operators producing enhancement of the measured ion currents at the calculated values of xi within a selected range.

14. A method for checking and adjusting the calibration of a mass spectrometer that consists in producing a three dimensional surface in Mr, ma, H space to represent the set of experimental values for the relative abundances of multiply charged ions obtained from a sample containing a distinct polyatomic molecular species as in claim 7, determining the values of the Mr and ma coordinates of the point on that surface with the highest value for H, and adjusting the spectrometer calibration until the ma coordinate of said point with the highest value for H of said surface is consistent with what might be reasonably expected for possible adduct ions.

15. An improved method for determining the molecular weight Mr of a distinct polyatomic parent molecular species from experimental data obtained by mass analysis of a population of multiply charged ions each of which is formed by attachment of a number i of adduct ions of mass ma to a single molecule of said parent molecular species, said improved method avoiding the need to assume a particular value for the adduct ion mass ma, as required by previous method, comprising: treating both the adduct ion mass ma and the molecular weight Mr as free variables, and identifying as the best experimental values for Mr and ma, the values which in combination with the values for i found in said population of multiply charged ions, and producing an optimum set of calculated values for xi corresponding to points on the m/z scale of the mass analyzer such that xi=Mr/i+ma, wherein said optimum set of calculated values being such that the associated measured ion currents add up to a larger total than would be obtained for any other set of xi values obtained with any other combination of values for Mr and ma.

* * * * *